United States Patent

Gomersall et al.

[15] 3,703,725
[45] Nov. 21, 1972

[54] METHOD FOR OPERATING A MANUFACTURING LINE

[72] Inventors: Earl Raymond Gomersall, Chicago, Ill.; Roger Paul Meyer, Richardson, Tex.; Susan English Rejmaniak, Hackensack, N.J.

[73] Assignee: Texas Instruments Incorporated, Dallas, Tex.

[22] Filed: Nov. 2, 1970

[21] Appl. No.: 86,204

[52] U.S. Cl. ..................................444/1, 235/151.2
[51] Int. Cl. ................................................G06f 15/20
[58] Field of Search ..........................235/150; 444/1

[56] References Cited

OTHER PUBLICATIONS

Smith, S. B., Planning Transistor Production By Linear Programming, In Operations Research, Volume 13, pages 132–139, 1965, Q175.06.

Lambourn, S. Resource Allocation and Multi-roject Scheduling (RAMPS), In Computer J. 5(4): p. 300–04, Jan. 1963, TK7885.A1.C6

Robinson, F. D. The Background of the PERT Algorithm, In computer J. 5(4): p. 297–00, Jan. 1963, TK7885.A1.C6.

Primary Examiner—Charles E. Atkinson
Assistant Examiner—R. Stephen Dildine, Jr.
Attorney—James O. Dixon, Andrew M. Hassell, Harold Levine, Rene' E. Grossman and James T. Comfort

[57] ABSTRACT

A manufacturing line has a plurality of work stations. The work stations are ordered into sequential flow points through which work in process flows. The work flow through the sequentially ordered flow points is balanced in an automatic data processing machine by starting at the last flow point in the ordered sequence. In a multiproduct path manufacturing line, the flow points on adjacent product paths are ordered into neighborhoods prior to balancing the manufacturing line.

19 Claims, 6 Drawing Figures

INVENTORS
Earl Raymond Gomersall
Roger Paul Meyer
Susan English Rejmaniak

BY *Jim Comfort*

ATTORNEY

METHOD FOR OPERATING A MANUFACTURING LINE

This invention is directed to a serial manufacturing operation, and more particularly directed to a method of balancing a serial production line.

Manufacturing operations are normally organized into what are commonly referred to as manufacturing lines, assembly lines, or production lines. In this discussion, they will be referred to as manufacturing lines. Manufacturing lines produce at the end of the line a finished product. To produce these products at the end of the manufacturing line, a start is made at the beginning of the manufacturing line. The materials and parts that go into the final product are taken and various manufacturing operations, inspections and/or handling operations are performed at various work stations along the manufacturing line in a serial manner.

The manufacture of an integrated circuit is carried out in a manufacturing line. In manufacturing an integrated circuit the process begins with a slice of p-type silicon oxidized on its top layer. In a number of diffusion steps, selective oxide removal is carried out and an n-type epitaxial layer grown over the while surface of the layer. The surface is then reoxidized, windows etched in the oxide, and the p-type isolation diffusion carried out to define the regions of the n-type layer for each element. Next, p-type regions are diffused for the transistor base, the diode-anode, the resistor, and the first electrode of the capacitor. Then, $n^+$ regions are diffused for the transistor emitter, the collector contact, the diode cathode contact, and the second capacitor electrode. Finally, to complete what is to be termed the slice, a metallization pattern is deposited and defined to make contact to each of the elements and interconnect them on top of the silicon oxide covering surface of the slice to form the complete circuit. What is termed the slice has now been completed.

The next operation is a testing operation where each individual integrated circuit is probe tested. Any circuits on the slice failing to meet the test standards are marked with an ink spot so they can be identified and rejected.

The silicon slice is then separated into individual IC chips or wafers. The chips are sorted by individual inspection to pick out and reject those marked with the ink spot during the probe test.

The IC chips are then assembled into a package, sealed and tested. To assemble the IC chips, they must first be mounted in position on a package base.

With the chip firmly mounted on the package, the electrical connections can be made from the circuit terminal paths on the chip to the package leads. This is commonly carried out by thermal compression bonding.

The next operation consists of sealing the IC circuit by either welding in a metal case or molding a plastic body around it.

The next operation consists of a leak test to check for air tightness.

The last step or operation is a final test for a series of electrical measurements to determine if the circuit meets the required standard.

As in any manufacturing operation, there are many sequential steps in the process of fabricating the integrated circuit and there will be some loss in these steps. These are called yield losses. These yield losses may occur at each operation.

In manufacturing lines, such as that described, it is inherent that the various operations or processes carried out at each station require different lengths of time. There is a theoretical cycle time between the time that the first operation in the manufacturing line begins and the time that the finished product is finished at the final station in the manufacturing line. However, for several reasons, the actual cycle time, which is the actual time that it takes between the time that an order is given to the initial station and the time that the product is finished at the final station, is normally many times the theoretical cycle time. In some manufacturing lines, the actual cycle operation is twenty times the theoretical cycle time. This long actual cycle time makes it very difficult to respond to a specific request for an item which is different from the standard. For instance, it may take eight days or more to manufacture an item which theoretically could be delivered 4 or 5 days after the order is placed at the initial station. This long cycle time also creates bulges in the inventory between the different work stations resulting in the tying up of a significant amount of capital in the inventory and in process work.

These bulges in actual long cycle time result from a significant number of problems. For example, there are day to day variables, such as the number of personnel available to work at a particular station, the yield for a specific operation at a station for a specific day, the available material at a particular station, and the current capacity of the machines. These variables also normally result in the over-staffing of a manufacturing operation on the order of 15 percent to be sure that there will always be a sufficient number of personnel available to perform the work. These variables result in stocking of additional material at each work station to ensure that there will be a sufficient amount of material available at any time and in additional capital expenditures for machines at any one station to ensure that there will always an adequate number of machines available. This may result in idle manpower and idle machines at times. This additional capacity may also result in the manufacture of more production from a work station than is needed.

There have been consistent attempts over the years to solve such problems, to reduce the actual cycle time of manufacturing lines closer to the theoretical cycle time. Most such efforts have resulted in ensuring that there is sufficient capacity in the manufacturing line to handle any excess work loads which may result. This results, of course, in the inefficiency described. Other efforts have simply accepted the fact that there is a continuing large in-house inventory of work in process and have dealt with the problem by more efficiently storing the work in process to make it more accessible. Other efforts have resulted in models which take into account the theoretical capacity of certain work stations and determine the average number of employees showing up on any certain day to handle these processes and tell each station what he could theoretically produce to handle the total production. After the model has been calculated it remains fixed.

None of these prior attempts to solve the problems of manufacturing lines have significantly reduced the in-house inventory, the ratio of the actual cycle time to the theoretical cycle time, or the manufacturing manpower.

It is therefore an object of this invention to provide a new and improved method of efficiently balancing a manufacturing line.

Another object of this invention is to provide a new improved method of line-balancing a serial manufacturing line.

Another object of this invention is to provide a new and improved method of balancing a manufacturing line on a dynamic basis.

Another object of this invention is to provide an improved method of balancing a manufacturing line and reduce the actual cycle time of such manufacturing line.

Still another object of this invention is to provide a new improved method of balancing a manufacturing line to enable the in-process inventory of such manufacturing line to be reduced.

Figure 1:
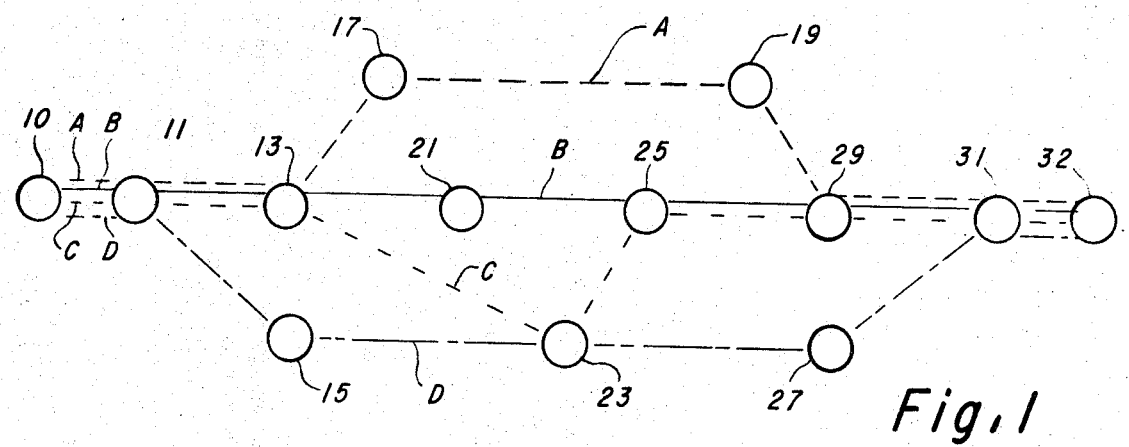
FIG. 1 illustrates a manufacturing line having a plurality of product lines.

Before describing this method of balancing a manufacturing line, several definitions of terms used in this description should be made. The manufacturing line which is to be balanced is first divided into a series of sequential flow points. A flow point is a step in the manufacturing line where a manufacturing process, a manufacturing operation, or an inspection of a product in the process of being manufactured is carried out. It is any point in the manufacturing process at which an operator or a machine performs a test or processing function on the product being manufactured which is directly related to the production of the finished product. In this specific method, if during the manufacturing line the in-process product undergoes a process, operation or inspection which may be identical to a previous process, operation or test, the subsequent operation, process or test is nevertheless assigned a different flow point number. The flow point numbering enables representation of the manufacturing line as a series of flow points numbered in increasing order with the initial operation having the lower numbered flow point, increasing until the final flow point has the highest numbered flow point.

Every flow point in the manufacturing line has an associated work station. A work station is a physical location at which a process, operation or test is performed or carried out on the in-process product. The work station may be the location of a specific machine, a group of machines, or an operator and a machine. A given process step, operation step or test step may be assigned more than one flow point number but will be assigned only one station number. This is because in the manufacturing line in the flow of work, the in-process product during its manufacturing line may flow through a specific work station which is a specific flow point and proceed to a further manufacturing operation and then flow back through the same work station to have additional work done on it. For instance, in the manufacture of integrated circuits, a specific test may be carried out on the integrated circuit and then go to a work station upon which further work may be carried out and then return to the same test station to perform the identical test or similar test thereon. For example, an electrical test to determine the completeness of the circuit in the integrated circuit may be carried out at a test station then the in-process integrated circuit may proceed to another work station where the integrated circuit may be packaged and sealed and then return to the same test station to again electrically test the integrated circuit. This will determine if the packaging of the integrated circuit has damaged the electrical characteristics of the integrated circuit itself.

A product line path is the path that a single in-process product takes in a manufacturing line. This product line path consists of a series of flow points. Many manufacturing lines build only one product; however, in many cases the manufacturing line builds several products requiring slightly different processing. Thus, there will be a plurality of product line paths through a manufacturing line. There will be a combination of product line paths in the manufacturing process using various process flow points so that different product lines in the manufacturing line will sometimes flow through common flow points and sometimes flow through flow points individual to that product line. Such a combination of product lines in one manufacturing line is termed a network. This manufacturing line network includes all flow points used by each of the product lines in the manufacturing line network.

Refer now to FIG. 1 for an illustration of a manufacturing line having a plurality of product paths and sharing some common flow points. The product line paths A, B, C and D originate at a common flow point 10 and each product path A, B, C, and D results in a finished product at flow point 32. Product path A flows through flow point 11, flow point 13, flow point 17, flow point 19, flow point 29, flow point 31, terminating at flow point 32. Product path B flows through flow point 11, flow point 13, flow point 21, flow point 25, flow point 29, flow point 31, terminating at flow point 32. Product path C originating at flow point 10, flows through flow point 11, flow point 13, flow point 23, flow point 25, flow point 29, flow point 31, terminating at flow point 32. Product path D originating at flow point 11 flows through flow point 11, flow point 15, flow point 23, flow point 27, flow point 31, terminating at flow point 32.

The manufacturing line shown in FIG. 1 may also include path points. A path point is defined as the flow point through which each product path flows. Thus a flow point 11 is a flow point through which four paths A–D flows. Thus the flow point 11 may also be referred to as path point 11A for product path A, path point 11B for product path B, path point 11C for product path C, and path point 11D for product path D. The product line path thus is composed of a series of path points. The flow points in the product line path may not be independent for that particular product path and as shown in FIG. 1, one or more of the flow points comprising the product path may be also used by other product line paths. Thus, flow point 11 is shared by all product paths A-D, flow point 17 is used only by product path A and flow point 15 is used only by product path D. This definition is used to enable the input of different yields, rework and labor standard for each product line or path in the network to be calculated.

Figure 2:
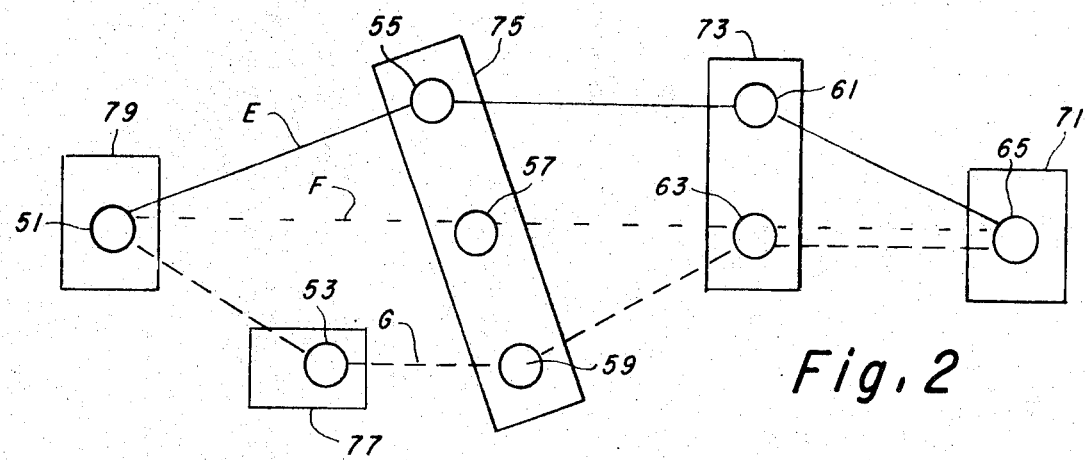
FIG. 2 illustrates a manufacturing line having three product paths.

Referring now to FIG. 2, another manufacturing line is shown having product paths E, F, and G originating at flow point 51. Product path E, originating at flow point 51, passes through flow point 55, flow point 61, and terminates at flow point 65. Product path F, originating at flow point 51, passes through flow point 57, flow point 63, and also terminates at flow point 65. Product path G originating at flow point 51, passes through flow point 53, flow point 59, flow point 63, and also terminates at flow point 65. Each flow point in the manufacturing line is assigned to what is termed a neighborhood. Flow point 51 is assigned to neighborhood 79, flow point 53 to neighborhood 77, flow point 55, 57 and 59 to neighborhood 75, flow points 61 and 63 are assigned to neighborhood 73, and flow point 65 is assigned to neighborhood 71. This assignment of flow points to the neighborhood puts a partial ordering, ($\leq$), on the manufacturing line network.

The neighborhood to which each flow point is assigned is determined in the following manner.

Let N be a collection of flow points which defines the network. A flow point $i$, on path P, is said to have a predecessor in the network N if and only if there exists a flow point $j$ in N such that $i$ immediately precedes $j$ on path P. This means that a flow point's predecessor comes after that flow point relative to product flow; in the definition above, $j$ is the predecessor of $i$. A neighborhood, $N_i$, in N, is the set of all flow points which have no predecessors in the set:

$$N ; i = 1$$

$$j = i-1$$

$$N - N_j ; i > TB\ 1$$

$$j = 1$$

Thus neighborhood $N_1$ would be the set of all flow points in the network N which do not have a predecessor in N; therefore only the terminating flow points would be in the set $N_1$. The neighborhood $N_2$ would be the set of all flow points which have no predecessors in set N with the elements of $N_1$ deleted. Similarly, neighborhood $N_3$ would be the set of all flow points having no predecessors in set N with the elements of $N_1$ and $N_2$ deleted. It should be clear that the neighborhoods consist of the terminating flow points at successive deletions of the same.

This construction of neighborhoods will exhaust the entire network with each flow point, and therefore each path point, being assigned to one and only one neighborhood. This places a partial ordering, ($\leq$) on the network.

For each path point i in the network, associate the positive integer n with i if and only if i is in the nth neighborhood, that is, $S(i) = n$ if and only if $i \epsilon (N_n)$.

Then if $x$ and $y$ are any two path points in the network, $x \leq y$ if and only if $S(x) \leq S(y)$.

Figure 3:
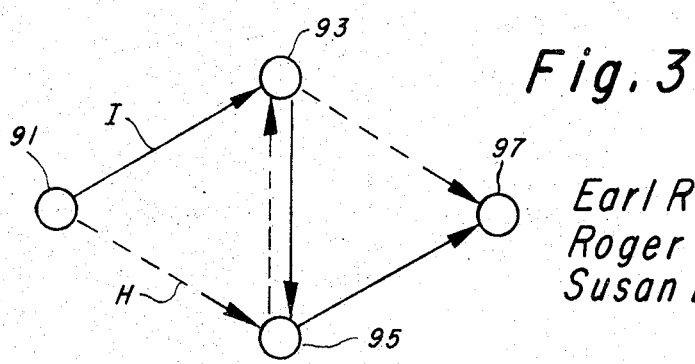
FIG. 3 illustrates a manufacturing line having product paths in which material for unfinished products move in more than one direction between work stations.
Figure 4:
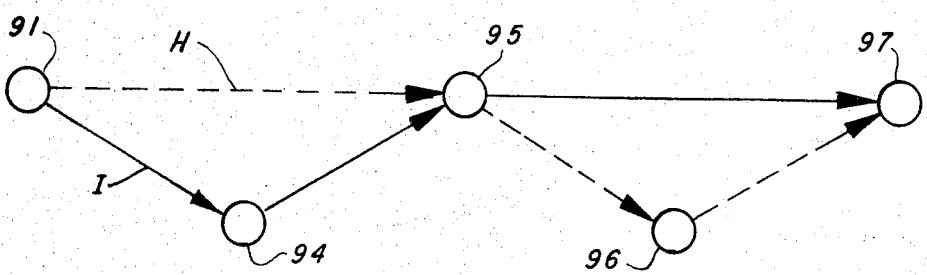
FIG. 4 illustrates the manufacturing line shown in FIG. 3 with the material flow rearranged.

In some manufacturing lines, material or products in process in the manufacturing lines will flow in both directions between two work stations and between two flow points. Referring now to FIG. 3, there are two product paths H and I originating at flow point 91 with product path I flowing through flow point 93, flow point 95, and terminating at flow point 97. Product path H originating at flow point 91, flows through flow point 95, flow point 93, and terminates at flow point 97. In this case, product path I flows from flow point 93 to flow point 95 and product path H flows from flow point 95 to flow point 93. Thus, product paths I and H flow in opposite directions between flow point 93 and flow point 95. Such a manufacturing line network makes it impossible to assign two flow points to the same neighborhood as flow point 93 is a predecessor to flow point 95 on product path H and that flow point 95 is also a predecessor of flow point 93 on product path I. This manufacturing line network may be rearranged as shown in FIG. 4 so that neighborhoods may be assigned to the flow points in the manufacturing line network. The manufacturing line network is rearranged as shown in FIG. 4 for the same manufacturing line network with product paths I and H in the same product paths as shown in FIG. 3. Flow points 91, 95 and 97 are the same flow points, however flow point 93 shown in FIG. 3 has been divided into two flow points 94 and 96 in FIG. 4. Flow points 94 and 96 are the same work stations as was the work station at flow point 93. The two flow points 94 and 96 are therefore assigned to the same work station. With this rearrangement of the manufacturing line network, the neighborhoods may be assigned according to the definition set forth above.

Figure 5:
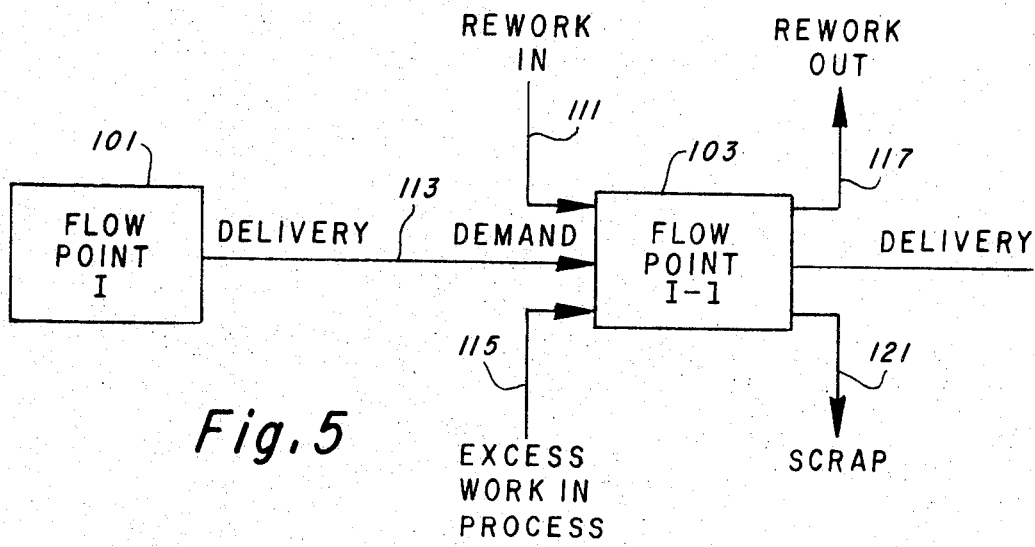
FIG. 5 illustrates a specific work station or flow point illustrating the variables in material flowing into and through the flow point or work station.

Referring now to FIG. 5, each flow point has a number of variables as any manufacturing station normally has. The first variable is the in process product applied to the flow point, termed the demand herein. The output from the flow point is termed the delivery. There is a scrap factor output from the flow point which is termed the scrap, and there is a rework output. There is rework-in and excess work in process applied to the flow point. In FIG. 5, flow point 101 (flow point I) has a delivery output which is applied on input line 113 to flow point I-1 as the demand. The reworkin is applied on input line 111 and the excess work in process applied on line 115. The rework-out from the flow point 103 is delivered on output line 117, the delivery is supplied on line 119 and the scrap is supplied on line 121. Thus, the variables taken into account at each flow point are as follows: 111 — rework-in, 113 — demand, 115 — excess work in process, 117 — re-work out, 119 — delivery and 121 — scrap. All of these variables are in units per hour.

Thus the flow of a flow point is defined as follows:

Volume = rework-in + demand + excess = rework-out + delivery + scrap

All of these variables are specified in units per hour. Yield at a former flow point is described as:

$$\text{Yield} = \frac{\text{Delivery}}{\text{Volume}}$$

Thus yield is a fraction of the total volume.

A manufacturing line such as an integrated circuit manufacturing line as previously described may be established in a network in the following manner. The work stations in the manufacturing line are first divided into the series of sequential flow points as previously described. The product line paths consisting of the series of flow points for each product line is also determined. When there is two-way product flow between two flow points as shown in FIG. 3, flow points must be redefined as shown in FIG. 4 before the program can balance the line. The variables for each flow point such as the rework-in rate, the excess work in process rate, the rework-out rate, and the scrap rates are determined for each flow point.

Then, taking these demands at the last flow points, the last flow point, the rework-out rates, the scrap rates, the rework-in rates and excess work in process rates, the manpower available, etc. are taken into consideration in determining the input demand required from the previous flow point to satisfy the desired delivery output from that flow point. This demand input to the last flow point, such as the demand input 113 to flow point 103 in FIG. 5, is the delivery required from the previous flow point 101. The delivery from the last flow point 103 takes into account the manpower needed at that flow point, machine capacity required, the rework-out rate, excess work in process, rework-in, and scrap variables. There may be a plurality of demand requirements 113 applied to flow point 103. These demand rates may be various portions of the unfinished product, raw materials and other required inputs.

After the required demand inputs, material, manpower and so forth have been calculated for flow point 103, requiring a set delivery from the previous flow points, then the process is repeated for the previous flow points such as flow point 101 in FIG. 5, supplying delivery for the demand for flow point 103, to calculate the required demand for those previous flow points.

In a multi-product path manufacturing line, this calculation of the demands for the previous flow points 101 to satisfy the delivery requirements, will be processed by neighborhood sequence.

Referring now to FIG. 2, flow point 65 is the only flow point in neighborhood 71 so that the delivered output from flow point 65 is the required output for that manufacturing line. The required demand on product paths E, F, and G is determined by taking the rework-out, rework-in, excess work in process, scrap out and other variables to satisfy the required delivery inputs to flow point 65 from the flowpoints in neighborhood 73. Then, taking the required demand to flowpoint 65, these inputs are the delivery outputs in neighborhood 73 for flow points 61 and 63 on product paths E, F, and G. To reach this required demand input for flow points 61 and 63 in neighborhood 73, the required delivery outputs from these flow points are calculated taking into account the variables for the rework-in and -out, the scrap out, the excess work in process and other required variables. The required demand inputs to flow points 61 and 63 will be the required delivery outputs from flow points 55, 57 and 59 in neighborhood 75. The required delivery outputs from these flow points 55, 57 and 59 in neighborhood 75 are taken to calculate the required demand inputs to flow points 55, 57 and 59 along product paths E, F, and G in neighborhood 75. The demand input to flow point 59 in neighborhood 75 is the delivery from flowpoint 53 in neighborhood 77. Thus the required input demand to flowpoint 53 is not calculated. The calculation in neighborhood 77 for flow point 53 is before the calculation is made in neighborhood 79 for flow point 51. The calculation of the demand input to flow point 51 in neighborhood 79 is then made to provide the delivery from neighborhood 79 to neighborhoods 77 and 75. Thus the required calculations have been made to provide a balanced manufacturing line having multiple product paths. The starting volume of the manufacturing line has also been calculated starting at flow point 51.

It has thus been described how a manufacturing line having multiple product paths may be balanced.

The method of this invention may be carried out on a general-purpose computer programmed to carry out the method described herein. The following computer program may be used to carry out the method of this invention. Various subroutines of this method are shown in the following tables. These subroutines are assigned names for the purpose of reference. The printout of each subroutine is in the FORTRAN language. These programs are well-documented by comment statements.

This method of balancing a manufacturing line can be carried out in two embodiments with the first embodiment being termed Capacity Simulation and the second embodiment being termed Dynamic Line Balancing. The Capacity Simulation embodiment balances a manufacturing line network taking into account existing installed equipment and generates reports specifying additional equipment, manpower, floor space, and other related needs required to meet specified manufacturing line outputs. The Capacity Simulation embodiment is extremely useful for planning purposes.

The Dynamic Line Balancing embodiment is useful on a periodic scheduling basis to balance the work in process inventory in an existing manufacturing line with respect to the current demand mix, existing equipment, personnel, and actual work in process inventory.

The method is carried out according to the following subroutines:

TOP FLAG (TOPFG) (TABLE 1)

This subroutine partially orders the manufacturing line network by assigning the flow points to neighborhoods. The partial ordering provides for dynamic line balancing in a multipath manufacturing line.

The arrays used in the program are as follows:
a. The JSEQ array is a two dimensional work array,
b. The JV and IV arrays contain the previous and actual path point numbers,
c. The NSEQ array is the array of neighborhoods,
d. The NPNTR and NPNTL arrays in which the right and left path pointers are stored,
e. The NPATH array is the array of path points.

Figure 6:
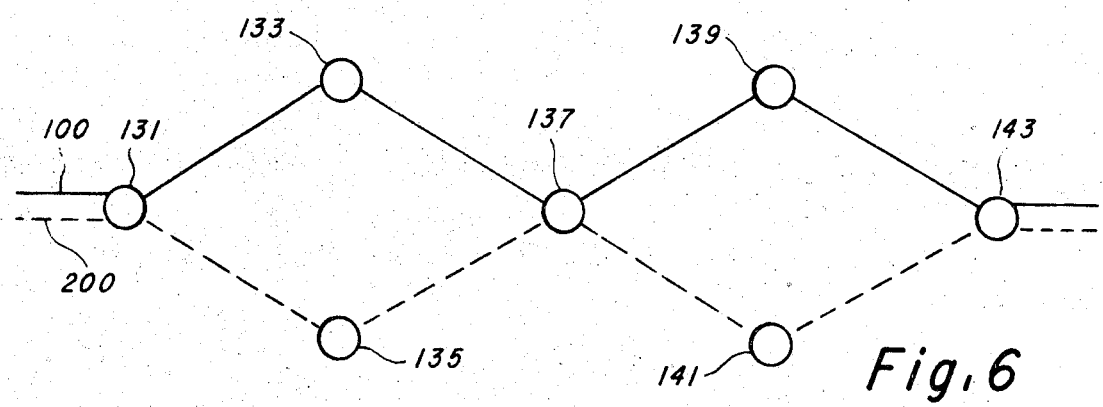
FIG. 6 illustrates an illustrative manufacturing line.

The variable NUMT is the total number of path points in the network. The arrays JV and IV are set up by the subroutine which reads the input data. For the manufacturing line network of FIG. 6, the flowpoints in these arrays may be organized as follows:

| JV | IV |
|-----|-----|
| 139 | 143 |
| 141 | 143 |
| 137 | 139 |
| 137 | 141 |
| 135 | 137 |
| 133 | 137 |
| 133 | 137 |
| 131 | 133 |
| 131 | 135 |

For any given flow point in the JV array, the corresponding flow point of the IV array is a predecessor flow point. This means that the flow points of the neighborhood at the end of the line, in this case flow point 143, will not be found in the JV array and the flow points of the neighborhood at the beginning of the line will not appear in the IV array. The elements of the JV and IV arrays are actually successive path points, as identified by flow point number. The elements of the IV array are stored in random order. An element in the IV array is selected and compared with each element in the JV array until a match is found. If a match is found then another element of the IV array is selected and compared, since this would imply that this path point still has a predecessor. When the first iteration has been completed, i.e., each element of the IV array has been compared with each element in the JV array, those elements of the IV array which were found not to have a match in the JV array are assigned to the first neighborhood. Then the corresponding elements of the IV and JV array are deleted and a new element of the IV array is selected. The process is repeated until all path points have been assigned to a neighborhood.

After the assignment of neighborhoods is complete, the TOPFG subroutine determines path pointers. The right path point for a path point X would be path point $X+1$, i.e., the succeeding path point. Similarly, the left path point would be $X-1$, or the preceding path point, relative to product flow. For the manufacturing line network of FIG. 6, consider the array below.

| | $X'-1$ | $X-1$ | $X$ | $X+1$ | $X'+1$ |
|---|---|---|---|---|---|
| | | | 131 | 133 | 3 |
| | | | 131 | 135 | 4 |
| 1 | | 131 | 133 | 137 | 5 |
| 2 | | 131 | 135 | 137 | 6 |
| 3 | | 133 | 137 | 139 | 7 |
| 4 | | 135 | 137 | 141 | 8 |
| 5 | | 137 | 139 | 143 | 9 |
| 6 | | 137 | 141 | 143 | 10 |
| 7 | | 139 | 143 | | |
| 8 | | 141 | 143 | | |

The path points are identified only by flow point number, but each flow point number appears in column X as many times as the flow point is used by a different path; thus the elements of column X represent path points. It can be seen from the above array that for any path point in column $X$, the right path pointer for $X$ is contained in column $X' + 1$ and the left path pointer (or the relative position of the right path point of $X$ in column X) (or the relative position of the left path point of $X$ in column X) is contained in column $X' - 1$. The path pointers are referred to subsequently by other subroutines, and enable rapid balancing of a line in either direction, starting from any selected flow point.

The step by step operation of the TOPFG subroutine is shown in TABLE 1. In the following discussion of the subroutine, each statement is identified by line number as appears on the print-out.

Line 1. The subroutine is identified as TOPFG and the input and output variables identified.

Line 2. Arrays NPATH, NPNTR and NPNTL are dimensioned as one dimensional arrays.

Line 3. Arrays JV, IV and NSEQ are dimensioned as one dimensional arrays. Array JSEQ is dimensioned as a two dimensional array with a maximum of 1,000 rows and 2 columns. Thus the program is designed to handle a maximum of 1,000 path points.

Lines 4 and 5. The variables L and ISTRT are initialized to zero.

Line 6. This statement directs that all statements down through the statement numbered 10 be performed a total of NUMT times, once for each value of I from 1 to NUMT. The variable NUMT has previously been defined as the number of path points in the network.

Lines 7 and 8. These statements taken together establish a two column matrix array, the left column containing all zeroes and the right column containing the numbers 1 through NUMT.

Line 9. This statement directs that the following statements down through the statement numbered 210 be performed successively for values of N from 1 through NUMT, i.e., once for each path point.

Line 10. Perform statements down through statement number 200 for each path point, by incrementing variable N1.

Line 11. This is an arithmetic "if" statement. Control is directed to the statement numbered 150 if element (N1, 1) of the JSEQ array is zero. If the element is negative or positive control is directed to the statement numbered 200.

Line 12. Statement number 150. Perform statements down through 180 once for each path point, by incrementing variable N2.

Line 13. If element (N2) of the NSEQ array is zero, control is directed to statement 160; if negative or positive, to statement 180.

Line 14. Statement 160. If element N2 of the JV array is equal to element N1 of the IV array, control is directed to statement 200; if not equal, then to statement 180.

Line 15. Statement 180. This is a continue statement, and means literally to continue to the next statement. But if indexed by a do statement, control is returned to that statement until all specified iterations have been performed.

Line 16. The value of the variable L is increased by 1.

Lines 17 – 19. These are merely comment statements, or spaces reserved for comment statements, and do not enter into the operation of the program.

Line 20. An element in the first column of the JSEQ array is set equal to the variable L.

Line 21. Statement 200. This is a continue statement.

Lines 22 – 24. Comment statements.

Line 25. Perform statements down through statement 205 once for each path point, by successively incrementing variable I.

Line 26. If the specified element in column 1 of the JSEQ array is greater than the variable ISTRT, control is directed to statement 204. If less than or equal to, control is directed to statement 205.

Line 27. Statement 204. A specified element of the NSEQ array is set equal to the variable N.

Line 28. Statement 205. A continue statement.

Line 29. The variable ISTRT is set equal to the variable L.

Line 30. If variable NUMT is equal to variable L, control is directed to statement 230; if not equal, then to statement 210.

Line 31. Statement 210. This is a continue statement.

Lines 32 – 34. These are comment statements.

Line 35. Statement 230. Perform the following statements down through statement 100 once for each path point, by successively incrementing variable N.

Line 36. Perform following statements down through 300 once for each path point, by successively incrementing variable N1.

Line 37. An element of the JV array is compared to an element of the IV array. If they are equal, control is directed to statement 240; if not, to statement 300.

Line 38. Statement 240. Element N of the NPATH array is compared to element N1 of the same array. If the two elements are equal, control is directed to statement 250; if not, to statement 300.

Line 39. Statement 250. Element N of the NPNTL array is set equal to a specified element in column 1 of the JSEQ array.

Line 40. This statement directs control to statement 100.

Line 41. Statement 300. This is a continue statement.

Line 42. Statement 100. This is a continue statement.

Lines 43 – 45. Comment statements.

Line 46. Perform the following statements down through 500 once for each path point, by successively incrementing variable N.

Line 47. Perform the following statements down through 400 once for each path point, by successively incrementing variable N1.

Line 48. Element N1 of the JV array is compared to element N of the IV array. If they are equal, control is directed to statement 350; if not, to statement 400.

Line 49. Statement 350. Element N of the NPATH array is compared to element N1. If they are equal, control is directed to statement 375; if not, to statement 400.

Line 50. Statement 375. Element N of the NPNTR array is set equal to the element in row N1, column 1 of the JSEQ array.

Line 51. Control is directed to statement 500.

Line 52. Statement 400. A continue statement.

Line 53. Statement 500. A continue statement.

Line 54. This statement directs that control return to the calling program.

Line 55. This is an "end" statement, and it is used to inform the Fortran compiler that this is the physical end of the source program. It has no effect on the execution of the object program.

The individual statements combine to perform the necessary operations in the following manner. The instructions in lines 6 – 8 establish a two-dimensional work array JSEQ. When completely established, the array consists of two columns and NUMT rows. The left column consists of all zeroes and the right column contains the numbers one through NUMT. This array will be completely established before program control goes to the statement in line 79.

The instructions in lines 9 – 31 assign the path points to neighborhoods. At the beginning N will be set equal to 1 and N1 equal to 1. Element (1, 1) of JSEQ is checked and found to be zero, so statement 150 is performed. Variable N2 is set equal to 1 and the first element of one-dimensional array NSEQ is checked, i.e., check is made to see whether this path point has been assigned to a neighborhood. It will not have been, so then element (1) of array IV is compared to element (1) of JV. They will not be equal so N2 is set equal to 2 and the second path point is examined for neighborhood assignment. It will not yet be assigned so element (1) of IV is compared to element (2) of JV. Now it is possible that a match may be found. If so, variable N1 is increased to 2; JSEQ (2, 1) is examined and found to be zero and control again reaches statement 150. If no match is found, variable L is set equal to 1 and element (1, 1) of JSEQ is set equal to L. Then N1 is increased to 2, and the procedure repeated. During the first iteration of lines 10 through 21 all those path points belonging to the first neighborhood will be detected, and identified by placement of a sequence number L in the appropriate row in column 1 of JSEQ. Control is now at line 25. Variable I is set equal to 1. Variable ISTRT, initially set to zero, is subtracted from element JSEQ (1, 1). The result will be positive only if element (1, 1) was assigned a sequence number L. If the result is not positive, element (2, 1) of JSEQ is compared. As each successive element in column 1 of JSEQ is examined, those which yield a positive result in line 26 are assigned to neighborhood 1 at line 27. When assignment to the first neighborhood is complete, variable ISTRT is set equal to L, for use in successive iterations. It should be apparent that the value of L at this time corresponds to the number of path points that have already been assigned to a neighborhood. In line 30, NUMT is compared to L, thus checking to see if all path points have been assigned to a neighborhood. If not, control is returned to line 9 and N is increased to 2.

The above procedure is repeated until all path points have been assigned to a neighborhood. When they have, program control will be at line 35. Lines 35 – 42 determine the left path pointers. At the beginning, N is set equal to 1 and N1 equal to 1. Element 1 of JV is compared to element 1 of IV, found not to be equal, and N1 is increased to 2; thus element 2 of IV is compared to element 1 of JV. In like manner each element of IV is compared to the first element of JV. When a match is found, statement 240 checks to see if these elements are the same path point. If so, the left path pointer is set equal to the appropriate element in column 1 of JSEQ, and N is increased by 1 and the cycle repeated. If the elements were not the same path point, N1 would be increased. During this process a left path pointer will be assigned for all path points except those at the beginning of the lines.

Similarly, the right path pointers are assigned by lines 46 through 53. The only difference in principle is that now each element of JV is compared to each element of IV, for reasons that should now be obvious.

The manufacturing line network has been partially ordered with the flow points in a multi-product path and assigned to a neighborhood.

TI-3972

TABLE 1
TOP FLAG (TOPFG)

@ ELT TOPFG,1,700306, 38454 , 1

```
      SUBROUTINE TOPFG(JSEQ,JV,IV,NSEQ,NPNTR,NPNTL,NPATH,NUMT)
      DIMENSION NPATH(1),NPNTR(1),NPNTL(1)
      DIMENSION JSEQ(1500,2),JV(1),IV(1500,2),NSEQ(1)
      L = 0
      ISTRT = 0
      DO 10 I=1,NUMT
      JSEQ(I,1) = 0
   10 JSEQ(I,2) = I
      DO 210 N = 1,NUMT
      DO 200 N1 = 1,NUMT
      IF(JSEQ(N1,1)) 200,150,200
  150 DO 180 N2 = 1,NUMT
      IF(NSEQ(N2)) 180,160,180
  160 IF(JV(N2) - IV(N1,1)) 180,200,180
  180 CONTINUE
      L = L + 1
C
C     SET TOPOLOGICAL SEQUENCE NUMBER
C
      JSEQ(N1,1) = L
  200 CONTINUE
C
C     DETERMINE THE NEIGHBORHOOD
C
      DO 205 I = 1,NUMT
      IF(JSEQ(I,1)-ISTRT) 205,205,204
  204 NSEQ(I) = N
  205 CONTINUE
      ISTRT = L
      IF(NUMT - L) 210,230,210
  210 CONTINUE
C
C     DETERMINE PATH POINTERS (LEFT)
C
  230 DO 100 N = 1,NUMT
      DO 300 N1 = 1,NUMT
      IF(JV(N)-IV(N1,1)) 300,240,300
  240 IF(NPATH(N)-NPATH(N1)) 300,250,300
  250 NPNTL(N) = JSEQ(N1,1)
      GO TO 100
  300 CONTINUE
  100 CONTINUE
C
C     DETERMINE PATH POINTERS (RIGHT)
C
      DO 500 N = 1,NUMT
      DO 400 N1=1,NUMT
      IF(JV(N1)-IV(N,1)) 400,350,400
  350 IF(NPATH(N)-NPATH(N1)) 400,375,400
  375 NPNTR(N) = JSEQ(N1,1)
      GO TO 500
  400 CONTINUE
  500 CONTINUE
      RETURN
      END
```

AD10TOPF

RANDOM (RANDM) (TABLE 2)

This subroutine calculates rework-in and then recalculates yields and rework-out. It also calculates unit material and labor costs, cumulative path yields and true manufacturing overhead rates.

For each path within the network the program simulates the flow of 10,000 devices. As each device enters the first flow point of the path, a number between 0.0 and 0.999 is retrieved from a random number generator. Based on a comparison of this number to the input values of yield and rework-out percentage, the device will proceed to the next flow point, proceed to a rework flow point, or be scrapped. Each device proceeds down the path until it is scrapped or reaches the end of the path, then the next device enters the path. After all 10,000 devices have been simulated the total units of rework-in at each flow point is known. The subroutine then calculates a very accurate rework-in percentage for each flow point. Accurate rework-in percentages are critical; errors would have a cumulative effect as the line was being balanced. After rework-in percentages have been calculated, the program calculates new values of yield and rework-out percentage for each flow point. The cumulative path yield is the ratio of output units to input units for the path.

The input data includes incremental material costs at each flow point. This cost is the value of material added to the product at the flow point. The material cost at each flow point is then calculated as the cost of entered material divided by the number of good units that proceed to the next sequential flow point, thus including the cost of scrapped material.

The unit labor cost is calculated according to the following equation:

$$ULC = \frac{VOL \times ALR}{LS \times LP}$$

where:

ULC is unit labor cost,
VOL is flow point volume,
ALR is average labor rate,
LS is labor standard, and
LP is labor performance. Thus additional labor costs are added to rework material. Manufacturing overhead, quality control, and repair and maintenance costs are all treated as a function of direct labor.

The subroutine itself is in TABLE 2.

TI-3972

TABLE 2
RANDOM (RANDM)

```
ELT RANDM,1,700414, 62613    , 1

C **********************************************************  0105CALS
C *           SUBROUTINE  -  RANDM  -        A              * 0110CALS
C *                                                         * 0115CALS
C *                                                         * 0120CALS
C *                                                         *-0125CALS
C *                                                         * 0130CALS
C **********************************************************  0135CALS
      SUBROUTINE RANDM                                         0140CALS
C *                                                            0785AUDI
C **********************************************************  0725AUDI
C *   COMMON BLOCK FOR AUDIT/MUFLO                             0735AUDI
C *                                                            0740AUDI
      COMMON/BLK1/                                             0745AUDI
     *CODE,PLANT,FCC,DEPT,DDTE,MF,QC,RM,IS2,IS3,IS4,IOPT,      0750AUDI
     *PNUM,PNAME,MFCOST,QCCOST,RMCOST,PCYLD,                   0755AUDI
     *PPATH,CFPID,CFDES,CPFP,PRWKI,YLD,PSTD,SPERF,
     *NBHD,CFPS3,SCAPI,SCAPA,SUTIL,STDM,STDL,MFOH,
     *FSTA,SDESC,SQFTI,CMCHI,SQFTA,CMCHA,SHRS,NMACH            0770AUDI
C *                                                            0775AUDI
C **********************************************************  0780AUDI
C *                                                            0950AUDI
C *   INTEGER FOR AUDIT/MUFLO                                  0840AUDI
C *                                                            0845AUDI
      INTEGER                                                  0850AUDI
     *CODE(3),PLANT(3),FCC(3),DEPT(3),DDTE(3),CFPS3(1500),     0860AUDI
     *IOPT(7),PNUM(30),PNAME(30,3),PPATH(1500),CFPID(400),     0865AUDI
     *CFDES(400,3),CPFP(1500),SPERF(1500),NBHD(1500),          0870AUD
     *NPNTL(1500),NPNTR(1500),RWPNT(1500),SUTIL(1500),         0875AUDI
     *FSTA(300),SDESC(300,3),SQFTI(300),SQFTA(300),NMACH(300),
     *FPID(1500)
C **********************************************************  0895AUDI
C *                                                            0900AUDI
C *   REAL FOR AUDIT/MUFLO                                     0905AUDI
C *                                                            0910AUDI
      REAL                                                     0915AUDI
     *MF,MFCOST(30),QCCOST(30),RMCOST(30),PCYLD(30),           0920AUDI
     *PRWKI(1500),YLD(1500),PSTD(1500),SCAPA(1500),SCAPI(1500),
     *STDM(1500),STDL(1500),CMCHA(300),
     *SHRS(300),CMCHI(300)                                     0935AUDI
C *                                                            0940AUDI
C *                                                            0730AUDI
C *   COMMON BLOCK FOR AUDIT SUBROUTINES ONLY                  0790AUDI
C *                                                            0795AUDI
      COMMON/BLK2/                                             0800AUDI
     *CC2,CC3,CC4,CC5,CC6,CC7,CC8,CC9,CC21,IWTR,IRDR,          0805AUDI
     *IC2,IC3,IC4,IC5,IC6,IC7,IC8,IC9,IC21,                    0810AUDI
     *PLCDE,FCDE,DCDE,JSEQ,IDUM2,
     *M3,M4,ICC23,ISW,ALV,LABUTL,PRWKO,RWPNT,
     *MCOST,LCOST,NPNTR
C *                                                            0825AUDI
C **********************************************************  0830AUDI
C *                                                            0835AUDI
C *   INTEGER FOR AUDIT ONLY                                   0955AUDI
C *                                                            0960AUDI
      INTEGER                                                  0965AUDI
     *CC2,CC3,CC4,CC5,CC6,CC7,CC8,CC9,CC21,
     *IWTR,IRDR,PLCDE,FCDE,DCDE,JSEQ(1500,2),IDUM2(1500,3),
     *MFOH(1500)
C *
C **********************************************************
C *
C *
```

TABLE 2 (CONT'D)

```
C *   REAL FOR AUDIT
      REAL PRWKO(1500),ARR(10),MCOST(30),LCOST(30)
C *
C **************************************************************
C *
C *
C **************************************************************
C *
C *
C *
C *   INTEGER FOR RANDOM
      INTEGER ARRAY(3,1500)
C *
C **************************************************************
C *
C *
      EQUIVALENCE(MFOH,FPID),(IDUM2(1,3),NPNTL(1))
C *
C *****                                                              0220CALS
C *   SIGN ON                                                        1405CALS
   10 WRITE(IWTR,11)                                                 1410CALS
   11 FORMAT(//,1X,'ENTER RANDM')
C *                                                                  1420CALS
C *   AUDIT CONTROL CALL CODE = 2 SKIP COMPLETION CODE CHECKS         1425CALS
      IF(CC9-2) 20,60,20
C *                                                                  1435CALS
C *   CHECK COMPLETION CODE IC7 MUST = 1                             1440CALS
   20 IF(IC7-1) 30,60,30
   30 IC8=9
      WRITE(IWTR,31) IC7,IC8
   31 FORMAT(5X,' MSG=1 ',I1,2X,I1)                                  1460CALS
      GO TO 931                                                      1465CALS
C **************************************************************
C *
C *   USE RANDOM NUMBERS TO CALCULATE:      D ****  99.9 PERCENT
C *      REWORK-IN           PRWKI   PP*       * *
C *      REWORK-OUT          PRWKO   PP      C ****  YLD + PRWKO %
C *      YIELDS              YLD     PP        * *
C *      UNIT MATERIAL COST  STDL    PP        * *
C *      UNIT LABOR COST     PSTD    PP      B ****  YLD %
C *      MANUFACTURING OH COST MFCOST P        * *
C *      QC OH COST          QCCOST  P         * *
C *      RETURN MATL. OH COST RMCOST P         * *
C *      CUM YIELD           PCYLD   P         * *
C *      TRUE MF OH RATE     MF      N         * *
C *      THE METHOD USED IS DESCRIBED          * *
C *      BELOW AND TO THE RIGHT              A ****  00.0 %
C *
C *      RX = RANDOM NO GENERATED       IF RX L B    PASSES
C *           BETWEEN .000 AND .999     IF RX GE B AND L C REWORK-OUT
C *           INCLUSIVE AT ANY PATH     IF RX GE C   SCRAP
C *           POINT NOT 100% YIELD
C *
C *   *
C *   PP = PATH POINT LEVEL
C *   P  = PATH
C *   N  = NETWORK LEVEL
C *
C *   10,000 UNITS (OR MORE IF REQUIRED) ARE ENTERED AT FRONT OF EACH
C *   PATH AND RESULTS IN THE FOLLOWING TABULATION : (EXAMPLE)
C *                          ARRAY
C *                    ( 1        2         3 )
C *      PATH POINT *  PASSED   REWORKED   SCRAP   * REWORK
C *                 *           (SKIPPED)          *   % POINTER
C *   ARRAY(3,1500) *                              *
C *   (YLDS)        *                              *
C *   1.0    10     *  10000       0         0     *
C *    .99   15     *   9887       0       113     *
C *    .98   25     *   9708       0       179     *
C *   1.0    30     *  13517       0         0     *
C *    .95   40     *  12865       0       652     *
C *    .70   50     *   9056     3809         0    * 30%   30
C *   1.0    60     *   9056        0         0    *
C *   1.0    70     *   9056        0         0    *
C *   1.0   999     *   9056        0         0    *
C *
C *   INCREMENTAL MATERIAL COST (STDL( )) ADDED TO VARIABLE
C *   MCOST(PATH) THROUGH DRIVING 10000 THRU PATH. OPTION
C *   CONTROLS ADDING COST DURING REWORK LOOP.
C *
```

TABLE 2 (CONT'D)

```
C *    CALCULATIONS PERFORMED USING THE ABOVE SIMULATION IS
C *    DESCRIBED BELOW:
C *
C *        K = INDEX 1ST PP   IM = INDEX LAST PP ON EACH PATH
C *    1. CALCULATE REWORK-IN
C *        J = INDEX OF PP WHERE 1 OR MORE REWORK-OUTS GO TO
C *        TEMP1 = SUM ALL REWORK-OUTS POINT TO THIS PP SUM(ARRAY(2,I))
C *        TEMP2 = PASSED PREVIOUS FP    (ARRAY(1,L))
C *        PRWKI(J) = TEMP1 / (TEMP2 + TEMP1)
C *
C *    2. RECALCULATE YIELDS AND REWORK-OUT
C *        J = INDEX OF PP ON PATHS
C *                TEMP1 = PASSED    ARRAY(1,J)
C *                TEMP2 = REWORK    ARRAY(2,J)
C *                TEMP3 = SCRAP     ARRAY(3,J)
C *
C *       YLD(J) = TEMP1 / (TEMP1 + TEMP2 + TEMP3)
C *       PRWKO(J)= TEMP2 / (TEMP1 + TEMP2 + TEMP3)
C *
C *    3. CALCULATE UNIT MATERIAL AND LABOR COST
C *        MCOST(PATH) = MCOST(PATH) / APPAY(1,IM)
C *
C *        STDL(I) = (PASSED+REWORK+SCRAP)*ALV /(PSID(I)*SPERF(I))
C *        ACC = ACC + STDL(I)
C *        STDL(I) = STDL(I) / (PASSED + REWORK-OUT)
C *             (INCREMENTAL UNIT LABOR COST AT EACH PP)
C *        TEMP1 = PASSED LAST PP ON PATH (IE, GOOD UNITS OUT)
C *        LCOST(PATH) = (ACC / TEMP1) * LABUTL (LABOR UTIL)
C *
C *    4. CALCULATE CUMULATIVE YIELD FOR PATH
C *
C *        PCYLD(PATH) = WHAT WENT OUT / WHAT CAME IN
C *                    = ARRAY(1,IM)   / ARRAY(1,K)
C *
C *    5. CALCULATE TRUE MF OH RATE MFCOST, QCCOST, RMCOST
C *        TEMP5 = SUM(PASSED+REWORK+SCRAP) PP/THIS PATH
C *        TEMP6 = SUM((PASSED+REWORK+SCRAP)*MF OR MFOH) PP/THIS P
C *          MF = TEMP6 / TEMP5
C *
C *  MFCOST(PATH) = LCOST(PATH) * MF
C *  QCCOST(PATH) = LCOST(PATH) * QC
C *  RMCOST(PATH) = LCOST(PATH) * RM
C *
C *        IF IOPT(7) = 0 M = 10000
C *        IF IOPT(7) = 1 M = 30000
C *        IF IOPT(7) = 2 M = 60000
C *        IF IOPT(7) = 3 M = 100000
   60 M=10000
      IF(IOPT(7)-1) 61,63,61
   61 IF(IOPT(7)-2) 62,67,62
   62 IF(IOPT(7)-3) 65,68,65
   67 M=60000
      GO TO 65
   68 M=100000
      GO TO 65
   63 M=30000
   65 ISW1=0
      N=0
      KK = M/10
      DO 972 I=1,IS2
  972 MCOST(I) = 0.0
      TIME = 0.0
      TEMP5 = 0.0
      TEMP6 = 0.0
      TIM  = 0.0
      IF(LABUTL) 72,73,72
   72 UTIL=LABUTL
      UTIL=UTIL/1000.
      GO TO 70
   73 UTIL = 1.0
C ***********************************************************
C ***********************************************************
C *
C *    START SIMULATION FOR EACH PATH IN ORDER 1-30
C *
C ***********************************************************
   70 DO 390 LL=1,IS2
      CALL KLOCK
```

TABLE 2 (CONT'D)

```
C *      ZERO ARRAY(3,IS3)
         DO 75 JJ=1,IS3
         ARRAY(1,JJ)=0
         ARRAY(2,JJ)=0
      75 ARRAY(3,JJ)=0
         KJ = 0
C *
C *     FIND ENDING POINT THIS PATH
C *
         DO 77 J=1,IS3
         IF(PPATH(J)-LL) 77,76,77
      76 IF(NPNTR(J)) 77,79,77
      77 CONTINUE
         IC8 = 5
         WRITE(IWTR,78) LL
      78 FORMAT(2X,' MSG=2 ',I5)
         GO TO 931
C *
C *     IM = ENDING PATH POINT INDEX FOR THIS PATH
C *
      79 IM = J
C *
C *     FIND STARTING POINT THIS PATH
C *
         DO 85 J=1,IS3
         IF(PPATH(J)-LL) 85,80,85
      80 IF(NPNTL(J)) 85,90,85
      85 CONTINUE
         IC8=5
         WRITE(IWTR,87) LL
      87 FORMAT(5X,'MSG=3',2X,I5)
         GO TO 931
      90 I=J
C *
C *
C *     COMPUTE LOCATIONS OF RWPNT'S
C *
C * PRWKO > 0 ADD YLD USE TO COMPARE AGAINST RX
         DO 99 K=1,IS3
         IF(PPATH(K)-LL) 99,91,99
      91 IF(RWPNT(K)) 92,99,92
      92 DO 96 MM=1,IS3
         IF(IDUM2(MM,1)-RWPNT(K)) 96,93,96
      93 IF(PPATH(MM)-LL) 96,94,96
      94 IDUM2(K,2) = MM
         PRWKO(K) = PRWKO(K) + YLD(K)
         GO TO 99
      96 CONTINUE
     180 IC8 = 5
         WRITE(IWTR,185) PPATH(K),IDUM2(K,1)
     185 FORMAT(5X,'MSG = 4 ',2I10)
         GO TO 931
      99 CONTINUE
C *
C *     K = BEGINNING PATH POINT INDEX FOR THIS PATH
C *
         K=1
         ISEED=15001
C
C
C
C     IF MATERIAL OPTION IS ON IOPT(1)=1 USE THE CODING AT STATEMENT
C     1100 TO ADVOID IF STATEMENTS ADD MAIL ON REWORK
C
C
C
         IF(IOPT(1)-1) 100,1100,100
C
C
C *
C *     START SIMULATION FP HAVE 100 PERCENT YLD GO TO 250
C *
     100 IF(ISW1-1) 107,105,107
     105 IF(NBHD(I)-INBHD) 106,108,108
C *     106 BRANCH RWOUT BACK TO FP SENT OUT OR BEYOND ON SKIP LOOP
C *     108 DO NOT ADD MATERIAL COST IN UNTIL 106 BRANCH
     106 ISW1 = 0
     107 MCOST(LL) = MCOST(LL) + STDM(I)
     108 IF(YLD(I)-1.00) 110,250,110
```

TABLE 2 (CONT'D)

```
C *
C *    GENERATE RANDOM NUMBER
C *
  110 RX = RANDOM(ISEED)
C *
C *    RX G YLD  YES (SCRAP OR REWORK) GO TO 160
C *
  130 IF(RX-YLD(I)) 250,160,160
C *
C *    RX G YLD + PRWKO  YES SCRAP GO TO 230
C *
  160 IF(RX-PRWKO(I)) 170,230,230
C *
C *    REWORK ADD +1 TO ARRAY(2,I)
C *
  170 ARRAY(2,I) = ARRAY(2,I) + 1
  175 ISW1 = 1
  176 INBHD = NBHD(I)
C *
C *    PICK UP INDEX OF FP REWORK POINTER FROM TEMP ARRAY
C *
      I=IDUM2(I,2)
      GO TO 100
C *
C *    SCRAP ADD +1 TO ARRAY(3,I)
C *
  230 ARRAY(3,I) = ARRAY(3,I) + 1
      GO TO 280
C *
C *    YIELD THIS FP IS 100 PERCENT ADD 1 TO ARRAY(1,I)
C *
  250 ARRAY(1,I) = ARRAY(1,I) + 1
      IJ = NPNTR(I)
      IF(IJ) 260,280,260
  260 I = JSEQ(IJ,2)
      GO TO 100
C *
C *    IF 0 THEN RIGHT PATH POINTER POINTED TO END OF LINE GO TO 280
C *    IF NOT THEN STILL FOLLOWING THIS RANDOM NO.
C *
  280 I = K
      N=N+1
      ISW1 = 0
      IF(N-KK) 295,293,293
C *
C *    ROUTINE TO LIST ARRAY(1,2,3) AT N=10000 IF ICC23=1
C *
  290 CALL KLOCK(TIM)
      TIME = TIME + TIM
      WRITE(IWTR,281) TIM,TIME
  281 FORMAT(1X,2F7.2)
      IF(ICC23-1) 300,292,300
  292 JK = K
  294 WRITE(IWTR,291) KK,ARRAY(1,JK),ARRAY(2,JK),ARRAY(3,JK),
     1RX,IDUM2(JK,1),CPFP(JK),YLD(JK),RWPNT(JK),PRWKO(JK),PRWKI(JK)
      JK = NPNTR(JK)
      IF(JK) 296,300,296
  296 JK = JSEQ(JK,2)
      GO TO 294
  291 FORMAT(5X,I7,2X,3(2X,I6),2X,F4.3,2(2X,I4),2X,F5.3,2X,I5,
     *2X,2(2X,F6.3))
  293 KJ = KJ + 1
C *    ACCULUMATE PCYLDS EACH M/10 ITERATIONS FOR PRINTING
      TEMP1 = ARRAY(1,IM)
      TEMP2 = N
      ARR(KJ) = TEMP1 / TEMP2
      KK = KK + M/10
C *
C *    DOES N = M TIMES
C *
  295 IF(N-M) 100,290,290
C *
C *    PATH FOLLOWED M TIMES CALCULATE ALL VARIABLES FOR THIS PATH
C *
  300 TEMP1 = ARRAY(1,IM)
      TEMP2 = M
      PCYLD(LL) = TEMP1 / TEMP2
C *
C *    TAKE EACH FP THIS PATH SCAN ALL FPS THIS PATH LOOKING FOR
```

TABLE 2 (CONT'D)

```
C *    RWPNT THIS FP - SUM TEMP1=TEMP1QARRAY(1,JJ). USE NPNTR
C *       CALCULATE  PRWKI(J)
C *       CALCULATE  PRWKO(J) AND YLD(J) IF PRWKO PRESENT
C *
   305 J=K
       TEMP1=0
   310 JJ=K
   312 IF(IDUM2(J,1)-RWPNT(JJ)) 325,320,325
   320 TEMP1 = TEMP1 + ARRAY(2,JJ)
   325 IJ = NPNTR(JJ)
       IF(IJ) 315,330,315
   315 JJ = JSEQ(IJ,2)
       GO TO 312
C *
C *    SCAN  COMPLETED THIS PATH  TEMP1 = 0  NO REWORK IN THIS FP
C *
   330 IF(TEMP1) 335,350,335
   335 IJ = NPNTL(J)
       IF(IJ) 340,336,340
   336 TEMP2 = M
       GO TO 342
   340 IJ = JSEQ(IJ,2)
       TEMP2 = ARRAY(1,IJ)
   342 PRWKI(J) = TEMP1 / (TEMP2 + TEMP1)
C *
C *    ADJUST YLD ON FP REWORK OUT TO FIT REWORK OUT PERCENT
C *      CALCULATED.  YLD(J) = Y/Y+X+Z  WHERE.
C *         Z = ARRAY(3,J) SCRAP
C *         Y = ARRAY(1,J) PASS
C *         X = ARRAY(2,J) REWORK
C *    ADJUST  REWORK OUT   RPWKO(J) = X/X+Y+Z
C *
   350 TEMP1 = ARRAY(1,J)
       TEMP2 = ARRAY(2,J)
       TEMP3 = ARRAY(3,J)
       IF(TEMP1) 355,354,355
   354 TEMP1 = 1.0
       ARRAY(1,J) = 1
       IF(TEMP2-1.0) 352,352,351
   351 TEMP2 = TEMP2 - 1.0
       ARRAY(2,J) = ARRAY(2,J) - 1
       GO TO 355
   352 IF(TEMP3) 353,359,353
   353 TEMP3 = TEMP3 - 1.0
       ARRAY(3,J) = ARRAY(3,J) - 1
       GO TO 355
   359 WRITE(IWTR,358) LL
   358 FORMAT(1X,'***** THIS NETWORK MUST BE RERUN  *****',/,
      *5X,'PUT A (SEE BELOW) IN CC 80 OF THE TYPE 1 NETWORK CARD',/,
      *5X,' AND RERUN JOB - ANY TIME THIS NETWORK IS RERUN THIS',/,
      *5X,'  OPTION MUST BE INCLUDED IN THE HEADER CARD  AA NOTE',/,
      *9X,'THE NETWORK DECK AS SUCH **** PATH - ',I2,/,
      *15X,'CC80 = 1  - 30,000',/,
      *15X,'CC80 = 2  - 60,000',/,
      *15X,'CC80 = 3  -100,000')
       IC8=5
       GO TO 930
   355 YLD(J) = TEMP1 / (TEMP1 + TEMP2 + TEMP3)
   356 IF(PRWKO(J)) 357,362,357
   357 PRWKO(J) = TEMP2 / (TEMP1 + TEMP2 + TEMP3)
   362 IF(ICC23-1) 370,360,370
   360 WRITE(IWTR,361) IDUM2(J,1),YLD(J),PRWKI(J),PRWKO(J)
   361 FORMAT(1X,I4,2X,3(2X,F10.8))
   370 IJ = NPNTR(J)
       TEMP1 = 0
       IF(IJ) 375,380,375
   375 J = JSEQ(IJ,2)
       GO TO 310
   380 ISW1 = 0
       N = 0
       KK= M/10
       IF(ICC23-1) 800,384,800
   384 WRITE(IWTR,422) ARR
   422 FORMAT(5X,10(2X,F5.3))
   800 MCOST(LL) = MCOST(LL) / ARRAY(1,IM)
       ACC = 0.0
C *    CALCULATE LABOR COST / UNIT
C *
C *    STDL(I) = (PASSED+REWORK+SCRAP)*ALV)/(PSTD(I)*SPERF(I)
```

TABLE 2 (CONT'D)

```
C *
C *    ACC = ACC + STDL(I)
C *
C *    STDL(I) = STDL(I) / (PASSED + REWORK)
C *
C *
       I = K
   805 TEMP1 = ARRAY(1,I)
       TEMP2 = ARRAY(2,I)
       TEMP3 = ARRAY(3,I)
       TEMP4 = TEMP1 + TEMP2 + TEMP3
       TEMP5 = TEMP5 + TEMP4
       TEMP7 = MF
       TMFOH=MFOH(I)
       IF(MFOH(I).NE.0)TEMP7=TMFOH/100.
       TEMP6=TEMP6+(TEMP7*TEMP4)
   815 IF(SPERF(I)) 825,820,825
   820 TEMP4 = 1.0
       GO TO 830
   825 TEMP4 = SPERF(I)
       TEMP4 = TEMP4 / 100.
C *
   830 IF(IOPT(2)-1) 833,832,833
   832 IF(STDL(I)) 838,833,838
   833 STDL(I) = ALV
   838 STDL(I) = ((TEMP1 + TEMP2 + TEMP3) * STDL(I) )/ (PSTD(I) * TEMP4)
       ACC = ACC + STDL(I)
       STDL(I) = (STDL(I) / (TEMP1 + TEMP2)) * UTIL
C *
C *    RIGHT PATH POINTER
C *
       I = NPNTR(I)
       IF(I) 840,850,840
   840 I = JSEQ(I,2)
       GO TO 805
   850 LCOST(LL) = (ACC / TEMP1) * UTIL
C *
C *    END LABOR CALCULATION DUMP LCOST WITH MATL DUMP AFTER PATH RPT
C *
       GO TO 390
C
C
C
C     ROUTINE TO DRIVE 10,000 NOS IF MATL SWITCH IS ON
C
C
C
  1100 MCOST(LL) = MCOST(LL) + STDM(I)
       IF(YLD(I)-1.00) 1120,1250,1120
  1120 RX = RANDOM(ISEED)
       IF(RX-YLD(I)) 1250,1160,1160
  1160 IF(RX-PRWK0(I)) 1170,1230,1230
  1170 ARRAY(2,I) = ARRAY(2,I) + 1
       I = IDUM2(I,2)
       GO TO 1100
  1230 ARRAY(3,I) = ARRAY(3,I) + 1
       GO TO 1280
  1250 ARRAY(1,I) = ARRAY(1,I) + 1
       IJ = NPNTR(I)
       IF(IJ) 1260,1280,1260
  1260 I = JSEQ(IJ,2)
       GO TO 1100
  1280 I = K
       N = N + 1
       IF(N-KK) 1295,1293,1293
  1293 KJ = KJ + 1
       TEMP1 = ARRAY(1,IM)
       TEMP2= M
       ARR(KJ) = TEMP1 / TEMP2
       KK = KK + M/10
  1295 IF(N-M) 1100,290,290
   390 CONTINUE
C *
C *    CALCULATE NEW MF FACTOR
C *
       MF = TEMP6 / TEMP5
C *
C ***************************************************
C *
C *
```

```
C *    CALCULATIONS  COMPLETED                                                  2165CALS
C *                                                                             2180CALS
      400 WRITE(IWTR,401) IS2,IS3,TIME
      401 FORMAT(1H ,20X,'PATHS= ',I2,' PP= ',I4,' SIM TIME= ',F8.2)
      930 DO 980 I=1,IS3
          IF(NPNTR(I)) 980,950,980
      950 J=PPATH(I)
          MFCOST(J) = LCOST(J) * MF                                             **-2
          QCCOST(J) = LCOST(J) * QC
          RMCOST(J) = LCOST(J) * RM
      980 CONTINUE
          IF(IC8) 931,935,931
      935 IC8 = 1
      931 WRITE(IWTR,932) IC8
      932 FORMAT(1H1,5X,' END RANDM COMP,CODE ',I1)                             41405ALS
          DO 1400 I=1,IS3
     1400 FPID(I)=IDUM2(I,1)
          RETURN                                                                41455ALS
          END
```

MAIN (TABLE 3)

The MAIN subroutine is the controlling program. It makes use of the partial ordering placed on the manufacturing line network by subroutine TOPFG to balance the entire network. First the control cards are read in and the input data is retrieved. One of the control cards will identify the run to be made as either a Dynamic Line Balancing run or a Capacity Simulation run. The steps performed for each type run are listed below, with the program performing each step in parenthesis. Other subroutines called in by the MAIN subroutine are shown with the corresponding table number. These subroutines are discussed later in this description.

CAPACITY SIMULATION a. Calculate the output required from each path point on each product path line in order to meet the specified line demands. (MAIN)
b. Calculate the volume required for each path point. (MAIN)
c. Calculate and sum path point utilization for each flow point. (MAIN)
d. Reduce the input of the bottleneck flow points so that utilization will be less than 100 percent. (RESTA TABLE 6 or MUS - TABLE 7)
e. Successively add equipment required to meet specified demands and print reports. (ADMCH - TABLE 8)

Capacity Simulation

Step a. Beginning with the desired output from each product path line, the output required from each path point on each line is calculated, taking into consideration the rework-out and scrap percentages at each path point. Thus each product path line is balanced irrespective of all constraints. This step is performed for each path point in the network before the next step is performed.

Step b. From the information obtained in step a the desired volume of each path point within a flow point is calculated. This calculation consists of summing the number of units of useful output, rework-out and scrap. Volume is specified in units per hour.

Step c. The utilization of each path point within a flow point is calculated and the sum is taken as flow point utilization. Path point utilization is the ratio of path point volume to flow point capacity, where flow point capacity is the input value of maximum units per hour that can be processed at the flow point.

Step d. The equipment capacity constraint is now taken into account. If flow point utilization in step c was greater than 100 percent, the input to each path point within the flow point will be reduced accordingly. When a bottleneck flow point is detected it is first examined to see if it belongs to a multi-use station, i.e., a station used by more than one flow point. If not, then subroutine RESTA (TABLE 6) is called, which ratios down path point inputs and drives this achievable output to the end of the line. If it was a multi-use station, then subroutine MUS (TABLE 7) is called. This subroutine will locate the first flow point using this multi-use station before ratioing down path point inputs and driving the achievable output to the end of the line.

Step e. For each combination of line demands specified by the control cards, the equipment required to rebalance the line is added and output reports are printed. The output reports include information as to added equipment and required additional people and floor space, and the costs associated with each of these factors.

The routine in TABLE 3 is a specific embodiment of the capacity simulation.

The Dynamic Line Balancing is carried out in the following manner:

DYNAMIC LINE BALANCING a. Calculate the output required from each path point on each line in order to meet the specified line demands. (MAIN)
b. Read in actual work in process (WIPIN — TABLE 4)
c. Allocate the actual work in process at each flow point to the respective path points. (ALLOC — TABLE 5)
d. Repeat step a. (MAIN)
e. Calculate the volume required for each path point. (MAIN)
f. Calculate and sum path point utilization at each flow point. (MAIN)
g. If flow point utilization is greater than 100 percent, ratio down path point inputs and rebalance line (RESTA - TABLE 6 or MUS — TABLE 7)
h. Check for labor constraints and rebalance line if required. (ASSGN — TABLE 9)
i. Calculate cycle times. (CTIME — TABLE 10)
j. Print output reports. (OUTPT) — TABLE 11)

Dynamic Line Balancing

Step *a*. Identical to step a for Capacity Simulation.

Step *b*. The actual work in process at each flow point, as specified in the control cards, is read in. The desired level of inventories at the path point level is also read in.

Step *c*. The actual work in process at each flow point is allocated to the path points within the flow point in the same ratio as the desired work in process levels.

Step *d*. The output from each path point in the network must now be recalculated. At those path points at which actual work in process is less than desired, the work in process will be built up to the desired level in the length of time specified in the control cards, thus increasing the demand on the previous flow point. At those path points at which actual work in process exceeds desired, the excess work in process will be used up in the time specified.

The steps *a–d* are performed for the entire network at each step. Steps *e–g* are performed cyclically in neighborhood sequence.

Step *e*. Identical to step b for Capacity Simulation.

Step *f*. Identical to step c for Capacity Simulation.

Step *g*. Identical to step d for Capacity Simulation.

Step *h*. The network will now be balanced with respect to labor constraints. If the number of people assigned to man the lines is inadequate to produce the number of units achievable as of step g, the input to the path points within bottleneck stations are reduced accordingly, and the new achievable outputs are driven to the end of the line. The result is a network balanced with respect to equipment and labor constraints.

Step *i*. The cycle time for each product line is calculated. Cycle time is that time required from the initial process step to the emergence of a finished product. It should be apparent that cycle time can be reduced by reducing excess work in process.

Step *j*. Output reports are printed to reveal the information generated.

TI-3972

TABLE 3
MAIN

```
@ ELT MAIN,1,700403, 58730     , 1

SUBROUTINE MAIN
C                                                                               MAIN
C**********************************************************************
C**********************************************************************
C**********************************************************************        MAIN
C*     MAIN IS THE CONTROLLING PROGRAM.   ITS PURPOSES ARE:         *    MAIN
C*     CALL SIMIN TO READ A SET OF CAP SIM CONTROL CARDS            *    MAIN
C*     CALL DSKIN TO RETRIEVE NETWORK INPUT                         *    MAIN
C*     CALCULATE PLANNER'S RATES(PLFLO) FOR EACH PATH POINT         *    MAIN
C*     IF A DLB RUN CALL WPIN AND ALLOC TO CALCULATE AND ALLOCATE   *
C*     ACTUAL WORK IN PROCESS THEN RECALCULATE PLANNER'S RATES.     *
C*     CALCULATE VOLUME REQ'D OF EACH PATH POINT(PFLO)              *    MAIN
C*     CALCULATE AND SUM P.P. UTILIZATION(PPUTL) FOR THIS F.P.      *    MAIN
C*     IF F.P. UTILIZATION(UTL) > 100 CALL RESTA                    *    MAIN
C*     IF THIS IS A MULTIUSE STATION CALL MUS                       *    MAIN
C*     IF CAPACITY SIMULATION RUN CALL ADMCH TO PRINT A REPORT      *
C*     IF DLB RUN CALL ASSGN, CTIME, THEN OUTPT                     *
C*                                                                  *
C*                                                                  *
C*     DETAIL AS TO HOW THE CONCEPT OF NEIGHBORHOODS IS DERIVED     *
C*     AND USED TO BALANCE THE NETWORK IS FOUND IN AUDIT PROGRAM    *
C*     NAMED TOPFLG                                                 *
C*                                                                  *
C*                                                                  *
C*                                                                  *
C**********************************************************************
C**********************************************************************
C**********************************************************************        MAIN
C                                                                               MAIN
C                                                                         0105MAIN
C**********************************************************************  01   MAIN
C**********************************************************************  01   MAIN
C**********************************************************************  0110MAIN
C*     IN 'MAIN' AND MOST OF SIMULATION SUBROUTINES THE FOLLOWING   *  0115MAIN
C*     SUBSCRIPTS HAVE A SPECIAL MEANING. ALL OTHERS HAVE NO        *  0120MAIN
C*     PERMANENT MEANING UNLESS OTHERWISE STATED                    *  0125MAIN
C*                                                                  *  0130MAIN
C*     J       POSITION WITHIN THE NETWORK    (JSEQ)                *  0135MAIN
C*                                                                  *  0140MAIN
C*     K       VALUE OF (J-1). IT IS USED TO DETERMINE 'L'          *  0145MAIN
C*                                                                  *  0150MAIN
C*     L       RELATIVE POSITION OF WHERE YOU ARE FROM START OF     *  0155MAIN
C*             NBRHD                                                *  0160MAIN
C*                                                                  *  0165MAIN
C*     JJ      POSITION IN NETWORK TO OBTAIN NUMBER OF THE F.P.     *  0170MAIN
C*             BEING PROCESSED                                      *  0175MAIN
C*                                                                  *  0180MAIN
C*     JJJ     POSITION IN NETWORK TO OBTAIN NUMBER OF THE F.P.     *  0185MAIN
C*             GOING THRU UTILIZATION SUMMARY ROUTINE               *  0190MAIN
C*                                                                  *  0195MAIN
C*     WFLAG(L)                                                     *  0205MAIN
```

TABLE 3 (CONT'D)

```
C*                                                                      *     0210MAIN
C*      WHEN:   =0    VOL REQ'D NOT YET CALCULATED                      *     0215MAIN
C*              =1    F.P. DON'T MATCH, SO PASS + CALCULATE VOL          *     0220MAIN
C*                    REQ'D LATER                                        *     0225MAIN
C*              =2    VOL. REQ'D HAS BEEN CALCULATED                     *     0230MAIN
C*              =3    VOL. REQ'D HAS BEEN CALCULATED + NOW READY         *     0235MAIN
C*                    TO GO TO UTILIZATION SUMMARY ROUTINE               *     0240MAIN
C*              =4    ALL PROCESSING DONE, IE. VOL REQD HAS BEEN         *     0245MAIN
C*                    CALCULATED + HAS GONE THRU UTILIZATION             *     0250MAIN
C*                    SUMMARY ROUTINE                                    *     0255MAIN
C*              =5    PATH HAS BEEN RATIOED DOWN BY RESTA AND            *
C*                    DRIVEN TO END OF LINE                              *
C***********************************************************************      0260MAIN
C***********************************************************************         MAIN
C***********************************************************************         MAIN
C                                                                                 MAIN
C
C
C
C
C       THE FOLLOWING IS A LIST OF VARIABLES USED IN CAPACITY SIMULATION AND OLB
C
C       THE FOLLOWING IS A LIST OF VARIABLES USED IN CAPACITY SIMULATION AND OLB
C
C       NAME    VARIABLE DESCRIPTION              TYPE    DIMENSION    PROGRAM      07-01-69
C
C       DATE    DTE                               INT        3          COMMON
C       PLANT   PLANT NAME                        INT        6          COMMON
C       PLCDE   PLANT CODE                        INT        1          COMMON
C       FCC     FCC/PCC NAME                      INT        6          COMMON
C       FCDE    FCC CODE                          INT        1          COMMON
C       DEPT    DEPARTMENT NAME                   INT        6          COMMON
C       DCDE    DEPT CODE                         INT        1          COMMON
C
C       MNDEM   MINIMUM DEMAND--THIS SIM.         REAL       1          COMMON
C       MXDEM   MAXIMUM DEMAND - THIS SIM.        REAL       1          COMMON
C       INDEM   INCREMENTAL DEMAND                REAL       1          COMMON
C       SIMIX   SIMULATION MIX BY PATH            REAL       15         COMMON
C       MULIX   HOURS TO WORK OUT EXCESS WIP      INT        1          COMMON
C       MULID   HOURS TO WORK UP DEFC. WIP        INT        1          COMMON
C       OHFAC   OVERHEAD FACTOR                   REAL       1          COMMON
C       HRS     SH/WK,HRS/SH,ROST,MIN ATTEND      REAL     (4,3)        COMMON
C       OPT     OPTIONS                           INT        15         COMMON
C
C       IRDR    UNIT NUMBER - CARD READER         INT        1          COMMON
C       IPCH    UNIT NUMBER - PUNCH               INT        1          COMMON
C       IWTR    UNIT NUMBER - PRINTER             INT        1          COMMON
C       IUTL    UNIT NUMBER-NETWORK UTILITY       INT        1          COMMON
C
C       FCAPU   F.P. CAPACITY UTIL.               REAL       200        COMMON
C       FPID    F.P. ID NUMBER                    INT        200        COMMON
C       PFID    PREVIOUS F.P. ID                  INT        200        COMMON
C       FWIP    F.P. ACTUAL WIP                   REAL       200        COMMON
C       FDWIP   F.P. DESIRED WORK IN PROCESS      REAL       200        COMMON
C       FDESC   F.P. DESCRIPTION                  INT      (200,6)      COMMON
C       FPEPL   F.P. PEOPLE REQUIRED              REAL       200        COMMON
C       FSTA    F.P. STATION NUMBER               INT        200        COMMON
C       FMAX    MAXIMUM NO. OF FLOW POINTS        INT        1          COMMON
C       SIDM    STANDARD MAT'L                    REAL       2000       COMMON
C       SIDL    STANDARD LABOR                    REAL       2000       COMMON
C
C       SDESC   STATION DESCRIPTION               INT      (200,6)      COMMON
C       SUSED   NO. TIMES STATION USED            INT        200        COMMON
C       SQFTA   SQUARE FEET / MACHINE ADDED       INT        200        COMMON
C       SQFTI   SQUARE FT. OF INSTALLED STA.      INT        200        COMMON
C       CMCHA   COST / MACHINE ADDED              REAL       200        COMMON
C       CMCHI   COST OF INSTALLED STATION         REAL       200        COMMON
C       SCAPP   STATION CAPACITY BY PATH          REAL     (200,15)     COMMON
C       SCAPA   STATION CAPACITY - ADDED          REAL     (200,15)     COMMON
C       SPEPL   STATION PEOPLE REQUIRED           REAL       200        COMMON
C       SUTL    STATION CAPACITY UTILIZATION      REAL       200        COMMON
C       SMAX    MAXIMUM NUMBER OF STATIONS        INT        1          COMMON
C       SHRS    STATION HOURS/DAY                 REAL       200        COMMON
C       SUTIL   STATION ( UTILIZED                INT        200        COMMON
C       SPERF   STATION PERFORMANCE RATE          INT        200        COMMON
C       NMACH   NO MACHINES PER STATION           INT        200        COMMON
C
C       PPNIL   PATH POINTER - LEFT               INT        2000       COMMON
C       PPNIR   PATH POINTER - RIGHT              INT        2000       COMMON
C       PATH    PATH USED BY THIS PATH POINT      INT        2000       COMMON
```

TABLE 3 (CONT'D)

```
C     PNBRH PATH POINT NEIGHBORHOOD       INT    2000      COMMON
C     PDWIP PATH POINT DESIRED WIP        REAL   2000      COMMON
C     PRWKI PATH POINT REWORK IN          REAL   2001      COMMON
C     PRWKO PATH POINT REWORK OUT         REAL   1         COMMON
C     RWPNT REWORK PATH F.P. POINTER      INT    1         COMMON
C     PEYLD PATH POINT EFFECTIVE YIELD    REAL   2000      COMMON
C
C     PSTD  P.P. STANDARD UNITS/HR/PERSON REAL   2000      COMMON
C     PTIME P.P. PROCESS TIME FOR ONE LOT REAL   1         COMMON
C     PAWIP P.P. ALLOCATED WIP            REAL   2000      COMMON
C     PXWIP P.P. EXCESS    WIP            REAL   2000      COMMON
C     PFP   P.P. FLOW POINT INDEX         INT    2000      COMMON
C     PSTA  P.P. STATION INDEX            INT    2000      COMMON
C
C     PLFLO P.P. PLANNER OUTPUT           REAL   2000      COMMON
C     PLFLR P.P. PLANNER INPUT            REAL   2000      COMMON
C     PFLO  P.P. ACHIEVED OUTPUT          REAL   2000      COMMON
C     PFLR  P.P. ACHIEVED INPUT           REAL   2000      COMMON
C     PPUTL P.P. UTILIZATION              REAL   2000      COMMON
C     PPMAX MAXIMUM NO. OF PATH POINTS    INT    1         COMMON
C     PCYLD CUM PATH YIELD                REAL   15        COMMON
C
C     PNAME PATH (PRODUCT) NAME           INT    (15,6)    COMMON
C     PDEM  PATH DEMAND                   REAL   15        COMMON
C     PFLAG PERMANENT OUTPUT FLAG--1/PATH REAL   15        COMMON
C     TFLAG TEMPORARY OUTPUT FLAG--1/PATH REAL   15        COMMON
C     PAMAX MAXIMUM NO. OF PATHS          INT    1         COMMON
C
C     BFLAG BOTTLENECK FLAG WITHIN NBHD   INT    1         COMMON
C     RFLAG REBALANCE FLAG                INT    1         COMMON
C     WFLAG WORK FLAG WITHIN EA NBRHD     INT    15        COMMON
C     ENDSW SWITCH FOR NORMAL END DSKIN   INT    1         COMMON
C     WORK1 WK ARRAY FOR ANY USAGE        INT    200       COMMON
C     WORK2 WK ARRAY FOR ANY USAGE        INT    15        COMMON
C     WORK3 WK ARRAY FOR ANY USAGE        INT    2000      COMMON
C     BLOLD OUTPUT SUMMED AFTER BALANCE   INT    1         COMMON
C     M3    VARIABLE VALUE FOR = F.P.     INT    1         COMMON
C     M4    VARIABLE VALUE FOR =STATIONS  INT    1         COMMON
C     HWK   HOURS PER WEEK FOR NETWORK    INT    1         COMMON
C     HDAY  HOURS PER DAY FOR NEWTORK     INT    1         COMMON
C     NODIN SWITCH ON FOR 2 REQ ON 1 NET  INT    1         COMMON
C
C
C**** COMMON FOR TRACE,DSKIN,MUFLO1,MUS,UBL,BEST
      COMMON/BLK1/
     *FPID,PFP
C
      INTEGER
     *FPID(200),PFP(10,10)
C
C**** COMMON FOR TRACE,DSKIN,ADMCH,MUFLO1,MUS,BEST,RESTA,DLB,SUMMR1,SDRUM
      COMMON/BLK2/
     *PATH,PAMAX,PSTA,PPMAX,FSTA
C
      INTEGER
     *PATH(1000),PAMAX,PSTA(1000),PPMAX,FSTA(200)
C
C**** COMMON FOR TRACE,DSKIN,MUFLO1,MUS,BEST
      COMMON/BLK5/
     *PNBRH
C
      INTEGER
     *PNBRH(1000)
C
C**** COMMON FOR DSKIN,ADMCH,MUFLO1,MUS,BEST,RESTA,DLB,SUMMR1,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR DSKIN,ADMCH,MUFLO1,MUS,ULB,SDRUM
      COMMON/BLK7/
     *SCAPP,IDET
C
```

```
      INTEGER
     *IDET
C
      REAL
     *SCAPP(200,15)
C
C**** COMMON FOR ADMCH,MUFLO1,DBL
      COMMON/BLK9/
     *PLELR,CYC
C
      INTEGER
     *CYC
C
      REAL
     *PLELR(1000)
C
C**** COMMON FOR MUFLO1,SIMIN,MUS,BEST,RESTA,DLB,ADMCH,DSKIN,SUMMRI
      COMMON/BLK10/
     *MULTD,MULTX,MNDEM,SIMIX,MXDEM,INDEM
C
      INTEGER
     *MULTD,MULTX
C
      REAL
     *MNDEM,SIMIX(15),MXDEM,INDEM
C
C**** COMMON FOR DSKIN,SIMIN,ADMCH,SUMMRI,SDRUM,MAIN
      COMMON/BLK12/
     *PLCDE,FCDE,DCDE,HDAY,HRS
C
      INTEGER
     *PLCDE,FCDE,DCDE
C
      REAL
     *HRS(4,3), HDAY
C
C**** COMMON FOR DSKIN,MUFLO1,MUS,BEST,RESTA
      COMMON/BLK13/
     *PPNTR,PEYLD,PRWKI,TFLAG,PFLAG,PPNTL
C
      INTEGER
     *PPNTR(1000),PPNTL(1000)
C
      REAL
     *PEYLD(1000),PRWKI(1000),TFLAG(15),PFLAG(15)
C
C**** COMMON FOR DSKIN ,MUFLO1,SIMIN,DBL,ADMCH,SUMMRI
      COMMON/BLK14/
     *OPT
C
      INTEGER
     *OPT(15)
C
C**** COMMON FOR MUFLO1,DBL
      COMMON/BLK16/
     *FDWIP
C
      REAL
     *FDWIP(200)
C
C**** COMMON FOR TRACE,DSKIN,ADMCH,MUFLO1,SIMIN,MUS,BEST,PESTA,DBL,PRTER
      COMMON/BLK18/
     *IWTR
C
      INTEGER
     *IWTR
C
C
C**** COMMON FOR MUFLO1,SUMMRI,SDRUM
C
      COMMON/BLK22/
     *ACHED,PLAN
C
C**** COMMON FOR SNAP1,SNPRPT,MUFLO,ADMCH,MAIN
      COMMON/BLK25/
     *NPGE,KALLS,JOPT,KOPT
C
C
      DATA
```

TABLE 3 (CONT'D)

```
       *FP/'FP'/,ST/'ST'/,PP/'PP'/,RL/'R'/                                          MAIN
C                                                                                   MAIN
C****  VARIABLES FOR MAIN ONLY                                                      MAIN
C                                                                                   MAIN
       REAL                                                                         MAIN
      *PDEM(15)
       INTEGER
      *WFLAG(15),BFLAG,ENDSW,DLBSW                                                  MAIN
C                                                                              0265MAIN
C
C************************************************************************
C*     INITIALIZE VARIABLES                                             *
C************************************************************************
       CALL DATSW (0,KD)
       GO TO (51,53),KD
   51  WRITE(IWTR,52)
   52  FORMAT(2X,'ENTER MUFLO1')
   53  M3 = 200
       M4 = 1000
       KALLS = 0
       NCALL = 0
C                                                                              0305MAIN
C************************************************************************     0310MAIN
C*     CALL SIMIN TO READ IN AND VALIDATE THE CONTROL CARDS             *
C*     REQUESTING A CAPACITY SIMULATION RUN OR DLB RUN                  *
C*                                                                      *
C*     CALL DSKIN TO BRING IN THE DATA FOR THE REQUESTED NETWORK        *
C************************************************************************     0330MAIN
C                                                                              0335MAIN
   47  CALL SIMIN
 4048  IMXSW = 0
       IF(OPT(2) .EQ. 4) MNDEM = MXDEM
       CYC = 0
       PLAN = MNDEM
       DLBSW = 0
       ISW = 0
   70  DO 903 N=1,M3
  903  SUIL(N) = 0.0
       DO 1300 N=1,M4
 1300  PPUTL(N) = 0.0
 1303  CALL DSKIN(ENDSW)
   73  IF(ENDSW - 1) 4047,7080,4047
 4047  CALL EXIT
C
C************************************************************************
C      DETERMINE QUARTER OF DATA FOR HEADING                            *
C************************************************************************
C
 7080  NQTR = DCDE - ((DCDE / 10) * 10)
       IF(NQTR) 7081,7081,91
 7081  JOPT = 2
       KOPT = 1
       GO TO 48
   91  JOPT = 1
       KOPT = (2 * NQTR) + 1
       IF(NQTR.EQ.9) JOPT=2
C
C************************************************************************
C*     SUM PATH POINT DESIRED WORK IN PROCESS(PDWIP) FOR EACH           *
C*     FLOW POINT(FDWIP)                                                *
C************************************************************************
C
   48  IF(OPT(2) - 1) 49,1304,49
 1304  DO 1305  M=1,FMAX
 1305  FDWIP(M) = 0.0
       DO 1325 NN=1,PPMAX
       NFP = PFP(NN)
       IF(FDWIP(NFP)) 1325,1310,1325
 1310  NB = PNBRH(NN)
       N = NN
 1315  FDWIP(NFP) = FDWIP(NFP) + PDWIP(N)
       N = N + 1
       IF(NB - PNBRH(N)) 1325,1320,1325
 1320  IF(NFP - PFP(N)) 1325,1315,1325
 1325  CONTINUE
       GO TO (1326,49),KD
 1326  WRITE(IWTR,1340)
 1340  FORMAT(10X,'DUMP OF PDWIP')
       CALL TRACE(IDUM,PDWIP,PP,RL)
```

TABLE 3 (CONT'D)

```
      WRITE(IWTR,1345)
1345  FORMAT(10X,'DUMP OF FDWIP')
      CALL TRACE(IDUM,FDWIP,FP,RL)
C
C****************************************************************
C*    PXWIP SET TO ZERO FOR CAPACITY SIMULATION ONLY             *
C****************************************************************
C
   49 DO 50 I=1,PPMAX
   50 PXWIP(I) = 0.0
 1350 BLOLD = 0.0
C
C****************************************************************
C*    SET LINE RATES EQUAL TO PLANNER'S RATES(PLFLO + PLFLR)     *
C*    DRIVE PLANNER'S RATES TO FRONT OF NETWORK                  *
C****************************************************************
C
 2300 J = 1                                                          0340MAIN
 2304 IF(PPNTR(J)) 2312,2308,2312                                    0345MAIN
C                                                                    0350MAIN
C****************************************************************   0355MAIN
C*    CALCULATE OUTPUT OF FIRST NBRHD PATH                       *   0360MAIN
C****************************************************************   0365MAIN
C                                                                    0370MAIN
 2308 NP = PATH(J)                                                   0375MAIN
      PDEM(NP) = PLAN * SIMIX(NP)
      PLFLO(J) = PDEM(NP)
C                                                                    0385MAIN
C****************************************************************   0390MAIN
C*    CALCULATE INPUT OF F.P. AT POSITION 'J' IN NETWORK         *   0395MAIN
C****************************************************************   0405MAIN
C                                                                    0410MAIN
 2312 IF(PEYLD(J)) 2316,2316,2320                                    0415MAIN
 2316 PEYLD(J) = 1.0                                                 0420MAIN
 2320 PLFLR(J) = PLFLO(J) / PEYLD(J)                                 0425MAIN
      IF(PLFLR(J)) 2324,2328,2328                                    0430MAIN
 2324 PLFLR(J) = 0                                                   0435MAIN
C                                                                    0440MAIN
C****************************************************************   0445MAIN
C*    IF LEFT PATH POINTER IS ZERO 'J' IS AT START OF NETWORK    *   0450MAIN
C*    AND/OR START OF A PATH                                     *   0455MAIN
C****************************************************************   0460MAIN
C                                                                    0465MAIN
 2328 IF(PPNTL(J)) 2332,2360,2332                                    0470MAIN
 2332 NPL = PPNTL(J)                                                 0475MAIN
C                                                                    0480MAIN
C****************************************************************   0485MAIN
C*    CALCULATE OUTPUT OF LEFT PATH POINTER'S F.P.               *   0490MAIN
C****************************************************************   0495MAIN
      IF(PXWIP(J)) 2356,2344,2344                                    0505MAIN
 2344 PLFLO(NPL) = PLFLR(J) * (1.0 - PRWKI(J)) - (PXWIP(J) / MULTX)  0520MAIN
      GO TO 2360                                                     0525MAIN
 2356 PLFLO(NPL) = PLFLR(J) * (1.0 - PRWKI(J)) - (PXWIP(J) / MULTD)  0540MAIN
C                                                                    0545MAIN
C****************************************************************   0550MAIN
C*    INCREMENT 'J' AND THUS MOVE UP TO FRONT OF NETWORK         *   0555MAIN
C****************************************************************   0560MAIN
C                                                                    0565MAIN
 2360 J = J + 1                                                      0570MAIN
      IF(J - PPMAX) 2304,2304,2364                                   0575MAIN
C                                                                    0580MAIN
C****************************************************************   0585MAIN
C*    ZERO PERMANENT PATH FLAGS                                  *   0590MAIN
C****************************************************************   0595MAIN
C                                                                    0605MAIN
 2364 IF(OPT(2).NE.1) GO TO 2367
      IF(DLBSW.NE.0) GO TO 2367
      GO TO (2074,2076),KD
 2074 WRITE(IWTR,75)
      CALL TRACE(IDUM,PLFLO,PP,RL)
      WRITE(IWTR,82)
      CALL TRACE(IDUM,PLFLR,PP,RL)
 2076 CALL WIPIN
      CALL ALLOC
      DLBSW = 1
      GO TO 2300
 2367 GO TO (74,76),KD
   74 WRITE(IWTR,75)
   75 FORMAT(1H1,'PLANNERS PATH POINT OUTPUT--PLFLO',25X,'P A T H S',//)
```

(TABLE 3 (CONT'D))

```
      CALL TRACE(IDUM,PLFLO,PP,RL)
      WRITE(IWTR,82)
   82 FORMAT(1H1,'PLANNERS PATH POINT INPUT---PLFLR',25X,'P A T H S',//)
      CALL TRACE(IDUM,PLFLR,PP,RL)
   76 DO 2368 I=1,15
 2368 PFLAG(I) = 0                                                      0615MAIN
 1329 DO 1809 I=1,M4
      PFLO(I) = 0.0
 1809 PFLR(I) = 0.0
C                                                                       0620MAIN
C***********************************************************************0625MAIN
C*    ZERO TEMPORARY PATH FLAGS                                       * 0630MAIN
C***********************************************************************0635MAIN
C                                                                       0640MAIN
 2372 DO 2376 I=1,15
 2376 TFLAG(I) = 0                                                      0650MAIN
C                                                                       0655MAIN
C***********************************************************************0660MAIN
C*    START 'J' AT END OF NETWORK,ZERO NBRHD BOTTLENECK FLAG,         * 0665MAIN
C*    ZERO WORK FLAG ARRAY     POSITION IS 1ST NBRHD, 1ST F.P.        * 0670MAIN
C***********************************************************************0675MAIN
C                                                                       0680MAIN
 2373 J = 1
 2380 BFLAG = 0                                                         0690MAIN
      DO 2384 I=1,15
 2384 WFLAG(I) = 0                                                      0705MAIN
      K = J - 1                                                         0710MAIN
      NB = PNBRH(J)                                                     0715MAIN
      GO TO (77,2388),KD
   77 WRITE(IWTR,78) NB
   78 FORMAT(1X,'POSITION AT FIRST F.P. WITHIN NBRHD ',I3)
C                                                                       0720MAIN
C***********************************************************************0725MAIN
C*    POSITION AT 1ST F.P. WITHIN NBRHD                               * 0730MAIN
C***********************************************************************0735MAIN
C                                                                       0740MAIN
 2388 NR = PFP(J)
      NFP = FPID(NR)
C                                                                       0750MAIN
C***********************************************************************0755MAIN
C*    CALCULATE VOL REQ'D                                             * 0760MAIN
C***********************************************************************0765MAIN
C                                                                       0770MAIN
 2392 IF(PPNTR(J)) 2400,2396,2400                                       0775MAIN
C                                                                       0780MAIN
C***********************************************************************0785MAIN
C*    CALCULATE OUTPUT VOL REQ'D OF 1ST NBRHD PATH                    * 0790MAIN
C*    IF FLAG HAS BEEN SET PFLO EQUALS THAT PATH'S FLAG AMT           * 
C***********************************************************************0895MAIN
C                                                                       0805MAIN
 2396 NP = PATH(J)                                                      MAIN
      IF(PFLAG(NP)) 86,86,83
   86 IF(TFLAG(NP)) 85,85,84
   83 IF(TFLAG(NP)) 1351,1351,1352
 1352 IF(PFLAG(NP) - TFLAG(NP)) 1351,84,84
 1351 PFLO(J) = PFLAG(NP)
      GO TO (54,2400),KD
   54 WRITE(IWTR,55) PFLO(J),NP
   55 FORMAT(2X,'MUFLO1 BOTTLENECK SET DEMAND(PFLO) = PERM FLAG, DEMAND
     *IS SET TO ',F8.3,' ON PATH ',I2,' RETURN + BALANCE LINE AGAIN')
      GO TO 2400
   84 PFLO(J) = TFLAG(NP)
      GO TO (57,2400),KD
   57 WRITE(IWTR,58) PFLO(J),NP
   58 FORMAT(2X,'MUFLO1 BOTTLENECK SET DEMAND(PFLO) = TEMP FLAG, DEMAND
     *IS SET TO ',F8.3,' ON PATH ',I2,' RETURN + BALANCE LINE AGAIN')
      GO TO 2400
   85 PFLO(J) = PDEM(NP)
C                                                                       0-20MAIN
C***********************************************************************0-25MAIN
C*    CALCULATE INPUT VOL REQ'D OF F.P. AT POSITION 'J'               * 0-30MAIN
C*    IN NETWORK                                                      * 0-35MAIN
C***********************************************************************0-40MAIN
C                                                                       0-45MAIN
 2400 IF(PEYLD(J)) 2404,2404,2408                                       0950MAIN
 2404 PEYLD(J) = 1.0                                                    0-55MAIN
 2408 PFLR(J) = PFLO(J) / PEYLD(J)                                      0-60MAIN
      IF(PFLR(J)) 2412,2416,2416                                        0-65MAIN
 2412 PFLR(J) = 0                                                       0-66MAIN
```

```
C
C*******************************************************
C*     IF LEFT PATH POINTER IS ZERO, 'J' IS AT START OF NETWORK     *
C*     AND/OR START OF A PATH                                        *
C*******************************************************
C
 2416 IF(PPNTL(J)) 2420,2448,2420
 2420 NPL = PPNTL(J)
C
C*******************************************************
C*     CALCULATE OUTPUT VOL REQ'D OF LEFT PATH POINTER'S F.P.     *
C*******************************************************
C
      IF(PXWIP(J)) 2444,2432,2432
 2432 PFLO(NPL) = PFLR(J) * (1.0 - PRWKI(J)) - (PXWIP(J) / MULTX)
      GO TO 2448
 2444 PFLO(NPL) = PFLR(J) * (1.0 - PRWKI(J)) - (PXWIP(J) / MULTD)
C
C*******************************************************
C*     SET WORK FLAG EQUAL TO CODE 2                                 *
C*     SAVE VALUE OF 'J' IN 'JJ' TO LATER BE ABLE TO OBTAIN          *
C*     NUMBER OF THE P.P. BEING PROCESSED                            *
C*******************************************************
C
 2448 L = J - K
      WFLAG(L) = 2
      JJ = J
C
C*******************************************************
C*     INCREMENT 'J' AND THUS MOVE UP TO FRONT OF NETWORK           *
C*******************************************************
C
 2452 J = J + 1
      IF(J - PPMAX) 2456,2456,2472
C
C*******************************************************
C*     CHECK IF F.P. HAS ALREADY BEEN PROCESSED                     *
C*******************************************************
C
 2456 L = J - K
      IF(WFLAG(L) - 1) 2460,2460,2452
C
C*******************************************************
C*     CHECK IF NBRHD MATCH                                          *
C*******************************************************
C
 2460 IF(NB - PNBRH(J)) 2472,2464,2472
C
C*******************************************************
C*     CHECK IF F.P. MATCH  IF NOT, SET WORK FLAG CODE TO 1          *
C*******************************************************
C
 2464 LP = PFP(J)
      IF(NFP - FPID(LP)) 2468,2392,2468
 2468 WFLAG(L) = 1
      GO TO 2452
C
C*******************************************************
C*     CHECK IF THIS IS A MULTIUSE STATION  IF SO, CALL 'MUS'        *
C*******************************************************
C
 2472 JP = PSTA(JJ)
      IF(SUSED(JP) - 1) 2480,2480,2476
 2476 CALL MUS(JJ)
      GO TO (65,67),KD
   65 WRITE(IWTR,66)
   66 FORMAT(2X,'RETURNED TO MUFLO1 FROM MUS')
   67 GO TO 2532
C
C*******************************************************
C*     CALCULATE + SUM P.P. UTILIZATION FOR THIS F.P.               *
C*     STATUS OF WORK FLAG DETERMINES WHICH STEP OF UTILIZATION     *
C*     TO PERFORM                                                    *
C*******************************************************
C
C
C*******************************************************
C*     SEARCH WORK FLAG ARRAY FOR F.P. THAT HAVE BEEN CALCULATED    *
C*     (CODE 2) AND CHANGE CODE TO ALLOW UTILIZATION TO BE SUMMED   *
```

TABLE 3 (CONT'D)

```
C*      (CODE 3)                                                          *    1425MAIN
C*************************************************************************    1430MAIN
C                                                                              1435MAIN
 2480 L = 1                                                                    1440MAIN
 2484 IF(WFLAG(L) - 1) 2500,2496,2488                                          1445MAIN
 2488 IF(WFLAG(L) - 4) 2492,2496,2496                                          1450MAIN
 2492 WFLAG(L) = 3                                                             1455MAIN
 2496 L = L + 1                                                                1460MAIN
      IF(L - PAMAX) 2484,2484,2500
C                                                                              1470MAIN
C*************************************************************************    1475MAIN
C*      TEST STATUS OF WORK FLAG CODE                                     *    1480MAIN
C*      IF CODE IS 3 CALCULATE + SUM UTILIZATION                          *    1485MAIN
C*      IF CODE IS ZERO END OF NBRHD REACHED,SO TEST SUMMED               *    1490MAIN
C*      P.P. UTILIZATION                                                  *    1495MAIN
C*************************************************************************    1505MAIN
C                                                                              1510MAIN
 2500 NK = PSTA(JJ)
      L = 1
      SUTL(NK) = 0.0                                                           1520MAIN
 2504 IF(WFLAG(L) - 1) 2524,2520,2508                                          1525MAIN
 2508 IF(WFLAG(L) - 3) 2520,2512,2520                                          1530MAIN
C                                                                              1535MAIN
C*************************************************************************    1540MAIN
C*      CALCULATE PATH POINT UTILIZATION(PPUTL) AND SUM ALL               *
C*      PPUTL OF THIS FLOW POINT GIVING STATION UTILIZATION(SUTL)         *    MAIN
C*************************************************************************    1550MAIN
C                                                                              1555MAIN
 2512 JJJ = K + L                                                              1560MAIN
      IP = PFP(JJJ)                                                            1565MAIN
      IPP = PFP(JJ)                                                            1570MAIN
      IF(FPID(IP) - FPID(IPP)) 2520,2516,2520                                  1575MAIN
 2516 N = PATH(JJJ)                                                            1580MAIN
      NN = PSTA(JJJ)
      PPUTL(JJJ) = PFLR(JJJ) / SCAPP(NN,N)                                     1585MAIN
      SUTL(NK) = SUTL(NK) + PPUTL(JJJ)
      WFLAG(L) = 4                                                             MAIN
 2520 L = L + 1                                                                1595MAIN
      IF(L - PAMAX) 2504,2504,2524
C                                                                              1505MAIN
C*************************************************************************    1510MAIN
C*      IF STATION UTILIZATION(SUTL) IS > 1.0, CALL RESTA                 *
C*************************************************************************    1520MAIN
C                                                                              1525MAIN
 2524 GO TO (79,81),KD
   79 WRITE(IWTR,80) FPID(IPP),SUTL(NK)
   80 FORMAT(1X,'UTILIZATION FOR F.P. ',I4,' IS ',F7.3)
   81 IF (SUTL(NK) - 1.0) 8020,8020,2528
 8020 L = 1
 8021 IF(WFLAG(L) - 4) 8023,8022,8023
 8022 WFLAG(L) = 5
 8023 L = L + 1
      IF(L - PAMAX) 8021,8021,2532
 2528 CALL RESTA(K,BFLAG,WFLAG)
C                                                                              1650MAIN
C*************************************************************************    1655MAIN
C*      TEST IF MORE F.P WITHIN NBRHD YET TO CALCULATE                    *    1660MAIN
C*************************************************************************    1665MAIN
C                                                                              1670MAIN
 2532 L = 1                                                                    1675MAIN
 2536 IF (WFLAG(L) - 1) 2548,2540,2544
 2540 J = K + L                                                                1685MAIN
      GO TO 2388                                                               1690MAIN
 2544 L = L + 1                                                                1695MAIN
      IF(L - PAMAX) 2536,2536,2548
C
C*************************************************************************
C*      THIS IS LAST PATH IN NBRHD                                        *
C*      CHECK IF THERE WAS A BOTTLENECK WITHIN THIS NBRHD (>0,YES)        *
C*      IF SO, RETURN AND BALANCE THE LINE AGAIN                          *
C*************************************************************************
C
 2548 IF(BFLAG) 2574,2574,2373
C                                                                              1820MAIN
C*************************************************************************    1825MAIN
C*      CHECK IF THIS IS LAST NBRHD IN NETWORK                            *    1830MAIN
C*      IF NOT, GO TO NEXT NBRHD + BALANCE IT                             *    1840MAIN
C*************************************************************************    1845MAIN
C                                                                              1850MAIN
```

TABLE 3 (CONT'D)

```
      2574 IF(J - PPMAX) 2380,2380,2578
      2578 CONTINUE                                                        TEST
           GO TO (60,1335),KD
        60 WRITE(IWTR,2579)
      2579 FORMAT(1H1,'ACHIEVED OUTPUT--PFLO--AT END OF BALANCE',5X,'P A T H
          *S',/)
           CALL TRACE(IDUM,PFLO,PP,RL)
           WRITE(IWTR,2580)
      2580 FORMAT(1H1,'ACHIEVED INPUT--PFLR--AT END OF BALANCE',5X,'P A T H S
          *',/)
           CALL TRACE(IDUM,PFLR,PP,RL)
      1335 IF(OPT(2).NE.1) GO TO 1338
           CALL ASSGN
           CALL CTIME
           CALL OUTPT
           GO TO 4047
      C
      C***********************************************************
      C*    SUM PLANNER'S OUTPUT OF LAST NBHD INTO 'PLAN' AND SUM       *
      C*    ACHIEVED OUTPUT INTO 'ACHED'                                *
      C***********************************************************
      C
      1338 ACHED = 0.0
           PLAN = 0.0
           DO 2608 JM=1,PAMAX
           PLAN = PLAN + PLFLO(JM)
      2608 ACHED = ACHED + PFLO(JM)
      C
      C***********************************************************
      C*    RECALCULATE PATH POINT AND STATION UTILIZATIONS FOR USE    *
      C*    IN SUBSEQUENT PROGRAMS TO BE CALLED                        *
      C***********************************************************
      C
      1336 DO 1401 L=1,200
      1401 SUTL(L) = 0.0
           DO 1402 J = 1,PPMAX
           K= PATH(J)
           L = PSTA(J)
           PPUTL(J) = PFLR(J) / SCAPP(L,K)
           SUTL(L) = SUTL(L) + PPUTL(J)
           IF(SUTL(L)) 1402,1402,1403
      1403 BFLAG = 1
      1402 CONTINUE
      C
      C***********************************************************
      C*    TEST IF PLANNER'S DEMAND HAS BEEN MET YET                  *
      C***********************************************************
      C
           IF(OPT(2) - 4) 4012,4011,4012
      4011 IWTR = 10
      4012 IF(ACHED - PLAN) 2612,2620,2620
      C
      C***********************************************************
      C*    CALL ADMCH FOR CYCLE REPORT                                *
      C*                                                               *
      C*    CHECK IDET, IF THIS IS A TYPE 4 RUN.  IF SO, CALL SDRUM.   *
      C*    THEN RETURN TO CALL SIMIN FOR NEXT SET OF CONTROL CARDS    *
      C*                                                               *
      C***********************************************************
      C
      2612 IF(PLAN - MNDEM) 2613,2613,2614
      2613 ICYC = 1
           IF(IMXSW - 1) 2617,4047,2617
      2617 IF(ISW) 2614,2615,2614
      2615 ISW = 1
      2616 CALL ADMCH(ICYC,IMXSW)
      2614 ICYC = 0
           IF(OPT(2) - 4) 4015,4014,4015
      4014 IWTR = 10
      4015 IF(IDET - 9) 3020,3022,3020
      3020 IF(IDET - 4) 3019,3019,3022
      3019 IF(IDET ) 3022,3022,3021
      3021 CALL SDRUM
           IF(OPT(2) - 4) 47,4013,47
      4013 RETURN
      3022 CALL ADMCH(ICYC,IMXSW)
      4005 IF(IMXSW - 1) 76,4047,76
      C
      C***********************************************************
```

```
C*      RETURN AND REBALANCE LINE                                       *
C************************************************************************
C
C
C************************************************************************
C*      CALL ADMCH FOR A SUMMARY REPORT                                 *
C************************************************************************
C
 2620 IF(IMXSW.EQ.1) GO TO 3032
      ICYC = 1
      CALL ADMCH(ICYC,IMXSW)
      IF(CYC) 3024,3025,3024
 3024 IF(OPT(3) - 1) 3025,4047,3025
C
C************************************************************************
C*      TEST IF MAXIMUM DEMAND HAS BEEN MET YET,                        *
C*      IF SO, RETURN AND CALL SIMIN FOR NEXT NETWORK TO PROCESS        *
C*      UNLESS A BOTTLENECK HAS NOT BEEN REACHED YET.  IF THIS          *
C*      IS THE CASE INCREASE MAXIMUM DEMAND BY 10,000                   *
C*      UNTIL A BOTTLENECK IS MET                                       *
C************************************************************************
C
 3025 IF(PLAN - MXDEM + .005) 2628,3030,3030
 3030 IF(OPT(2) - 4) 3031,4018,3031
 4018 IF(NCALL.EQ.2) GO TO 3031
      NCALL = 2
      CALL SNPRPT(NCALL)
 3031 IF(CYC) 3032,3032,4047
 3032 MXDEM = MXDEM + MXDEM
      INDEM = MXDEM
      IMXSW = 1
C
C************************************************************************
C*      ADD INCREMENTAL DEMAND TO ALL PATHS                             *
C************************************************************************
C
 2628 PLAN = 0.0
      DO 2034 ML=1,PAMAX
      PLFLO(ML) = PLFLO(ML) + (INDEM * SIMIX(ML))
 2034 PLAN = PLAN + PLFLO(ML)
C
C************************************************************************
C*      CHECK IF MAXIMUM DEMAND HAS BEEN EXCEEDED,                      *
C*      IF SO, RETURN AND REBALANCE LINE                                *
C************************************************************************
C
      IF(PLAN - MXDEM) 2041,2041,2040
C
C************************************************************************
C*      RATIOED UP PLANNER'S DEMAND NOW EXCEEDS MAXIMUM DEMAND,         *
C*      SO SET IT EQUAL TO MAXIMUM DEMAND                               *
C************************************************************************
C
 2040 PLAN = MXDEM
 2041 IF(OPT(2) - 5) 2044,2300,2044
 2044 IF(CYC) 2300,2300,2043
 2043 DO 2042 I=1,PPMAX
      PFLO(I) = PFLO(I) * PLAN / ACHED
 2042 PFLR(I) = PFLR(I) * PLAN / ACHED
      ACHED = PLAN
      IF(BFLAG - 1) 1336,1406,1406
 1406 BFLAG = 0
      CALL IROG
      GO TO 1336
      END                                                    1875MAIN
```

WORK IN PROCESS INPUT (WIPIN) (TABLE 4)

This subroutine in TABLE 4 reads in the actual work in process at the flow point level, and is used only for Dynamic Line Balancing runs. If the actual work in process is not supplied, then a desired level of inventories will be read in.

This subroutine is shown in TABLE 4.

TABLE 4
WORK IN PROCESS INPUT (WIPIN)

```
@ ELT WIPIN,1,70041/, 36498     , 1

SUBROUTINE WIPIN
  C
```

TABLE 4 (CONT'D)

```
C************************************************************
C*                                                            *
C*          MULTI-FLOW DYNAMIC LINE BALANCING                 *
C*                                                            *
C*    SUBROUTINE WIPIN - READS ACTUAL WORK IN PROCESS FROM CARDS *
C*                                                            *
C*                                                            *
C*                                                            *
C************************************************************
C
C
C**** COMMON FOR TRACE,DSKIN,MUFLO1,MUS,DBL,BEST
      COMMON/BLK1/
     *FPID,PFP
C
      INTEGER
     *FPID(200),PFP(1000)
C
C**** COMMON FOR DSKIN,ADMCH,MUFLO1,MUS,BEST,RESTA,DLB,SUMMRI,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR SIMIN,DBL,SUMMRI
      COMMON/BLK11/
     *OHFAC,IRDR
C
      INTEGER
     *IRDR
C
      REAL
     *OHFAC
C
C**** COMMON FOR MUFLO1,DBL
      COMMON/BLK16/
     *FDWIP
C
      REAL
     *FDWIP(200)
C
C**** COMMON FOR TRACE,DSKIN,ADMCH,MUFLO1,SIMIN,MUS,BEST,RESTA,DBL,PRTER
      COMMON/BLK18/
     *IWTR
C
      INTEGER
     *IWTR
C
C**** COMMON FOR WIPIN,ALLOC,OUTPUT
      COMMON/BLK19/
     *FWIP,DATE,TIME                                              *NEW
C
      INTEGER
     *DATE(4),TIME(4)
C
      REAL
     * FWIP(200)
C
C*    INITIALIZE VARIABLES
C
      DO 50 I=1,FMAX
   50 FWIP(I)=-1
C
C
C******READ IN DATE AND SHIFT TIME. THESE TWO WERE READ IN OUTPT
C******FOR THE DLB WITH AREA REPORTS.  FOR A DLB RUN WITH NO AREA
C******REPORTS THEY ARE READ IN HERE.
C
      READ(IRDR,56) KEY,DATE,TIME
   56 FORMAT(I1,2(1X,4A2))
      IF(KEY-3) 57,90,57
   57 WRITE(IWTR,58)
   58 FORMAT(1H1,'DATE AND SHIFT CARD REQUIRING A 8 IN COL 80',
     *' WAS OMITTED OR INCORRECT')
```

TABLE 4 (CONT'D)

```
      CALL EXIT
C*********************************************************************
C*    READ ACTUAL WORK IN PROCESS, FLOW POINT I.D.                    *
C*********************************************************************
C
   90 READ(IRDR,100,END=210) KEY,IDFP,IWIP
  100 FORMAT(I1,1X,I4,1X,I5)
C
C*********************************************************************
C*    CHECK FOR CORRECT CARD TYPE                                     *
C*********************************************************************
C
      IF(KEY.EQ.4) GO TO 120
      WRITE(IWTR,110) IDFP
  110 FORMAT(1H1,'INVALID OR MISSING KEY VALUE OF 4 IN COL 1 OF',
     *' WIP CARD FOR FP ',I4)
      CALL EXIT
C
C*********************************************************************
C*    SCAN FLOW POINT ARRAY, FIND CORROSPONDING FLOW POINT            *
C*********************************************************************
C
  120 DO 200 I=1,FMAX
      IF(FPID(I)-IDFP) 200,125,200
C
C*********************************************************************
C*    HAS FLOW POINT ALREADY BEEN ASSIGNED A W.I.P. VALUE?            *
C*    IF SO, USE SECOND VALUE, PRINT ERROR MESSAGE                    *
C*********************************************************************
C
  125 IF(FWIP(I)+1.) 130,140,130
  130 WRITE(IWTR,135) IDFP,IWIP
  135 FORMAT(' ** DYBAL INPUT ERROR ** MORE THAN ONE WIP FOR FP ',
     1 I4,',ASSUME ',I5)
  140 FWIP(I)=IWIP
      GO TO 90
  200 CONTINUE
C
C*********************************************************************
C*    CORROSPONDING FLOW POINT HAS NOT BEEN FOUND, PRINT ERROR MESSAGE *
C*********************************************************************
C
      WRITE(IWTR,205) IDFP
  205 FORMAT(' ** DYBAL INPUT ERROR ** FP ',I4,' DOES NOT EXIST')
      GO TO 90
C
C*********************************************************************
C*    IF NO ACTUAL W.I.P. IS GIVEN, USE DESIRED VALUE, PRINT ERROR    *
C*********************************************************************
C
  210 DO 250 I=1,FMAX
      IF(FWIP(I)+1.) 250,220,250
  220 FWIP(I)=FDWIP(I)
      WRITE(IWTR,230) FPID(I)
  230 FORMAT(' ** DYBAL INPUT ERROR ** NO WIP FOR FP ',I4,', ASSUME DESI
     1RED VALUE')
  250 CONTINUE
      RETURN
      END
```

ALLOCATE (ALLOC) (TABLE 5)

This subroutine shown in TABLE 5 is entered via a call from MAIN when the program is used for Dynamic Line Balancing. The work in process at each flow point, as read in by WIPIN, is allocated to the particular path points in the same ratio as the input desired work in process was specified. It also calculates excess work in process at the path point level, by determining the difference between actual and desired levels.

TABLE 5
ALLOCATE (ALLOC)

```
@ ELT ALLOC.1,70041/, 36497

SUBROUTINE ALLOC
C
C*********************************************************************
C*                                                                    *
C*              MULTI-FLOW DYNAMIC LINE BALANCING                     *
C*                                                                    *
```

TABLE 5 (CONT'D)

```
C*    SUBROUTINE ALLOC - ALLOCATES FLOW POINT W.I.P. TO PATH POINTS,     *
C*                       CALCULATES PXWIP                                *
C*                                                                       *
C*                                                                       *
C*                                                                       *
C************************************************************************
C
C**** COMMON FOR TRACE,DSKIN,MUFLO1,MUS,DBL,BEST
      COMMON/BLK1/
     *FPID,PFP
C
      INTEGER
     *FPID(200),PFP(1000)
C
C**** COMMON FOR TRACE,DSKIN,ADMCH,MUFLO1,MUS,BEST,RESTA,DLB,SUMMRI,SDRUM
      COMMON/BLK2/
     *PATH,PAMAX,PSTA,PPMAX,FSTA
C
      INTEGER
     *PATH(1000),PAMAX,PSTA(1000),PPMAX,FSTA(200)
C
C**** COMMON FOR DSKIN,ADMCH,MUFLO1,MUS,BEST,RESTA,DLB,SUMMRI,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR ADMCH,MUFLO1,DBL
      COMMON/BLK9/
     *PLFLR,CYC
C
      INTEGER
     *CYC
C
      REAL
     *PLFLR(1000)
C
C**** COMMON FOR DSKIN,DLB,SUMMRI
C
      COMMON/BLK17/
     *FDESC,STDM,STDL
C
      INTEGER
     *FDESC(200,6)
C
      REAL
     *STDM(1000),STDL(1000)
C
C**** COMMON FOR TRACE,DSKIN,ADMCH,MUFLO1,SIMIN,MUS,BEST,RESTA,DBL,PRTER
      COMMON/BLK18/
     *IWIR
C
      INTEGER
     *IWIR
C
C**** COMMON FOR WIPIN,ALLOC,OUTPUT
      COMMON/BLK19/
     *FWIP,DATE,TIME                                                        *NEW
C                                                                           **-1
      INTEGER
     * DATE(4),TIME(4)
C
      REAL
     * FWIP(200)
C
      REAL SUMPD(200)
C
C************************************************************************
C*    IF DIAGNOSTIC TRACE IS CALLED, PRINT HEADINGS                       *
C************************************************************************
C
      CALL DATSW (1,KD)                                                     **-1
      GO TO (5,10),KD                                                       **-1
```

```
      5 WRITE(IWTR,204)
    204 FORMAT('1 ENTER ALLOC          '//1X,'FPIO      FWIP      PLFLR',
       *5X,'SUMPD      PDWIP      PAWIP      PXWIP'/)                              *NEW
                                                                                   **-2
C
C***************************************************************************
C*     ZERO THE SUMPD ARRAY                                                *
C***************************************************************************
C
     10 DO 15 J=1,FMAX
     15 SUMPD(J)=0
C
C***************************************************************************
C*     SUM THE PDWIP'S FOR EACH FLOW POINT                                 *
C***************************************************************************
C
        DO 25 I=1,PPMAX
        NFP=PFP(I)
     25 SUMPD(NFP) = SUMPD(NFP) + PDWIP(I)
C
C***************************************************************************
C*     ALLOCATE THE FWIP, CALCULATE PXWIP                                  *
C***************************************************************************
C
        DO 35 I=1,PPMAX
        NFP=PFP(I)
        PAWIP=(FWIP(NFP)*PDWIP(I))/SUMPD(NFP)
        PXWIP(I)=PAWIP-PDWIP(I)                                                    **-2
        GO TO (30,35),KD
     30 WRITE(IWTR,205) FPID(NFP),FWIP(NFP),PLFLR(I),SUMPD(NFP),PDWIP(I),
       *PAWIP,PXWIP(I)                                                             *NEW
    205 FORMAT(5X,I4,6F10.2)                                                       *NEW
     35 CONTINUE                                                                   **-2
        RETURN
        END
```

RESTATE (RESTA) (TABLE 6)

This subroutine shown in TABLE 6 is entered via a call from MAIN, and is used for both Capacity Simulation and Dynamic Line Balancing. RESTA is called only when a bottleneck station detected by MAIN is identified as a single-use station, that is, used only by one flow point. The purpose of RESTA is to ratio down the input of each path point in the bottleneck flow point and drive the achievable output to the end of the line. The input to each path point is reduced by multiplying the existing input by the ratio of $$\frac{100\%}{\text{percentage utilization}}$$

After the inputs have been ratioed down a new output is calculated for each of these path points. These new outputs are then driven to the end of the line, thus specifying an achievable output of each line that is less than the requested demand. This discloses the production capability of the entire multi-line area with existing installed equipment.

TI-3972

TABLE 6
RESTATE (RESTA)

```
@ ELT RESTA,1,691015, 58195    , 1

SUBROUTINE RESTA(K,BFLAG,WFLAG)
C                                                                          0299 ALL
C                                                                          0110REST
C***************************************************************************
C***************************************************************************
C***************************************************************************                     0115REST
C*     RESTA IS CALLED WHEN THE UTILIZATION FOR ALL THE PATHS OF  *         0120REST
C*     A NON-MUS F.P. IS GREATER THAN 100 PERCENT.                *
C*     ITS PURPOSES ARE TO:                                       *         0130REST
C*           RATIO DOWN THE INPUTS                                *         0135REST
C*           DRIVE THE REVISED RATE TO THE END OF THE LINE        *         0140REST
C*           SET AN OUTPUT FLAG(S)                                *         0145REST
C*           SET A BOTTLENECK FLAG                                *         0150REST
C*                                                                *         0155REST
C*     AUTHOR    SUE REJMANIAK                                    *         0160REST
C***************************************************************************         0165REST
C***************************************************************************
C***************************************************************************
C
C
C****  COMMON FOR TRACE,DSKIN,ADMCH,MUFL01,MUS,BEST,RESTA,DLB,SUMMRI,SDRUM
        COMMON/BLK2/
```

TABLE 6 (CONT'D)

```
       *PATH,PAMAX,PSTA,PPMAX,FSTA
C
       INTEGER
      *PATH(1000),PAMAX,PSTA(1000),PPMAX,FSTA(200)
C
C****  COMMON FOR DSKIN,ADMCH,MUFLO1,MUS,BEST,RESTA,DLB,SUMMRI,SDRUM
       COMMON/BLK6/
      *SUSED,M4,PXWIP,SUTL,M3,PFLO,PFLR,PPUTL,WORK2,PDWIP,FMAX,PLFLO
C
       INTEGER
      *SUSED(200),M4,M3,WORK2(15),FMAX
C
       REAL
      *PXWIP(1000),SUTL(200),PFLO(1000),PFLR(1000),PPUTL(1000),
      *PDWIP(1000),PLFLO(1000)
C
C****  COMMON FOR MUFLO1,SIMIN,MUS,BEST,RESTA,DLB,ADMCH,DSKIN,SUMMRI
       COMMON/BLK10/
      *MULTD,MULTX,MNDEM,SIMIX,MXDEM,INDEM
C
       INTEGER
      *MULTD,MULTX
C
       REAL
      *MNDEM,SIMIX(15),MXDEM,INDEM
C
C****  COMMON FOR DSKIN,MUFLO1,MUS,BEST,RESTA
       COMMON/BLK13/
      *PPNTR,PEYLD,PRWKI,TFLAG,PFLAG,PPNTL
C
       INTEGER
      *PPNTR(1000),PPNTL(1000)
C
       REAL
      *PEYLD(1000),PRWKI(1000),TFLAG(15),PFLAG(15)
C
C****  COMMON FOR TRACE,DSKIN,ADMCH,MUFLO1,SIMIN,MUS,BEST,RESTA,DBL,PRTER
       COMMON/BLK18/
      *IWTR
C
       INTEGER
      *IWTR
C
       INTEGER
      *FP,ST,PP,RL
C
       DATA
      *FP/'FP'/,ST/'ST'/,PP/'PP'/,RL/'R'/                                  *NEW
       INTEGER                                                             **-1
      *BFLAG,WFLAG(15)
C
C                                                                          0170REST
C                                                                          0205REST
C***************************************************************           0210REST
C*     WFLAG ARRAY IS COMMENTED ON IN DETAIL IN 'MAIN'--REFER--  *          0211REST
C*                                                               *          0212REST
C*     IF WFLAG IS 4 THE INFERRED F,P, AND PATH'S INPUT (PFLR)   *          0215REST
C*     IS TO BE RATIOED DOWN AND ITS OUTPUT CALCULATED (PFLO)    *          0220REST
C*     INCREMENT M FOR EACH PATH THAT IS RATIOED DOWN            *          0221REST
C***************************************************************           0225REST
C                                                                          0230REST
       CALL DATSW(0,KD)                                                     REST
       GO TO (702,704),KD
  702  WRITE(IWTR,703)                                                      REST
  703  FORMAT(2X,'ENTER RESTA SUBROUTINE',///)
  704  M=0                                                                 0235REST
       L=1                                                                 0240REST
C
C***************************************************************
C*     USE WFLAG TO CONTROL LOOPING TO SET NEW RATIOED DOWN      *
C*     PFLO(S) AND PFLR(S)                                       *
C***************************************************************
C
  705  IF(WFLAG(L) - 4) 714,710,714
  710  J=L+K                                                               0250REST
       JN = PSTA(J)
       PFLR(J) = PFLR(J) * (1 / (SUTL(JN) + .001))
       IF(PFLR(J)) 711,712,712
  711  PFLR(J) = 0.0
```

TABLE 6 (CONT'D)

```
    712 PFLO(J) = PFLR(J) * PEYLD(J)                              0265REST
        M=M+1                                                     0270REST
        GO TO 718
    714 IF(WFLAG(L)) 718,722,718                                  0275REST
    718 L=L+1                                                     0280REST
        IF(L - PAMAX) 705,705,722
C
C****WFLAG USED HERE TO CONTROL PFLO DRIVE BACK LINE BY PATH***********
C
    722 L=1                                                       0290REST
    724 IF(WFLAG(L) - 4) 728,736,728
    728 IF(WFLAG(L)) 732,776,732                                  0305REST
    732 L=L+1                                                     0310REST
        IF(L - PAMAX) 724,724,776
C                                                                 0320REST
C**********************************************************       0325REST
C*    DRIVE THE REVISED INPUT RATE TO THE END OF THE LINE    *    0330REST
C*    SET WFLAG TO 5 TO INDICATE THIS PATH IN NBRH HAS       *
C*    BEEN DRIVEN TO END OF LINE AFTER RATIOED DOWN          *
C**********************************************************       0335REST
C                                                                 0340REST
    736 J=K+L                                                     0345REST
    740 IF(PPNTR(J)) 732,732,742                                  0349REST
    742 NPR=PPNTR(J)                                              0351REST
        IF(PXWIP(NPR)) 752,764,764                                0355REST
    752 PFLR(NPR)=((PFLO(J)+(PXWIP(NPR)/MULTD))/(1.0-PRWKI(NPR)))
        GO TO 768                                                 0380REST
    764 PFLR(NPR)=((PFLO(J)+(PXWIP(NPR)/MULTX))/(1.0-PRWKI(NPR)))
    768 PFLO(NPR) = PFLR(NPR) * PEYLD(NPR)
        J = NPR
        GO TO 740                                                 0415REST
C                                                                 0420REST
C**********************************************************       0425REST
C*    VALUE OF M DENOTES NUMBER OF PATHS THIS F.P. HAS       *    0426REST
C*                                                           *    0427REST
C*    WAS MORE THAN ONE PATH EFFECTED?  IF SO, SET TEMPORARY *    0430REST
C*    FLAG(S)--TFLAG--TO ENDING PATH(S) OUTPUT.  IF NOT, SET *    0435REST
C*    PERMANENT FLAG--PFLAG--TO ENDING PATH OUTPUT.          *    0440REST
C*    THEN RETURN TO MAIN                                    *    0445REST
C**********************************************************       0450REST
C                                                                 0455REST
    776 IF(M-1) 780,790,800                                       0460REST
C                                                                  REST
C**********************************************************        REST
C*    ONLY ONE PATH EFFECTED                                 *      REST
C**********************************************************        REST
C                                                                   REST
    780 L=1                                                       0465REST
    782 IF(WFLAG(L) -4) 784,788,784
    784 IF(WFLAG(L)) 786,794,786                                  0475REST
    786 L=L+1                                                     0480REST
        IF(L - PAMAX) 782,782,794
C                                                                   REST
C**********************************************************        REST
C*    GET BOTTLENECK PATH NUMBER FROM NBHD WITH BOTTLENECK   *      REST
C**********************************************************        REST
C                                                                   REST
    788 J=K+L                                                     0490REST
        MP=PATH(J)                                                0495REST
C                                                                   REST
C**********************************************************        REST
C*    SEARCH PATH ARRAY AT END OF NETWORK FOR PATH NUMBER    *      REST
C*    TO MATCH BOTTLENECKED PATH NUMBER                      *      REST
C**********************************************************        REST
C                                                                   REST
        N=1                                                       0505REST
    790 IF(PATH(N)-MP) 795,792,795                                0510REST
C                                                                   REST
C**********************************************************        REST
C*    SET PERMANENT FLAG ON EFFECTED PATH  EQUAL TO FINAL    *      REST
C*    NETWORK OUTPUT OF THIS PATH                            *      REST
C**********************************************************        REST
C                                                                   REST
    792 PFLAG(MP)=PFLO(N)                                         0515REST
C
C**********************************************************
C*    PERFORM CLOSING OPERATIONS BEFORE RETURNING TO MAIN    *
```

TABLE 6 (CONT'D)

```
C***********************************************************
C
      794 BFLAG = 1
          L = 1
     1707 IF(WFLAG(L) - 4) 1705,1704,1705
     1704 WFLAG(L) = 5
     1705 L = L + 1
          IF(L - PAMAX) 1707,1707,1706
     1706 GO TO (1700,1703),KD
     1700 WRITE(IWTR,1730)                                          REST
     1730 FORMAT(1H1,'ACHIEVED PATH POINT OUTPUT---PFLO *RATIOED DOWN*',
         *8X,'P A T H S',/)
          CALL TRACE(WFLAG,PFLO,PP,RL)
          WRITE(IWTR,1731)
     1731 FORMAT(1H1,'ACHIEVED PATH POINT INPUT---PFLR  *RATIOED DOWN*',
         *8X,'P A T H S',/)
          CALL TRACE(WFLAG,PFLR,PP,RL)
          WRITE(IWTR,1702)                                          REST
     1702 FORMAT(1X,'EXIT RESTA',///)
     1703 RETURN                                                    REST
      795 N=N+1                                                0530REST
      796 IF(N - PAMAX) 790,790,794
C                                                                   REST
C***********************************************************        REST
C*    MORE THAN ONE PATH EFFECTED                        *           REST
C***********************************************************        REST
C                                                                    REST
      800 L=1                                                  0560REST
      804 IF(WFLAG(L) -4) 808,816,808
      808 IF(WFLAG(L)) 812,794,812                             0570REST
      812 L=L+1                                                0575REST
          IF(L - PAMAX) 804,804,794
C                                                                    REST
C***********************************************************        REST
C*    GET BOTTLENECK PATH NUMBER FROM NBHD WITH BOTTLENECK  *        REST
C*    TO MATCH BOTTLENECKED PATH NUMBER                     *        REST
C***********************************************************        REST
C                                                                    REST
      816 J=K+L                                                0585REST
          MP=PATH(J)                                           0590REST
C                                                                    REST
C***********************************************************        REST
C*    SEARCH PATH ARRAY AT END OF NETWORK FOR PATH NUMBERS  *        REST
C***********************************************************        REST
C                                                                    REST
          N=1                                                  0595REST
      820 IF(PATH(N)-MP) 828,824,828                           0605REST
C                                                                    REST
C***********************************************************        REST
C*    SET TEMPORARY FLAG ON EFFECTED PATHS EQUAL TO FINAL   *        REST
C*    NETWORK OUTPUT OF THIS PATH                           *        REST
C***********************************************************        REST
C                                                                    REST
      824 TFLAG(MP)=PFLO(N)                                    0610REST
          GO TO 812
      828 N=N+1                                                0620REST
          IF(N - PAMAX) 820,820,794
          END                                                  0630REST
```

MULTI-USE STATION (MUS) (TABLE 7)

The function of this subroutine shown in TABLE 7 is similar to that of RESTA, but MUS is called only when a multiuse station is identified as a bottleneck. A multi-use station is a collection of equipment referenced by more than one flow point. MUS is called by MAIN whenever a bottleneck flow point belonging to a multi-use station is detected. It ratios down the path point inputs and then drives this new demand toward the front of the line to the first flow point using this station, in neighborhood sequence. The utilization of all the multi-use station flow points is then calculated and summed. If the summed utilization is less than 100 percent, the revised rates are driven to the end of the line and program control returned to MAIN. If the summed utilization is greater than 100 percent, then the input to the last flow point using the station is again ratioed down and the process repeated.

TI-3972

TABLE 7
MULTI-USE STATION (MUS)

@ ELT MUS,1,691015, 58199    , 1

```
      SUBROUTINE MUS (JJ)                                          0105 MUS
C                                                                  0110 MUS
C                                                                  0115 MUS
C******************************************************************0120 MUS
C******************************************************************0125 MUS
C******************************************************************0130 MUS
C*    SUBROUTINE MUS IS CALLED WHEN A F.P. IS A MULTIUSE STATION  *0135 MUS
C*    FROM THIS F.P. THE DEMAND IS DRIVEN BACK TO THE EARLIEST    *0140 MUS
C*    MULTIUSE STATION F.P.                                        0145 MUS
C*    THE UTILIZATION FOR ALL THE MULTIUSE STATION  F.P. IS       *0150 MUS
C*    CALCULATED AND SUMMED                                       *0155 MUS
C*    IF THE SUMMED UTILIZATION IS NOT GREATER THAN 100           *
C*    PERCENT RETURN TO MAIN.                                     *
C*    IF THE SUMMED UTILIZATION IS GREATER THAN 100 PERCENT       *
C*    RATIO DOWN INPUT OF ALL F.P. MULTIUSE STATIONS AND DRIVE    *
C*    REVISED RATES TO END OF LINE AND THEN RETURN TO MAIN.       *
C*                                                                 0185 MUS
C*                                                                *0190 MUS
C******************************************************************0195 MUS
C******************************************************************0196 MUS
C******************************************************************0197 MUS
C                                                                  0198 MUS
C
C**** COMMON FOR TRACE,DSKIN,MUFLO1,MUS,UBL,BEST
      COMMON/BLK1/
     *FPID,PFP
C
      INTEGER
     *FPID(200),PFP(1000)
C
C**** COMMON FOR TRACE,DSKIN,ADMCH,MUFLO1,MUS,BEST,RESTA,DLB,SUMMRI,SDRUM
      COMMON/BLK2/
     *PATH,PAMAX,PSTA,PPMAX,FSTA
C
      INTEGER
     *PATH(1000),PAMAX,PSTA(1000),PPMAX,FSTA(200)
C
C**** COMMON FOR TRACE,DSKIN,MUFLO1,MUS,BEST
      COMMON/BLK5/
     *PNBRH
C
      INTEGER
     *PNBRH(1000)
C
C**** COMMON FOR DSKIN,ADMCH,MUFLO1,MUS,BEST,RESTA,DLB,SUMMRI,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR DSKIN,ADMCH,MUFLO1,MUS,ULB,SDRUM
      COMMON/BLK7/
     *SCAPP,IDET
C
      INTEGER
     *IDET
C
      REAL
     *SCAPP(200,15)
C
C**** COMMON FOR MUFLO1,SIMIN,MUS,BEST,RESTA,DLB,ADMCH,DSKIN,SUMMRI
      COMMON/BLK10/
     *MULTD,MULTX,MNDEM,SIMIX,MXDEM,INDEM
C
      INTEGER
     *MULTD,MULTX
C
      REAL
     *MNDEM,SIMIX(15),MXDEM,INDEM
C
C**** COMMON FOR DSKIN,MUFLO1,MUS,BEST,RESTA
```

TABLE 7 (CONT'D)

```
      COMMON/BLK13/
     *PPNTR,PEYLD,PRWKI,TFLAG,PFLAG,PPNTL
C
      INTEGER
     *PPNTR(1000),PPNTL(1000)
C
      REAL
     *PEYLD(1000),PRWKI(1000),TFLAG(15),PFLAG(15)
C
C****COMMON FOR MUS,BEST,DLB,DSKIN
      COMMON/BLK15/
     *WORK3
C
      INTEGER
     *WORK3(1000)
C
C**** COMMON FOR TRACE,DSKIN,ADMCH,MUFLO1,SIMIN,MUS,BEST,RESTA,DBL,PRTER
      COMMON/BLK18/
     *IWTR
C
      INTEGER
     *IWTR
C
      INTEGER
     *FP,ST,PP,RL
C
      DATA
     *FP/'FP'/,ST/'ST'/,PP/'PP'/,RL/'R'/                              *NEW
C                                                                    **-1
C
C************************************************************
C*    ZERO OUT WORK ARRAYS                                 *   0210 MUS
C*    WORK2 HOLDS UNIQUE PATH NUMBERS OF MULTIUSE STATIONS *   0215 MUS
C*    WORK3 HOLDS RELATIVE POSITION IN NETWORK(J) OF ALL   *   0225 MUS
C*    MULTIUSE F.P. AND THEIR PATHS                        *   0230 MUS
C************************************************************  0235 MUS
C                                                               0240 MUS
      CALL DATSW(0,KD)                                          0245 MUS
      GO TO (1200,1204),KD                                           MUS
 1200 WRITE(IWTR,1201)
 1201 FORMAT(1X,'ENTER SUBROUTINE MUS',//)                           MUS
 1204 DO 900 N=1,M4
  900 WORK3(N)=0
      DO 902 N=1,15                                             0265 MUS
  902 WORK2(N)=0
      KK=0                                                      0268 MUS
      MM=0                                                      0270 MUS
      J=1                                                       0275 MUS
C                                                               0280 MUS
C************************************************************     MUS
C*    SEARCH WHOLE NETWORK FOR MULTIUSE STATION MATES TO   *       MUS
C*    MULTIUSE STATION FOUND AT POSITION JJ OF NETWORK     *
C************************************************************
C                                                                  MUS
  904 IF(PSTA(J)-PSTA(JJ)) 908,914,908                              MUS
  908 IF(PSTA(J)) 912,944,912                                  0285 MUS
  912 J=J+1                                                    0290 MUS
      IF(J - PPMAX) 904,904,944                                0295 MUS
C                                                              0305 MUS
C************************************************************     MUS
C*    STORE PATH NUMBER IN WORK2 ARRAY                     *       MUS
C*    STORE NETWORK POSITION OF MULTIUSE STATION IN WORK 3 ARRAY   MUS
C*    SAVE POSITION(KKMAX) OF WORK3 ARRAY HOLDING MULTIUSE *       MUS
C*    STATION MATE FURTHEST FROM END OF NETWORK            *
C************************************************************
C                                                                  MUS
  914 MPP = PATH(J)                                                 MUS
C
C************************************************************
C*    CHECK IF SIMIX FOR THIS PATH IS ZERO. IF SO, SKIP IT. *
C************************************************************
C
      IF(SIMIX(MPP)) 916,916,915
  915 WORK2(MPP) = 1
  916 KK = KK + 1
      KKMAX=KK
      WORK3(KK)=J                                               0330 MUS
      NN=1                                                      0335 MUS
                                                                0340 MUS
```

TABLE 7 (CONT'D)

```
      GO TO 912
C
C**********************************************************           0405 MUS
C*     FROM THE POSITION OF THE LAST MULTIUSE STATION IN THE  *        0410 MUS
C*     NETWORK, DRIVE ALL THE DEMANDS OF ALL PATHS UP TO THE   *
C*     NETWORK POSITION OF THE EARLIEST MULTIUSE STATION       *
C**********************************************************
C                                                                      0430 MUS
  944 KK = 1                                                           0435 MUS
  970 J=WORK3(KK)
  971 IF(PEYLD(J)) 978,974,978                                         0540 MUS
  974 PEYLD(J) = 1.0
  978 PFLR(J)=PFLO(J) / PEYLD(J)
      IF(PFLR(J)) 982,986,986                                          0555 MUS
                                                                       0560 MUS
  982 PFLR(J)=0                                                        0565 MUS
  986 IF(PPNTL(J)) 990,1018,990                                        0570 MUS
  990 NPL = PPNTL(J)                                                   0575 MUS
      IF(PXWIP(J)) 1014,1002,1002                                      0580 MUS
 1002 PFLO(NPL)=(PFLR(J) * (1.0 - PRWKI(J))) - (PXWIP(J) / MULTX)      0595 MUS
      GO TO 1018
 1014 PFLO(NPL)=(PFLR(J) * (1.0 - PRWKI(J))) - (PXWIP(J) / MULTD)      0605 MUS
 1018 J = J + 1                                                        0620 MUS
      IF(J - WORK3(KKMAX))971,971,1026
C
C**********************************************************           0640 MUS
C*     CALCULATE + SUM P.P. UTILIZATION FOR ALL MULTIUSE STATIONS *    0645 MUS
C**********************************************************           0650 MUS
C                                                                      0655 MUS
 1026 KK=1                                                             0660 MUS
      NS=PSTA(JJ)                                                      0670 MUS
      SUTL(NS) = 0.0
 1030 J=WORK3(KK)
 1301 IP = PATH(J)                                                     0680 MUS
      PPUTL(J) = PFLR(J) / SCAPP(NS,IP)
      GO TO (1356,1357),KD
 1356 WRITE(IWTR,1303) PNBRH(J),IP,PPUTL(J)
 1303 FORMAT(1X,'PPUTL FOR PNBRH',I4,' ON PATH',I2,' IS',F8.3)
 1357 SUTL(NS) = SUTL(NS) + PPUTL(J)
 1308 KK = KK + 1
      IF(KK - KKMAX) 1030,1030,1230
 1230 GO TO (1232,1038),KD
 1232 WRITE(IWTR,1235) SUTL(NS),FSTA(NS)
 1235 FORMAT(1X,'SUMMED MUS UTILIZATION IS ',F7.3,' FOR STATION ',I4,/)
C
C**********************************************************           0715 MUS
C*     IF SUMED UTILIZATION IS NOT GREATER THAN 100 PERCENT,   *       0720 MUS
C*     RETURN.  IF SUMED UTILIZATION IS GREATER THAN 100 PERCENT *
C*     RATIO DOWN MULTIUSE STATION INPUT                        *
C**********************************************************
C                                                                      0740 MUS
 1038 IF(SUTL(NS) - 1.0) 1240,1240,1044                                0745 MUS
 1240 GO TO (1242,1040),KD
 1242 WRITE(IWTR,1244)
 1244 FORMAT(1X,'EXIT MUS',///)                                             MUS
 1040 RETURN
 1044 GO TO (1358,1359),KD                                             0755 MUS
 1358 WRITE(IWTR,1302)
 1302 FORMAT(1H1,'*PFLR*   AFTER DRIVING DEMAND TO EARLIEST MUS  -- BEFO
     *RE RATIOING DOWN',/)
      CALL TRACE(IDUM,PFLR,PP,RL)
 1359 DO 1052 KK=1,KKMAX
 1048 J=WORK3(KK)
      PFLR(J) = PFLR(J) * (1 / (SUTL(NS) + .001))                      0765 MUS
      PFLO(J) = PFLR(J) * PEYLD(J)
 1052 CONTINUE                                                         0775 MUS
C*
C
C*     PLACE HIGHEST NETWORK POSITION OF EACH MULTIUSE STATION   *
C*     PATH INTO WORK2 ARRAY                                     *
C
      DO 1380 KK=1,KKMAX
      J = WORK3(KK)
      MPP = PATH(J)
 1380 WORK2(MPP) = J
C**********************************************************
C****  DRIVE RATIOED DOWN PFLO OF MULTIUSE STATION TO END OF LINE
C****  BY PATH FROM EARLIEST MULTIUSE STATION PATH POINT IN EACH   *
C****  PATH                                                        *
C**********************************************************
```

TABLE 7 (CONT'D)

```
C*
         DO 1372 I=1,15
         IF(WORK2(I)) 1372,1372,1381
 1381 J = WORK2(I)
 1340 IF(PPNTR(J)) 1372,1372,1342
 1342 NPR = PPNTR(J)
         IF(PXWIP(NPR)) 1352,1364,1364
 1352 PFLR(NPR) = ((PFLO(J)+(PXWIP(NPR)/MULTU))/(1.0-PRWKI(NPR)))
         GO TO 1368
 1364 PFLR(NPR) = ((PFLO(J)+(PXWIP(NPR)/MULTX))/(1.0-PRWKI(NPR)))
 1368 PFLO(NPR) = PFLR(NPR) * PEYLD(NPR)
         J = NPR
         GO TO 1340
 1372 CONTINUE
C
C
C*    REPLACE INTO WORK2 ARRAY THE NUMBER OF EACH MULTIUSE        *
C*    STATION PATH FOR LATER USE.                                 *
C
         DO 1388 I=1,15
         IF( WORK2(I) ) 1388,1388,1387
 1387 WORK2(I) = I
 1388 CONTINUE
C
C************************************************************   0890 MUS
                                                                 0895 MUS
C*    SET FLAGS ON MULTIUSE STATION PATHS                   *    0905 MUS
C************************************************************   0910 MUS
C                                                                0915 MUS
 1100 J=1                                                        0920 MUS
 1104 MPP=1                                                      0925 MUS
         GO TO 1116
C
C************************************************************
C*    PERFORM CLOSING OPERATIONS AND THEN RETURN TO MAIN     *
C************************************************************
C
 1270 GO TO (1271,1112),KD
 1271 WRITE(IWTR,1272)
 1272 FORMAT(1H1,'MUS UTILIZATION > 100(',///,1X,'ACHIEVED PATH POINT OU     MUS
        *TPUT--PFLO**AFTER RATIOED DOWN',5X,'P A T H S',/)
         CALL TRACE(WORK2,PFLO,PP,RL)
         WRITE(IWTR,1273)
 1273 FORMAT(1H1,'ACHIEVED PATH POINT INPUT--PFLR**AFTER RATIOED DOWN',
        *5X,'P A T H S',/)
         CALL TRACE(WORK2,PFLR,PP,RL)
         WRITE(IWTR,1244)
 1112 RETURN                                                                 MUS
C*                                                                     0935 MUS
C**** CHECK WORK2 ARRAY TO SEE IF PATH OF NETWORK POSITION
C**** J IS ONE OF THE MULTIUSE STATION PATHS AND THEREFORE ABLE
C**** TO BE FLAGGED
C*
 1116 IF(WORK2(MPP) - PATH(J)) 1124,1120,1124                         0940 MUS
 1120 MP=PATH(J)                                                      0945 MUS
         TFLAG(MP) = PFLO(J)                                          0950 MUS
         GO TO (1280,1122),KD
 1280 WRITE(IWTR,1282) TFLAG(MP),MP
 1282 FORMAT(1X,'TEMPORARY FLAG OF ',F10.3,' PUT ON PATH ',I2)              MUS
 1122 GO TO 1128
 1124 MPP = MPP+1                                                     0955 MUS
         IF(MPP - PAMAX) 1116,1116,1128                               0960 MUS
 1128 J=J+1
         IF(J - PAMAX) 1104,1104,1270                                 0970 MUS
         END
```

ADD MACHINES (ADMCH) (TABLE 8)

The purpose of this subroutine shown in TABLE 8 is to simulate the addition of equipment at bottleneck stations in the network. First a Summary Report is generated to reveal the initial condition of the network. At each successive demand level a Cycle Report is printed as to the equipment needed to resolve the bottlenecks. As each demand level is satisfied, a Summary Report prints the incremental amount of equipment, space and people required. Resolution of a bottleneck occurs at 95 percent capacity utilization; that is, whenever flow point demand divided by capacity is greater than 95 percent, enough equipment will be added to reduce utilization to below 95 percent.

This subroutine is used only for Capacity Simulation runs. It is called by MAIN after the network has been initially balanced.

TI-3972

@ ELT ADMCH,1,700206, 56562 , 1

TABLE 8
ADD MACHINES (ADMCH)

```
      SUBROUTINE ADMCH(ICYC,IMXSW)
C*****************************************************************
C               SUBROUTINE ADMCH ***           ***
C
C        THIS SUBROUTINE SIMULATES THE ADDITION OF EQUIPMENT
C        AT THE BOTTLENECK STATIONS IN THE NETWORK. THE PROGRAM
C        ADDS ENOUGH EQUIPMENT TO ELIMINATE EACH BOTTLENECK AS
C        THE NETWORK IS BROUGHT UP TO MAXIMUM DEMAND. AT THE
C        BEGINNING OF EACH DEMAND SERIES A SUMMARY REPORT IS
C        GENERATED TO GIVE THE INITIAL CONDITION OF THE NETWORK.
C        FOR EACH DEMAND LEVEL, A CYCLE REPORT IS PRINTED IF
C        EQUIPMENT WAS NEEDED TO RESOLVE ANY BOTTLENECKS. WHEN
C        A DEMAND LEVEL IS SATISIFIED, A SUMMARY REPORT IS PRINTED.
C
C*****************************************************************
      DIMENSION PAPEP(15)
C**** COMMON FOR TRACE,DSKIN,ADMCH,MUFLO1,MUS,BEST,RESTA,DLB,SUMMRI,SDRUM
      COMMON/BLK2/
     *PATH,PAMAX,PSTA,PPMAX,FSTA
C
      INTEGER
     *PATH(1000),PAMAX,PSTA(1000),PPMAX,FSTA(200)
C
C**** COMMON FOR DSKIN,ADMCH,DLB,SUMMRI,SDRUM
      COMMON/BLK3/
     *SMAX,PLANT,FCC,DEPT,PCYLD,PNAME,SDESC,PSTD,DTE
C
      INTEGER
     *SMAX,PLANT(6),FCC(6),DEPT(6),PNAME(15,6),SDESC(200,6),DTE(3)
C
      REAL
     *PCYLD(15),PSTD(1000)
C
C**** COMMON FOR DSKIN,ADMCH,SDRUM
      COMMON/BLK4/
     *SQFTA,SQFTI,CMCHA,CMCHI,SCAPA,SPERF,NMACH,SHRS,SUTIL
C
      INTEGER
     *SQFTA(200),SQFTI(200),SPERF(200),NMACH(200),SUTIL(200)
C
      REAL
     *CMCHA(200),CMCHI(200),SCAPA(200,15),SHRS(200)
C
C**** COMMON FOR DSKIN,ADMCH,MUFLO1,MUS,BEST,RESTA,DLB,SUMMRI,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR DSKIN,ADMCH,MUFLO1,MUS,DLB,SDRUM
      COMMON/BLK7/
     *SCAPP,IDET
C
      INTEGER
     *IDET
C
      REAL
     *SCAPP(200,15)
C
C**** COMMON FOR ADMCH,SIMIN
      COMMON/BLK8/
     *HWK
C
      REAL
     *HWK
C
C**** COMMON FOR ADMCH,MUFLO1,DBL
      COMMON/BLK9/
     *PLFLR,CYC
C
      INTEGER
     *CYC
```

TABLE 8 (CONT'D)

```
C
      REAL
     *PLFLR(1000)
C
C**** COMMON FOR MUFLO1,SIMIN,MUS,BEST,RESTA,DLB,ADMCH,DSKIN,SUMMRI
      COMMON/BLK10/
     *MULTD,MULTX,MNDEM,SIMIX,MXDEM,INDEM
C
      INTEGER
     *MULTD,MULTX
C
      REAL
     *MNDEM,SIMIX(15),MXDEM,INDEM
C
C**** COMMON FOR SIMIN,DLB,ADMCH,SUMMRI
      COMMON/BLK11/
     *OHFAC,IRDR
C
      INTEGER
     *IRDR
C
      REAL
     *OHFAC
C
C**** COMMON FOR DSKIN,SIMIN,DLB,ADMCH,SUMMRI,SDRUM
      COMMON/BLK12/
     *PLCDE,FCDE,DCDE,HDAY,HRS
C
      INTEGER
     *PLCDE,FCDE,DCDE
C
      REAL
     *HRS(4,3),HDAY
C
C
C**** COMMON FOR DSKIN,MUFLO1,SIMIN,DBL,ADMCH,SUMMRI
      COMMON/BLK14/
     *OPT
      INTEGER
     *OPT(15)
C
C**** COMMON FOR DSKIN,DLB,SUMMRI,ADMCH
      COMMON/BLK17/
     *FDESC,STDM,STDL
C
      INTEGER
     *FDESC(200,6)
C
      REAL
     *STDM(1000),STDL(1000)
C
C**** COMMON FOR TRACE,DSKIN,ADMCH,MUFLO1,SIMIN,MUS,BEST,RESTA,DBL,PRTER
      COMMON/BLK18/
     *IWTR
C
      INTEGER
     *IWTR
C THIS BLOCK FOR ADMCH AND SUMMRI ONLY
      COMMON/BLK21/
     *TCOST,SSQFT,SU,CU,ACUMY,PAPEP,ATOTL,AMIX(15)
C
C
C**** COMMON FOR ADMCH,SNPRPT
      COMMON/BLK24/
     *IADD,IDATE
C
C**** COMMON FOR SNAP1,SNPRPT,MUFLO,ADMCH,MAIN
      COMMON/BLK25/
     *NPGE,KALLS,JOPT,KOPT
C
C
C
C
C**** VARIABLES AND ARRAYS USED BY SUBROUTINE ADMCH
C
      INTEGER IDATE(2), QTR(2), FMT(20),IADD(200)
     *,       FRSTC , FRSTS , FSTCY , FISTA , FIAS , FSFT , FTFN
     *,       NTSU , JPATH , NSTA , PGE , LIN , ADDSW
     *,   BLK/' '/,ASK/'*'/,NFLAG(200)
```

TABLE 8 (CONT'D)

```
C
      REAL    ROUT(15) , AOUT(15) , WROUT(15) , WAOUT(15)
     *,       RMIX(15),PCUTL(15)
     *,       FROT(15) , FWROT(15) , FRMIX(15)
     *,       MP(4) , PERCT(4)
     *,       MOMAT,MOLAB,MOH,IPUTL,KUTL                         *NEW
C                                                                **-1
C
      DATA    FRSTC/0/ , FRSTS/0/ , FSTCY/0/ , FTSTA/0/ , ADDSW/0/
     *,       NTSU/0/ , JPATH/0/ , FTAS/0/, CYC/0/ , PGE/0/ , LIN/0/
     *,FSFT/0/,FTFN/0/,SPO/0./,SACT/0./,ACUMY/0./,RTOTL/0./,ATOTL/0./
     *,      PERCT/95.,95.,95.,95./
     *,IROGSW/0/,NFLAG/200*' '/
C
      DATA QTR/'QTR ',' '/,FMT/' ',' ','4TH ','1969','1ST ','19
     *70','2ND ','1970','3RD ','1970','4TH ','1970','1ST ','1971',
     *'2ND ','1971','3RD ','1971','4TH ','1971'/
  750 MSWTCH = 0
C
C***** IF ICYC=0 , CYCLE REPORT OTHERWISE , SUMMARY REPORT
C
      IF(OPT(2).EQ.4) IWTR = 10
      IF(PGE.GT.0) GO TO 752
      DO 751 I = 1,SMAX
  751 IADD(I) = 0
      ACUMY = 0
      ATOTL = 0
  752 IF(ICYC) 1000,10,1000
C
C***************************************************************
C***************************************************************
C
C                  *** CYCLE REPORT ***
C
C***************************************************************
C***************************************************************
C
C
C
C***** SET VARIABLES AND ARRAYS USED IN CYCLE REPORT TO ZERO
C
   10 SPD   =0.0
      SACT  =0.0
      ACUMY =0.0
      RTOTL =0.0
      ATOTL =0.0
      IF(OPT(2)-3) 12,11,12
   12 IF(OPT(2) - 4) 16,11,16
   11 IWIR=10
   16 DO 15 I=1,15
      AOUT(I)  = 0.0
      WROUT(I) = 0.0
      WAOUT(I) = 0.0
      RMIX(I)  = 0.0
      AMIX(I)  = 0.0
      WORK2(I) = 0
      PCUTL(I) = 0.0
      PAPEP(I) = 0.0
   15 CONTINUE
C
C***** IF FIRST SIMULATION CYCLE , INITIALIZE VARIABLES
C
      IF(FRSTC)30,20,30
C
C***** INITIAL CONDITIONS FOR FIRST SIMULATION CYCLE
C
   20 FRSTC = 1
      CYC   = 0
      FACHV = 0.
      DO 21 K=1,PAMAX
   21 FACHV = FACHV + PFLO(K)
C                                    ESTABLISH THE FOUR (4) MID-POINTS
      MP(1) = (MXDEM + FACHV) / 2.
      MP(2) = (MXDEM + MP(1)) / 2.
      MP(3) = (MXDEM + MP(2)) / 2.
      MP(4) = (MXDEM + MP(3)) / 2.
C
```

TABLE 8 (CONT'D)

```
C
C***** CALL DATE FROM COMPUTER
C
      CALL DATE(IDATE)
C
C
      DO 25 I=1,M3
   25 IADD(I)=0
C
C**** INCREMENT CYCLE COUNTER
C
   30 CYC = CYC + 1
      IF(FTAS) 32,31,32
C
C**** INCREMENT PAGE COUNTER
   31 PGE = PGE + 1
C
C***** PRINT HEADINGS FOR CYCLE REPORT
C
      WRITE(IWTR,500) IDATE,FMT(KOPT),QTH(JOPT),FMT(KOPT+1),DTE
  500 FORMAT(1H1,'TI STRICTLY PRIVATE',93X,'TI STRICTLY PRIVATE',/,50X,
     *'CAPACITY  SIMULATION  SYSTEM',/,1X,'DATE',4X,2A6,67X,3A4,13X,
     *'DATA AS OF ',I2,'/',I2,'/',I2)
C
      WRITE(IWTR,510)PLANT,FCC,DEPT,PGE,PLCDE,FCDE,DCDE
  510 FORMAT(1X,'PLANT - ',6A2,10X,'FCC/PCC-',6A2,10X,'AREA-',6A2,10X,
     *'CYCLE REPORT',24X,'PAGE',I4,/,1X,'CODE',4X,I3,'-',I3,'-',I3,/)
C
      WRITE(IWTR,520)
      FTAS = 1
  520 FORMAT(1H0,2X,'SIMULATION       TOTAL REQUESTED     TOTAL ACHIEVAB
     *LE             STATION         TOTAL MACH    PATHS   .CAPACITY
     *    PCT',/,1X,' CYCLE          OUTPUT (UNITS/HR)      OUTPUT(UNITS
     */HR)         ID    DESCRIPTION         ADDED    AFFECTED   (UNITS/
     *HR)    UTL',/)
C
C**** SET LINE COUNT
      LIN = 11
C
C
C
C***** CALCULATE TOTAL PLANNED AND ACHIEVABLE OUTPUT FOR THE NETWORK
C
C
C***** TOTAL UNITS/HOUR
C
   32 DO 40 I = 1,PAMAX
      SPO = SPO + PLFLO(I)
   40 SACT=SACT + PFLO(I)
C
C***** TOTAL UNITS/WEEK
C
      SPOW  = SPO*HWK
      SACTW = SACT*HWK
C
C
C
C***** CALCULATE FOR ALL PATHS
C
C***** 1. REQUESTED OUTPUT (HOUR - WEEK)
C***** 2. ACHIEVABLE OUTPUT (HOUR - WEEK)
C***** 3. REQUESTED MIX
C***** 49
C***** 4. ACHIEVABLE MIX
C***** 5. CUMULATIBE YIELD
C
      DO 50 I=1,PAMAX
C
      ROUT(I)  = PLFLO(I)
      AOUT(I)  = PFLO(I)
C
      WROUT(I) = ROUT(I) * HWK
      WAOUT(I) = AOUT(I) * HWK
C
      RMIX(I)  = PLFLO(I) / SPO
      AMIX(I)  = PFLO(I) / SACT
C
C***** SUM THE AVERAGE CUM. YIELD
C
```

TABLE 8 (CONT'D)

```
   50 ACUMY    = ACUMY + (PCYLD(I) * AMIX(I))
C
C
C***** CALCULATE PEOPLE (REQD. AND ACHIEVABLE)
      DO 60 IPP=1,PPMAX
      RTOTL = RTOTL + (PLFLR(IPP) / PSTD(IPP))
      Z= PFLR(IPP)/ PSTD(IPP)
      ATOTL= ATOTL + Z
      K= PATH(IPP)
   60 PAPEP(K)= PAPEP(K) + Z
C
C
      IF(FSFT) 221,65,221
   65 IF(OPT(3) - 1) 66,73,66
   66 IF(CYC)232,232,71
   71 IF(CYC-1) 73,72,73
   72 IF(OPT(2)-1) 84,73,82
   82 IF(OPT(2)-3) 84,84,73
   84 MSWTCH = 1
      IWTR=10
      GO TO 87
   89 CALL SUMMRI
      IF(OPT(2).EQ.4) GO TO 73
      IWTR=6
      LIN = 11
      GO TO 73
C
C
C***** RESOLVE BOTTLENECKS
C
C
C
C
C***** INITIAL CONDITIONS
C
C                                     ESTABLISH THE ACHIEVABLE OUTPUT
C                                     OF THE NETWORK
      ENTRY IROG
C***** ENTRY POINT FOR A CALL FROM MAIN WHENEVER A BALANCE IS
C***** DESIRED ONLY AT THE INCREMENTAL DEMAND LEVELS.
C*****
C***** IROGSW = 1 WHENEVER THIS CONDITION EXISTS, OTHERWISE IROGSW = 0.
C*****
      IROGSW = 1
   73 ACHV = 0.
      DO 14 K=1,PAMAX
   14 ACHV = ACHV + PFLO(K)
C                                     ESTABLISH THE COMPAIRING PER-CENT
C                                     USING MIDPOINTS BASED ON ORGIONAL
C                                     LINE CAPACITY. START AT THE FIRST
C                                     MID-POINT
      M = 1
  119 IF(ACHV - MP(M)) 115,115,112
  112 M = M + 1
      IF(M-4) 114,115,115
  114 GO TO 119
  115 UTL = 0.
C
C***** J IS THE COUNTER FOR THE TOTAL NUMBER OF STATIONS
C
      J = 1
C
C***** I IS THE COUNTER FOR THE TOTAL NUMBER OF PATH POINTS
C
   74 KADD = 0
   75 I = 1
C
C***** HAVE WE FOUND A STATION MATCH
C
   80 IF(PSTA(I) - J) 100,85,100
C
C***** MATCH
C
   85 JPATH = PATH(I)
      TUTL = 100.*(PFLR(I)/SCAPP(J,JPATH))
      PCUTL(JPATH) = PCUTL(JPATH) + TUTL
      UTL = UTL + TUTL
      WORK2(JPATH) = 1
C
```

TABLE 8 (CONT'D)

```
C***** IS THIS THE LAST PATH POINT
C
  100 IF(PPMAX - I)110,120,110
  110 I=I+1
      GO TO 80
C
C***** IS THE UTILIZATION WITHIN LIMITS
C
  120 IF(UTL - PERCT(M)) 140,140,129
C
C*****CALL SNPRPT FOR EQUIPMENT REPORT AT 1ST CYCLE REPORT
C
  129 IF(OPT(2) .NE. 4) GO TO 130
      IF(CYC .NE. 1) GO TO 130
      IF(KALLS .NE. 0) GO TO 130
      KALLS = 1
      NCALL = 1
      IWTR = 6
      CALL SNPRPT(NCALL)
C
C***** ADD EQUIPTMENT TO THE BOTTLENECK STATION
C
  130 ADDSW = 1
      DO 131 K=1,PAMAX
      IF(WORK2(K)) 132,131,132
  132 SCAPP(J,K) = SCAPP(J,K) + SCAPA(J,K)
  131 CONTINUE
      KADD = KADD + 1
      IADD(J) = IADD(J) + 1
      NFLAG(J) = ASK
C
C***** RETURN TO THE FIRST PATH POINT AND TRY AGAIN
C
      UTL = 0.
      DO 86 K=1,15
      PCUTL(K) = 0
      WORK2(K) = 0
   86 CONTINUE
      GO TO 75
C
C
C
C***** UTILIZATION IS OK NOW . CHECK TO SEE IF ANY EQUIPTMENT WAS ADDED
C***** IF NO EQUIPMENT WAS ADDED , SKIP AROUND THE FOLLOWING PRINT
C***** STATEMENTS
C
  140 IF(IROGSW - 1) 207,209,207
  207 IF(ADDSW) 209,209,139
C
C***** PRINT STATION INFORMATION
C
C***** CHECK FOR POSSIBLE PAGE OVERFLOW
C
  139 IF((LIN+PAMAX) - 55) 145,145,141
C
C***** UP PAGE COUNTER , RESET LINE COUNTER AND WRITE NEW HEADINGS
C
  141 LIN = 11
      PGE = PGE + 1
      WRITE(IWTR,500) IDATE,FMT(KOPT),QTR(JOPT),FMT(KOPT+1),DTE
      WRITE(IWTR,510) PLANT,FCC,DEPT,PGE,PLCDE,FCDE,DCDE
      WRITE(IWTR,520)
      FSTCY = 0
C
  145 DO 190 NP=1,15
      IF(WORK2(NP))150,190,150
C
  150 WRITE(IWTR,550)NP,SCAPP(J,NP),PCUTL(NP)
  550 FORMAT(103X,I2,7X,F7.0,5X,F4.0)
C
      LIN = LIN + 1
C
      IF(FSTCY) 170,160,170
C
  160 FSTCY = 1
C
      WRITE(IWTR,560) CYC,SPO,SACT
  560 FORMAT(1H+,5X,I3,13X,F7.0,14X,F7.0)
```

TI-3972

TABLE 8 (CONT'D)

```
C
  170 IF(NSTA) 190,180,190
C
  180 NSTA = 1
C
      WRITE(IWTR,570)FSTA(J),(SDESC(J,K),K=1,6),KADD
  570 FORMAT(1H+,61X,I4,3X,6A2,9X,I3)
C
  190 CONTINUE
C
C
C***** IS THIS THE LAST STATION
C
  209 IF(J - SMAX) 210,200,200
C
C***** RESET FOR ANOTHER STATION
C
  210 J = J +1
      ADUSW = 0
      UTL=0.0
      NSTA=0
C
      DO 215 K=1,15
      WORK2(K)=0
      PCUTL(K)=0
  215 CONTINUE
C
C***** J NOW CONTAINS THE INDEX OF THE NEXT STATION
C***** RETURN TO THE BOTTLENECK SECTION
C
      GO TO 74
C
C
C
C
C***** RESET AND RETURN TO CALLING PROGRAM
C
  200 FSTCY = 0
      ADUSW = 0
      NSTA = 0
      IRUGSW = 0
      NTSU = 0
C
      IF(IMXSW - 1) 205,611,205
  205 IWTR = 6
      RETURN
C
C
C
C
C
C*************************************************************
C*************************************************************
C
C                    *** SUMMARY REPORT ***
C
C*************************************************************
C*************************************************************
C
C
C
C
 1000 IF(FRSTS)230,220,230
C
C***** SET FIRST SWITCH AND PUT IN FIRST CYCLE DATA
C
  220 FRSTS = 1
      IF(SPO)  221,222,221
  222 FSFT = 1
      GO TO 32
  221 FSFT = 0
      FSPO = SPO
      FSPOW = SPOW
      FRTOT = RTOTL
C
      DO 229 NP=1,PAMAX
      FROT(NP)  = ROUT(NP)
      FWROT(NP) = WROUT(NP)
```

TABLE 8 (CONT'D)

```
      FRMIX(NP) = RMIX(NP)
  229 CONTINUE
C
C
  230 IF(CYC) 231,231,232
  231 IF(FTFN) 233,233,234
  233 FTFN = 1
      GO TO 230
  234 SPO = 0.
      SACT = 0.
      ACUMY = 0.
      RTOTL = 0.
      ATOTL = 0.
      GO TO 32
C
C***** INCREMENT PAGE COUNTER AND CALL DATE FROM COMPUTER
C
  232 PGE = PGE + 1
C
      CALL DATE(IDATE)
C
C
C***** PRINT SUMMARY HEADINGS
C
      IF(OPT(2)-2) 701,700,701
  700 IF(PGE-1) 702,701,702
  702 IWTR=10
  701 WRITE(IWTR,500) IDATE,FMT(KOPT),QTR(JOPT),FMT(KOPT+1),DTE
C
C
      WRITE(IWTR,1020) PLANT,FCC,DEPT,PGE,PLCDE,FCDE,DCDE
 1020 FORMAT(1X,'PLANT - ',6A2,10X,'FCC/PCC-',6A2,10X,'AREA-',6A2,10X,
     *'SUMMARY REPORT',22X,'PAGE ',I3,/,1X,'CODE',4X,I3,'-',I3,'-',I3,/)
C
C
      WRITE(IWTR,1030)
 1030 FORMAT(10X,'PRODUCT LINE',13X,'CUMULATIVE',7X,
     *'REQUESTED OUTPUT--FIRST CYCLE         ACHIEVABLE OUTPUT   ',/
     *,34X,'  YIELD     ',9X,'UNITS/HR UNITS/WK MIX',12X,'UNITS/HR UNIT
     *S/WK MIX',//)
C
      ACUMY = 0
      SACT = 0.
      ATOTL = 0.
      DO 298 NP=1,PAMAX
  298 SACT = SACT + PFLO(NP)
      SACTW = SACT * HWK
      DO 299 NPP=1,PPMAX
  299 ATOTL = ATOTL + (PFLR(NPP) / PSTD(NPP))
      DO 300 NP=1,PAMAX
      AOUT(NP) = PFLO(NP)
      WAOUT(NP) = AOUT(NP) * HWK
      AMIX(NP) = PFLO(NP) / SACT
      ACUMY = ACUMY + (PCYLD(NP) * AMIX(NP))
  300 WRITE(IWTR,1040) NP,(PNAME(NP,K),K=1,6),PCYLD(NP),FROT(NP),
     *                 FWROT(NP),FRMIX(NP),AOUT(NP),WAOUT(NP),AMIX(NP)
 1040 FORMAT(8X,I2,'. ',6A2,13X,F5.3,12X,2F9.0,F5.2,10X,2F9.0,F5.2)
C
C
      WRITE(IWTR,1050)ACUMY,FSPO,SACT,FSPOW,SACTW,FRTOT,ATOTL
 1050 FORMAT(1H0,54X,'TOTAL PRODUCT MIX',///,10X,'AVERAGE CUM. YIELD =',
     *F6.3,4X,'REQUESTED OUTPUT--FIRST CYCLE         ACHIEVABLE OUTPUT
     *        ',//,47X,'= ',F8.0,' UNITS/HR',13X,'= ',F8.0,' UNITS/HR',
     *  /,47X,'=',F9.0,' UNITS/WK',13X,'=',F9.0,' UNITS/WK',
     6/,47X,'= ',F8.0,' PEOPLE/SHIFT',9X,'= ',F8.0,' PEOPLE/SHIFT',//)
      WRITE(IWTR,1060)
 1060 FORMAT(1X,130(1H*),//,4X,'STATION    STA  PCT PRF HRS.   MCH   TOT
     *   SQ.    COST   PROD   CAPACITY UNITS/HR   PA/STA    STA      PA
     */STA  STA  PEOPLE',/,
     *5X,'DESC        ID  UTL RTE /DAY INST  MCH      FT.    $      LINE
     *  INSTL  ADDED  TOTAL  VOLUMN    VOLUMN    UTL      UTL    REQ.',/)
C
C***** SET LINE COUNTER
C
      LIN = 26 + PAMAX
C
C***** INITIAL CONDITIONS FOR SUMMARY REPORT
C
   87 NTSU=0
```

TI-3972

```
              SSQFT = 0
              TCOST = 0
              SVOL = 0
              SPUTL = 0
              SPEO = 0
              SSVOL = 0
              SSUT = 0
              SSPEO = 0
              TVOL = 0
              TPEO = 0
              CF = 0
              SF = 0
              FTSTA = 0
      C
      C
      C
      C
      C
      C***** MAIN DO LOOP FOR SUMMARY REPORT (DRIVEN FROM 1 - SMAX)
      C
      C
              DO 400 J=1,SMAX
      C
      C
      C***** TEST FOR POSSIBLE PAGE OVERFLOW
      C
              IF((LIN+PAMAX)-58) 254,253,253
      C
      C***** INCREMENT PAGE COUNTER , PRONT NEW HEADINGS AND SET LINE COUNT
      C
          253 IF(MSWTCH) 1354,1354,1353
         1354 PGE = PGE + 1
      C
         1353 WRITE(IWTR,500) IDATE,FMT(KOPT),GTR(JOPT),FMT(KOPT+1),DTE
              WRITE(IWTR,1020) PLANT,FCC,DEPT,PGE,PLCDE,FCDE,DCDE
              WRITE(IWTR,1060)
      C
              LIN = 8
      C
      C
      C***** CALCULATE FOR THIS STATION
      C***** 1. MACHINES ADDED
      C***** 2. SQUARE FEET
      C***** 3. COST
      C
          254 MCHAD = NMACH(J) + IADD(J)
              SGFT = SQFTI(J) + (IADD(J)*SQFTA(J))
              COST = CMCHI(J) + (IADD(J)*CMCHA(J))
      C
      C***** SUM ABOVE VARIABLES FOR MAIN TOTALS
      C
              SSQFT = SSQFT + SQFT
              TCOST = TCOST + COST
              KUTL = 0
      C
      C
      C
      C***** SECONDARY DO LOOP FOR LINE OF STATION OUTPUT
      C***** DO FOR ALL PATHS IN THE NETWORK (1 - PAMAX)
      C
              DO 310 I=1,PAMAX
      C
              IPU = 0
      C
      C***** DO LOOP FOR ALL PATH POINTS WITHIN THE PATH (I)
      C
              DO 250 II=1,PPMAX
              IF(PSTA(II) - J) 250,255,250
          255 IF(PATH(II)-I)250,256,250
          256 SVOL = SVOL + PFLR(II)
              SPUTL = SPUTL + PPUTL(II)
              SPEO = SPEO + (PFLR(II)/PSTD(II))
      C
              IPU = 1
      C
          250 CONTINUE
      C
              IF(IPU) 309,309,257
      C
```

TABLE 8 (CONT'D)

TABLE 8 (CONT'D)

```
C***** SUM THE ABOVE VARIABLES FOR STATION TOTALS
C
  257 SSVOL = SSVOL + SVOL
      SSUT = SSUT + SPUTL
      SSPEO = SSPEO + SPEO
C
C***** CALCULATE ADDED AND INSTALLED CAPACITY
C
      ACAP = SCAPA(J,I)*IADD(J)
      RICAP = SCAPP(J,I) - ACAP
C
C***** PRINT STATION LINE OF OUTPUT
C
      IPUTL = (SVOL / SCAPP(J,I)) * 100.
      KUTL = KUTL + IPUTL
      WRITE(IWTR,1070) I,RICAP,ACAP,SCAPP(J,I),SVOL,IPUTL,SPEO
 1070 FORMAT(61X,I2,1X,4F8.0,11X,F4.0,9X,F6.1)
C
      LIN = LIN + 1
C
C***** IS THIS THE FIRST TIME FOR THIS STATION
C
      IF(FTSTA) 309,260,309
C
  260 FTSTA = 1
C
      WRITE(IWTR,1080)(SDESC(J,K),K=1,6),FSTA(J),SUTIL(J),SPERF(J)
     *,SHRS(J),NMACH(J),MCHAD,NFLAG(J),SQFT,COST
 1080 FORMAT(1H+,6A2,1X,I4,2X,I3,1X,I3,F5.1,1X,I4,1X,I4,A1,1X,F7.0,F6.0)
C
C
C***** RESET PATH SUMS WITHIN A STATION
C
  309 SVOL = 0
      SPUTL = 0
      SPEO = 0
C
C
  310 CONTINUE
      WRITE(IWTR,3039) SSVOL,KUTL
 3039 FORMAT(1H+,99X,F8.0,8X,F4.0)
C
C
C
C***** SUM ABOVE VARIABLES FOR GRAND TOTALS
C
      TVOL = TVOL + SSVOL
      TPEO = TPEO + SSPEO
C
C***** COMPUTE COST AND SQ. FT. FACTORS
C
      CF = CF + (SSUT*COST)
      SF = SF + (SSUT*SQFT)
C
C     RESET STATION VARIABLES, SAVE STATION VOLUME FOR EQUIP
C
C
      SSVOL = 0
      SSUT = 0
      SSPEO = 0
      FTSTA = 0
C
C***** END OF MAIN DO LOOP (BY STATION)
C
  400 CONTINUE
C
C
C
C
C***** GRAND TOTALS FOR SUMMARY REPORT
C
C
C
C***** TEST FOR POSSIBLE PAGE OVERFLOW
C
      IF((LIN+6)-58) 605,600,605
C
  600 IF(MSWTCH) 1364,1364,1363
 1364 PGE = PGE + 1
```

TI-3972

TABLE 8 (CONT'D)

```
C
 1365 WRITE(IWTR,500) IDATE,FMT(KOPT),QTR(JOPT),FMT(KOPT+1),DTE
      WRITE(IWTR,1020) PLANT,FCC,DEPT,PGE,PLCDE,FCDE,DCDE
      WRITE(IWTR,1060)
C
      LIN = 8
C
C***** GRAND TOTALS FOR ALL STATIONS WITHIN THIS NETWORK
C
  605 WRITE(IWTR,1100) SSQFT,TCOST
 1100 FORMAT(46X,6(1H-),1X,7(1H-),/,28X,'TOTALS',10X,F7.0,F8.0)
      LIN = LIN + 5
C
C
C
C***** COMPUTE CAPITAL AND SPACE UTILIZATION
C***** IF TOTAL SQ. FT. OR COST IS ZERO , SKIP AROUND THE FOLLOWING
C***** CALCULATIONS AND PRINT STATEMENT
C
      IF(SSQFT) 620,620,625
  625 SU = (SF/SSQFT) * 100.
  620 IF(TCOST) 3012,3012,630
  630 CU = (CF/TCOST) * 100.
C
C***** LAST LINE OF SUMMARY REPORT
C
      WRITE(IWTR,1200) CU,SU
 1200 FORMAT(1H0,27X,'APPROXIMATE CAPITAL UTILIZATION   ',F5.1,' PERCENT
     *', // ,    28X,'APPROXIMATE  SPACE  UTILIZATION   ',F5.1,' PERCENT
     *')
C
C***** DETERMINE IF COST SIMULATION DETAILS CAN BE CALCULATED
C
 3012 IF(MSWTCH) 3013,3013,89
 3013 IF(OHFAC) 3055,3055,3014
C
C***** PRINT HEADINGS FOR COST SIMULATION DETAIL
C
 3014 PGE = PGE + 1
      WRITE(IWTR,500) IDATE,FMT(KOPT),QTR(JOPT),FMT(KOPT+1),DTE
      WRITE(IWTR,3019) PLANT,FCC,DEPT,PGE,PLCDE,FCDE,DCDE
 3019 FORMAT(1X,'PLANT - ',6A2,10X,'FCC/PCC - ',6A2,10X,'AREA - ',
     *6A2,6X,'COST SIMULATION DETAIL',14X,'PAGE',I4,/,1X,'CODE',4X,
     *I3,'-',I3,'-',I3,//)
 3020 WRITE(IWTR,3021)
 3021 FORMAT(3X,'PATH NAME',
     *17X,'UNIT COST ($)',34X,'COST / MONTH',30X,'**',5X,'UNITS/',/,
     *118X,'**',5X,'MONTH',/,17X,'MATERIAL',3X,'LABOR',7X,'O H',
     *6X,'TOTAL',2X,'*',7X,'MATERIAL',10X,'LABOR',12X,'O H',
     *10X,'TOTAL',1X,'**',2(/,56X,'*',61X,'**')))
      SUMAT = 0.0
      SULAB = 0.0
      SUOH  = 0.0
      SUMLO = 0.0
      TUNMO = 0.0
      TMMAT = 0.0
      TMLAB = 0.0
      TMOH  = 0.0
      TTMLO = 0.0
      SPFLO = 0.0
      DO 3040 K=1,PAMAX
      IF(SIMIX(K)) 3040,3040,3024
 3024 UNMAT = STDM(K)
      SUMAT = SUMAT + (UNMAT * PFLO(K))
      UNLAB = STDL(K)
      SULAB = SULAB + (UNLAB * PFLO(K))
      UNOH  = UNLAB * OHFAC
      SUOH  = SUOH + (UNOH * PFLO(K))
      TUMLO = UNMAT + UNLAB + UNOH
      SUMLO = SUMLO + (TUMLO * PFLO(K))
      SPFLO = SPFLO + PFLO(K)
      UNMO  = 4.333 * (PFLO(K) * HWK)
      TUNMO = TUNMO + UNMO
      MOMAT = UNMO * UNMAT
      TMMAT = TMMAT + MOMAT
      MOLAB = UNMO * UNLAB
      TMLAB = TMLAB + MOLAB
      MOH   = UNMO * UNOH
      TMOH  = TMOH + MOH
```

TI-3972

TABLE 8 (CONT'D)

```
            TMMLO = MOMAT + MOLAB + MOH
            TTMLO = TTMLO + TMMLO
            WRITE(IWTR,3028) PATH(K), (PNAME(K,M),M=1,6), UNMAT,UNLAB,
           *UNOH, TUMLO, MOMAT, MOLAB, MOH, TMMLO, UNMO
       3028 FORMAT(1H ,I2,1X,6A2,1X,F8.5,2X,F8.5,2X,F8.5,1X,F9.5,1X,'*',
           *4(1X,F14.0),1X,'**',1X,F11.0)
       3040 CONTINUE
            AUMAT = SUMAT / SPFLO
            AULAB = SULAB / SPFLO
            AUOH  = SUOH  / SPFLO
            AUMLO = SUMLO / SPFLO
            WRITE(IWTR,3049)
       3049 FORMAT(56X,'*',/,1X,'AVERAGES',47X,'*',1X,'TOTALS',/,56X,'*')
            WRITE(IWTR,3050) AUMAT,AULAB,AUOH,AUMLO,TMMAT,TMLAB,TMOH,TTMLO,
           * TUNMO
       3050 FORMAT(1X,15X,4(F9.5,1X),'* ',4(F14.0,1X),'**',1X,F11.0,//)
            WRITE(IWTR,3052) (HRS(1,K),K=1,3), (HRS(2,K),K=1,3),OHFAC
       3052 FORMAT(1H-,100X,'MONTHLY COST DETAIL IS BASED ON',/,101X,
           *'THE FOLLOWING WORK SCHEDULE.',//,106X,
           *'SHIFT 1  SHIFT 2  SHIFT 3',//,101X,'SH/WK',2X,3(F3.1,6X),/,
           *101X,'HR/SH',2X,3(F3.1,6X),/,101X,'OVERHEAD FACTOR IS ',F5.2)
            GO TO 610
       3055 WRITE(IWTR,500) IDATE,FMT(KOPT),QTR(JOPT),FMT(KOPT+1),DTE
            WRITE(IWTR,3019) PLANT,FCC,DEPT,PGE,PLCDE,FCDE,DCDE
            WRITE(IWTR,3058)
       3058 FORMAT(1X,//////,5X,'REPORT NOT GIVEN BECAUSE OVERHEAD FACTOR LEFT
           *OUT OF CONTROL CARD 1.')
       C
       C***** SET SWITCHES AND RETURN TO CALLING PROGRAM
       C
        610 IF(IDET - 9) 608,609,608
        608 IF(IDET - 4) 607,607,609
        607 IF(IDET) 609,609,611
        609 IF(SACT - MXDEM + .005) 612,611,611
        611 IF(CYC) 615,612,615
        615 FRSTC = 0
            FRSTS = 0
            FSFT  = 0
            ICYC  = 0
            SPO   = 0.
            SACT  = 0.
            RTOTL = 0.
            PGE   = 0
            DO 613 K=1,SMAX
            DO 613 N=1,PAMAX
        613 SCAPP(K,N) = SCAPP(K,N) - (IADD(K) * SCAPA(K,N))
        612 FTAS = 0
            DO 616 K=1,SMAX
        616 NFLAG(K) = BLK
            IWTR=6
            RETURN
            END
```

ASSIGN (ASSGN) (TABLE 9)

This subroutine shown in TABLE 9 determines if a labor constraint has been encountered, and if so, rebalances the line. It first makes use of input data to sum the total number of people required for the network at the balanced condition. If there are not enough people available to man the line at the desired output level, the volume of each station is ratioed down by the factor (people available/people required). Based on this new station volume, the number of people required at each path point is calculated. The new output of each path is then calculated.

This subroutine is used only for Dynamic Line Balancing runs, and is called by MAIN after the network has been balanced and capacity constraints due to equipment have been resolved.

TI-3972

TABLE 9
ASSIGN (ASSGN)

```
@ FLT ASSGN,1,700414, 40476    , 1

SUBROUTINE ASSGN
       C
       C*****************************************************************
       C*                                                               *
       C*            MULTI-FLOW DYNAMIC LINE BALANCING                  *
       C*                                                               *
       C*   SUBROUTINE ASSGN - CHECKS FOR PEOPLE CONSTRAINT             *
```

TABLE 9 (CONT'D)

```
C*                     AND RE-BALANCES LINE                                *
C*                                                                         *
C*                                                                         *
C*                                                                         *
C********************************************************************
C
C****  COMMON FOR TRACE,DSKIN,MUFLO1,MUS,DBL,BEST
       COMMON/BLK1/
      *FPID,PFP
C
       INTEGER
      *FPID(200),PFP(1000)
C
C****  COMMON FOR TRACE,DSKIN,ADMCH,MUFLO1,MUS,BEST,RESTA,DLB,SUMMRI,SDRUM
       COMMON/BLK2/
      *PATH,PAMAX,PSTA,PPMAX,FSTA
C
       INTEGER
      *PATH(1000),PAMAX,PSTA(1000),PPMAX,FSTA(200)
C
C****  COMMON FOR DSKIN,ADMCH,DBL,SUMMRI
       COMMON/BLK3/
      *SMAX,PLANT,FCC,DEPT,PCYLD,PNAME,SDESC,PSTD,DTE
C
       INTEGER
      *SMAX,PLANT(6),FCC(6),DEPT(6),PNAME(15,6),SDESC(200,6),DTE(3)
C
       REAL
      *PCYLD(15),PSTD(1000)
C
C****  COMMON FOR DSKIN,ADMCH,MUFLO1,MUS,BEST,RESTA,DLB,SUMMRI,SDRUM
       COMMON/BLK6/
      *SUSED,M4,PXWIP,SUTL,M3,PFLO,PFLR,PPUTL,WORK2,PDWIP,FMAX,PLFLO
C
       INTEGER
      *SUSED(200),M4,M3,WORK2(15),FMAX
C
       REAL
      *PXWIP(1000),SUTL(200),PFLO(1000),PFLR(1000),PPUTL(1000),
      *PDWIP(1000),PLFLO(1000)
C
C****  COMMON FOR DSKIN,ADMCH,MUFLO1,MUS,DLB,SDRUM
       COMMON/BLK//
      *SCAPP,IDET
C
       INTEGER
      *IDET
C
       REAL
      *SCAPP(200,15)
C
C****  COMMON FOR DSKIN,SIMIN,ADMCH,SUMMRI,SDRUM,MAIN
       COMMON/BLK12/
      *PLCDE,FCDE,DCDE,HDAY,HRS
C
       INTEGER
      *PLCDE,FCDE,DCDE
C
       REAL
      *HRS(4,3), HDAY
C
C****  COMMON FOR TRACE,DSKIN,ADMCH,MUFLO1,SIMIN,MUS,BEST,RESTA,DBL,PRTER
       COMMON/BLK18/
      *IWIR
C
       INTEGER
      *IWIR
C
       INTEGER SHIFT
       REAL*4 TIME
C
C********************************************************************
C*
C*     DETERMINE SHIFT BY CALLING CLOCK AND COMPARING TIMES                *
C*                                                                         *
C*     TIME IS IN SECONDS SINCE PREVIOUS MIDNIGHT                          *
C*                                                                         *
C*     NOTE: ON UCC UNIVAC 1108, 'CLOCK' ROUTINE RESIDES ON                *
C*     UCCLIB/TICOMP AND MUST BE BROUGHT IN PRIOR TO EXECUTION             *
```

TABLE 9 (CONT'D)

```
C*
C**********************************************************************
C
      CALL CLOCK (TIME)
      NTIME=TIME
      IF(NTIME-28800) 10,10,20
   10 SHIFT=3
      GO TO 50
   20 IF(NTIME-59500) 30,30,40
   30 SHIFT=1
      GO TO 50
   40 SHIFT=2
   50 PPL=0
C
C**********************************************************************
C*    CALCULATE TOTAL PEOPLE REQUIRED TO MAN LINE                      *
C**********************************************************************
C
      DO 60 J=1,PPMAX
      FLO=PFLR(J)
      STD=PSTD(J)
   60 PPL=PPL+FLO/STD
C
C**********************************************************************
C*    ARE THERE ENOUGH PEOPLE ON ROSTER?                               *
C*    IF NOT, SCALE DOWN THE FLOW RATES                                *
C**********************************************************************
C
      RATIO=HRS(3,SHIFT)/PPL
      WRITE(IWTR,201) PPL,HRS(3,SHIFT),SHIFT
  201 FORMAT(25X,'PEOPLE REQD = ',F7.2,20X,'PAGE 1',/,25X,
     */,25X,'PEOPLE AVAILABLE = ',F4.0,/,25X,'SHIFT = ',I2)
      CALL DATSW (1,KD)
      GO TO (65,69),KD
   65 WRITE(IWTR,9341)
 9341 FORMAT(5X,'FPID        PFLO       PFLO(ADJ)  PFLR',
     *5X,'PFLR(ADJ)  PPUTL      PPUTL(ADJ)'/)
   69 IF(PPL-HRS(3,SHIFT)) 100,100,70
   70 DO 76 L=1,SMAX
   76 SUTL(L) = 0.0
      DO 80 J=1,PPMAX
      NFP=PFP(J)
      NSTA=PSTA(J)
      NPTH=PATH(J)
      GO TO (71,72),KD
   71 WRITE(IWTR,202) FPID(NFP),PATH(J), PFLO(J), PFLR(J),PPUTL(J)
  202 FORMAT(4X,I5,2X,I2,F8.1,10X,F10.1,10X,F10.3)
   72 PFLO(J)=PFLO(J)*RATIO
      PFLR(J)=PFLR(J)*RATIO
      PPUTL(J) = PFLR(J)/SCAPP(NSTA,NPTH)
      SUTL(NSTA) = SUTL(NSTA) + PPUTL(J)
      GO TO (79,80),KD
   79 WRITE(IWTR,203)   PFLO(J), PFLR(J),PPUTL(J)
  203 FORMAT(1H+,21X,F10.1,10X,F10.1,10X,F10.3)
   80 CONTINUE
      GO TO 150
  100 GO TO(148,150),KD
  148 DO 149 J=1,PPMAX
      NFP=PFP(J)
  149 WRITE(IWTR,202) FPID(NFP),PATH(J), PFLO(J), PFLR(J),PPUTL(J)
  150 RETURN
      END
```

CYCLE TIME (CTIME) (TABLE 10)

This subroutine shown in TABLE 10 is entered via a call from MAIN, and is used only for Dynamic Line Balancing. The cycle time at each path point is calculated by dividing actual work in process by the capacity for each path point. Cycle time for each path is the sum of the individual cycle times of the path points on that path. The average cycle time for the network is the weighted average of path cycle times multiplied by path demand. These calculations are performed each time the line is balanced for a selected demand. It should be obvious that the cycle time will decrease as the excess work in process is reduced.

TABLE 10
CYCLE TIME (CTIME)

@ ELT CTIME,1,700403, 58732 , 1

```
      SUBROUTINE CTIME
C
C*****************************************************************
C*                                                                *
C*           MULTI-FLOW DYNAMIC LINE BALANCING                    *
C*                                                                *
C*    SUBROUTINE CTIME - CALCULATES TOTAL TIME REQUIRED FOR EACH PATH *
C*                                                                *
C*         AND AVERAGE CYCLE TIME FOR ALL PATHS                   *
C*                                                                *
C*                                                                *
C*                                                                *
C*****************************************************************
C
C
C**** COMMON FOR TRACE,DSKIN,ADMCH,MUFLO1,MUS,BEST,RESTA,DLB,SUMMRI,SDRUM
      COMMON/BLK2/
     *PATH,PAMAX,PSTA,PPMAX,FSTA
C
      INTEGER
     *PATH(1000),PAMAX,PSTA(1000),PPMAX,FSTA(200)
C
C**** COMMON FOR DSKIN,ADMCH,MUFLO1,MUS,BEST,RESTA,DLB,SUMMRI,SDRUM
      COMMON/BLK6/
     *SUSED,M4,PXWIP,SUTL,M3,PFLO,PFLR,PPUTL,WORK2,PDWIP,FMAX,PLFLO
C
      INTEGER
     *SUSED(200),M4,M3,WORK2(15),FMAX
C
      REAL
     *PXWIP(1000),SUTL(200),PFLO(1000),PFLR(1000),PPUTL(1000),
     *PDWIP(1000),PLFLO(1000)
C
C**** COMMON FOR TRACE,DSKIN,ADMCH,MUFLO1,SIMIN,MUS,BEST,RESTA,DBL,PRTER
      COMMON/BLK18/
     *IWTR
C
      INTEGER
     *IWTR
C
C**** COMMON FOR CTIME, OUTPT
      COMMON/BLK20/
     *CT,AVGCT
      REAL
     * CT(15),AVGCT
C
C*    INITIALIZE VARIABLES
C
      CALL DATSW (1,KD)
      GO TO (3,6),KD
    3 WRITE(IWTR,5)
    5 FORMAT('1 ENTER CTIME'//11X,'PATH        PAWIP      PFLR       CT'/)
    6 DO 10 I=1,15
      CT(I) = 0.0
   10 CONTINUE
C
C*****************************************************************
C*    CALCUALTE CYCLE TIME BY DIVIDING W.I.P. BY FLOW RATE        *
C*          FOR EACH PATH POINT, TAKE SUM OVER ENTIRE PATH        *
C*****************************************************************
C
      DO 50 J=1,PPMAX
      I=PATH(J)
      PAWIP=PDWIP(J)+PXWIP(J)
      CT(I)=CT(I)+PAWIP/PFLR(J)
      GO TO (48,50),KD
   48 WRITE(IWTR,49) PATH(J),PAWIP, PFLR(J),CT(I)
   49 FORMAT(5X,I10,3F10.1)
   50 CONTINUE
      SUMPD=0
      SUMFL=0
C
C*****************************************************************
C*    CALCULATE AVERAGE CYCLE TIME                                *
C*****************************************************************
C
      DO 60 I=1,PAMAX
```

TI-3972

```
      SUMPD=SUMPD+CT(I)*PFLO(I)
   60 SUMFL=SUMFL+PFLO(I)
      AVGCT=SUMPD/SUMFL
      RETURN
      END
 1122 FORMAT(5X,'****',I4,'**** ASSGN ****')
```

OUTPUT (OUTPT) (TABLE 11)

This subroutine shown in TABLE 11 generates and prints the output reports for Dynamic Line Balancing, and is entered via a call from MAIN. Summations of people, volume and utilization are made at the path point level. Then summations are made to the flow point level and to the station level.

TI-3972

TABLE 11
OUTPUT (OUTPT)

```
@ FLT OUTPT,1,700420, 32437    , 1

SUBROUTINE OUTPT
C
C****          MULTI-FLOW DYNAMIC LINE BALANCING
C****
C*****SUBROUTINE OUTPT WRITES THE DLB REPORTS.
C****
C****
C*****THIS PARTICULAR VERSION OF OUTPT IS AN ALTERATION OF THE
C*****VERSION WRITTEN IN MAY,1969.  IT PUTS ALL DLB REPORTS IN
C*****ONE AREA.  SUE REJMANIAK MARCH,1970 VERSION.
C****
C
C
C**** COMMON FOR TRACE,DSKIN,MUFLO1,MUS,DBL,BEST
       COMMON/BLK1/
      *FPID,PFP
C
       INTEGER
      *FPID(200),PFP(1000)
C
C**** COMMON FOR TRACE,DSKIN,ADMCH,MUFLO1,MUS,BEST,RESTA,DLB,SUMMRI,SDRUM
       COMMON/BLK2/
      *PATH,PAMAX,PSTA,PPMAX,FSTA
C
       INTEGER
      *PATH(1000),PAMAX,PSTA(1000),PPMAX,FSTA(200)
C
C**** COMMON FOR DSKIN,ADMCH,DBL,SUMMRI
       COMMON/BLK3/
      *SMAX,PLANT,FCC,DEPT,PCYLD,PNAME,SDESC,PSTD,DTE
C
       INTEGER
      *SMAX,PLANT(6),FCC(6),DEPT(6),PNAME(15,6),SDESC(200,6),DTE(3)
C
       REAL
      *PCYLD(15),PSTD(1000)
C
       COMMON/BLK5/
      *PNBRH
C
       INTEGER
      *PNBRH(1000)
C
C**** COMMON FOR DSKIN,ADMCH,MUFLO1,MUS,BEST,RESTA,DLB,SUMMRI,SDRUM
       COMMON/BLK6/
      *SUSED,M4,PXWIP,SUTL,M3,PFLO,PFLR,PPUTL,WORK2,PDWIP,FMAX,PLFLO
C
       INTEGER
      *SUSED(200),M4,M3,WORK2(15),FMAX
C
       REAL
      *PXWIP(1000),SUTL(200),PFLO(1000),PFLR(1000),PPUTL(1000),
      *PDWIP(1000),PLFLO(1000)
C
C**** COMMON FOR ADMCH,MUFLO1,DBL
       COMMON/BLK9/
      *PLFLR,CYC
C
```

TABLE 11 (CONT'D)

```
      INTEGER
     *CYC
C
      REAL
     *PLFLR(1000)
C
C**** COMMON FOR SIMIN,DBL,SUMMRI
      COMMON/BLK11/
     *OHFAC,IRDR
C
      INTEGER
     *IRDR
C
      REAL
     *OHFAC
C
C**** COMMON FOR MUFLO1,DBL
      COMMON/BLK16/
     *FDWIP
C
      REAL
     *FDWIP(200)
C
C**** COMMON FOR DSKIN,DBL,SUMMRI
C
      COMMON/BLK17/
     *FDESC,STOM,STDL
C
      INTEGER
     *FDESC(200,6)
C
      REAL
     *STOM(1000),STDL(1000)
C
C**** COMMON FOR TRACE,DSKIN,ADMCH,MUFLO1,SIMIN,MUS,BEST,RESTA,DBL,PRTER
      COMMON/BLK18/
     *IWTR
C
      INTEGER
     *IWTR
C
      COMMON/BLK19/
     * FWIP,DATE,TIME
C
      INTEGER
     *DATE(4),TIME(4)
C
      REAL
     * FWIP(200)
      C
C**** COMMON FOR CTIME, OUTPT
      COMMON/BLK20/
     *CT,AVGCT
      REAL
     * CT(15),AVGCT
C
C
      INTEGER FAR(200)
C
      REAL FCAPU(200),SPEPL(200)
      DATA IASTK/'**'/,IBLNK/'  '/
C
C*****INITIALIZE VARIABLES
C
      IPAGE = 2
      DO 874 I=1,SMAX
      FCAPU(I) = 0.0
  874 SPEPL(I) = 0.0
      ICNT = 48
      APEPL = 0.0
      AROUT = 0.0
      ADWIP = 0.0
      AAWIP = 0.0
      AVARI = 0.0
      AUNTS = 0.0
      DUNTS = 0.0
C
C
C*****ALL STATIONS ARE IN ONE AND THE SAME AREA.
```

TABLE 11 (CONT'D)

```
C*****
C*****SAVE IN FAR, THE RELATIVE LOCATION OF A STATION FOR A FP.
C
C
      DO 9741 I=1,FMAX
      DO 9741 J=1,PPMAX
      IF(PFP(J) - 1) 9741,9740,9741
 9740 FAR(I) = PSTA(J)
 9741 CONTINUE
      WRITE (IWTR,6001) DATE,TIME,IPAGE
      WRITE (IWTR,6003)
C
C*****BEGIN MAJOR LOOP TO SUM INFORMATION FOR
C*****ONE STATION AT A TIME THROUGH LOOP.
C
  146 J = 1
 2146 ISTA = FSTA(J)
      SDWIP = 0.0
      SROUT = 0.0
      SAWIP = 0.0
      SVARI = 0.0
   51 ISTNO = FSTA(J)
      ISTLC = J
C
C*****BEGIN FIRST MINOR LOOP TO SUM INFORMATION
C*****FOR EACH F.P. OF THIS STATION.
C
  170 L = 1
 2170 IF(FAR(L)-ISTLC) 70,71,70
   71 SAWIP = SAWIP + FWIP(L)
      AAWIP = AAWIP + FWIP(L)
      IFPNO = FPID(L)
      IFPLC = L
C
C
C*****BEGIN SECOND MINOR LOOP TO SUM INFORMATION
C*****BY P.P. FOR ALL F.P. OF THIS STATION
C*****AND PRINT THE STATION LINE
C
  180 M=1
 2180 IF(PFP(M)-IFPLC) 80,81,80
   81 SDWIP = SDWIP + PDWIP(M)
      ADWIP = ADWIP + PDWIP(M)
      SROUT = SROUT + PFLO(M)
      SPEPL(J) = SPEPL(J) + PFLR(M) / PSID(M)
      FCAPU(L) = FCAPU(L) + PPUTL(M)
      IF(PNBRH(M) .NE. 1) GO TO 80
      AROUT = AROUT + PFLO(M)
   80 M = M + 1
      IF(M.LE.PPMAX) GO TO 2180
   70 L = L + 1
      IF(L.LE.FMAX) GO TO 2170
      APEPL = APEPL + SPEPL(J)
      IF (SDWIP) 77,78,77
   77 SVARI = (SAWIP-SDWIP)/SDWIP
   78 IF (SUTL(J)-.950) 75,76,76
   75 IBLKP = IBLNK
      GO TO 79
   76 IBLKP = IASTK
   79 WRITE (IWTR,6009) IBLKP,(SDESC(ISTLC,M),M=1,6),SPEPL(J),SROUT,
     1SDWIP,SAWIP,SVARI,SUTL(J)
      IRIN = 1
      ICNT = ICNT-1
      IF (ICNT) 900,900,901
C
C*****BEGIN THIRD MINOR LOOP TO SUM INFORMATION
C*****BY P.P. FOR EACH OF THESE F.P.
C*****AND PRINT A F.P. LINE
C
  901 K = 1
 2901 IFPID = FPID(K)
      IF(FAR(K)-ISTLC) 90,91,90
   91 IFPNO = FPID(K)
      IFPLC = K
C
      FPOUT = 0.0
      FPDIV = 0.0
      DO 110 M=1,PPMAX
```

TABLE 11 (CONT'D)

```
      IF (PFP(M)-IFPLC) 110,111,110
  111 FPDIV = FPDIV + PDWIP(M)
      FPOUT = FPOUT + PFLO(M)
      DUNTS = DUNTS + PDWIP(M)
  110 CONTINUE
      IF (FPDIV) 115,116,115
  115 FPVAR = (FWIP(IFPLC)-FPDIV)/FPDIV
  116 WRITE (IWTR,6010)FPID(IFPLC),(FDESC(IFPLC,N),N=1,6),FPOUT,FPDIV,
     1FWIP(IFPLC),FPVAR,FCAPU(IFPLC)
C
      IRTN = 2
      ICNT = ICNT-1
      IF (ICNT) 900,900,902
C
C*****BEGIN THE FOURTH MINOR LOOP TO
C*****PRING EACH P.P. OF THE F.P.
C
  902 L = 1
 2902 IF(PFP(L)-IFPLC) 120,121,120
  121 IPPNO=PATH(L)
      WRITE (IWTR,6011)(PNAME(IPPNO,N),N=1,6),PFLO(L)
      IRIN = 3
      ICNT = ICNT-1
      IF (ICNT) 900,900,120
  120 L = L + 1
      IF(L.LE.PPMAX) GO TO 2902
      WRITE (IWTR,6019)
      IRIN = 4
      ICNT = ICNT-1
      IF (ICNT) 900,900,90
   90 K = K + 1
      IF(K.LE.FMAX) GO TO 2901
   50 J = J + 1
      IF(J.LE.SMAX) GO TO 2146
      WRITE (IWTR,6004)
      AVARI = (AAWIP - ADWIP) / ADWIP
      WRITE(IWTR,6019)
      WRITE(IWTR,6008) APEPL,AROUT,ADWIP,AAWIP,AVARI
      WRITE(IWTR,6019)
      WRITE(IWTR,6004)
      RETURN
C
C
  900 WRITE (IWTR,6004)
      WRITE (IWTR,6012)
      IPAGE = IPAGE+1
      WRITE (IWTR,6001) DATE,TIME,IPAGE
      WRITE (IWTR,6003)
      ICNT = 48
      GO TO (901,902,120),IRTN
 6001 FORMAT (1H1,20X,'RPT: SC.CK.6000',2X,4A2,1X,4A2,8X,'** TI STRICTLY
     1 PRIVATE **',//,35X,' DYNAMIC LINE BALANCING REPORT'
     2,5X,'PAGE ',I3/)
C
C
 6003 FORMAT (1H ,41X,'OPTIMAL SHIFT PLAN',/,20X,1HI
     *,66(1H-),1HI,/,20X,'I ID /STATION/FP/PRODUCT/'
     *'PEOPLE/REQSTD/DSIRED/ACTUAL/ VARI / UTILIZI',/,
     *20X,1HI,23X,'/ REQD /OUTPUT/ INV / INV / ANCE / ATION I'
     *,//,20X,1HI,66(1H-),1HI)
C
 6004 FORMAT (1H ,19X,1HI,66(1H-),1HI)
C
 6008 FORMAT (1H ,19X,1HI,3X,'TOTALS FOR NETWORK',2X,1HI,F6.1,1HI,F6.0,
     *1HI,F6.0,1HI,F6.0,1HI,F6.3,1HI,'       I')
C
 6009 FORMAT (1H ,19X,1HI,A1,4X,6A2,6X,1HI,F6.1,1HI,F6.0,1HI,F6.0,1HI,
     *F6.0,1HI,F6.3,1HI,F6.3,2H I)
C
 6010 FORMAT (1H ,19X,1HI,I4,4X,6A2,3X,1HI,6X,1HI,F6.0,1HI,F6.0,1HI
     1,F6.0,1HI,F6.3,1HI,F6.3,2H I)
C
 6011 FORMAT (1H ,19X,1HI,11X,6A2,1HI,6X,1HI,F6.0,4(/HI        ),
     12H I)
C
 6012 FORMAT(1H ,25X,'I',6X,'DESIRED',2X,3(F8.0,4X),2X,'I',/,
     *26X,'I',53X,'I')
C
 6019 FORMAT(1H ,19X,1HI,23X,6(1HI,6X),2H I)
      END
```

We claim:

1. The method of balancing a manufacturing line having a plurality of product paths through said manufacturing line comprising the steps of establishing the work stations through which the work flows in each product path,
ordering said work stations into sequential path points in each product path,
ordering the path points in said product paths into a sequence of neighborhoods in said manufacturing line, and
balancing in an automatic data processing machine the flow of work in said plurality of product paths in said manufacturing line starting with the last neighborhood in said sequence of neighborhoods.

2. The method of claim 1 of balancing a manufacturing line wherein said neighborhoods are established in the following manner in an automatic data processing machine wherein N is a collection of flow points defining the manufacturing line, P is a product path in said manufacturing line, a flow point $i$, on product path P is said to have a predecessor in the manufacturing line N if and only if there exists a flow point $j$ in N such that $i$ immediately precedes $j$ on product path P, a neighborhood $N_i$, in the manufacturing line N is the set of all path points $i$ which have no predecessors in the set;

$$N; i = 1$$

$$j = i-1$$

$$N - N_j; i > 1$$

$$j = 1$$

3. The method of claim 1 of balancing a manufacturing line wherein said neighborhoods ordered by path pointers.

4. The method of balancing a manufacturing line claimed in claim 3 wherein variables are taken into account in the calculation of the necessary input to each path point to deliver the desired input to the succeeding flow point.

5. The method of balancing a manufacturing line claimed in claim 4 wherein said variables include a scrap factor, a rework factor, and an excess work in process factor.

6. The method of claim 1 wherein the desired output from said manufacturing line is established and the inputs to the path points in said neighborhoods are calculated by neighborhood starting with the last neighborhood in said sequence to provide the necessary input and continuing this calculation to each preceding neighborhood in succession.

7. The method claimed in claim 6 wherein said path points in said product paths are grouped into flow points for adjacent product paths.

8. The method claimed in claim 7 wherein the unit labor cost is calculated at each flow point according to the following manner:

$$ULS + \frac{VOL \times ALR}{LS \times LP}$$

where:
ULC is unit labor cost,
VOL is flow point volume,
ALR is average labor rate,
LS is labor standard, and
LP is labor performance.

9. The method of balancing a manufacturing line as claimed in claim 7 wherein a rework-in variable is taken into the calculation for determining the required input to each flow point.

10. The method claimed in claim 9 wherein equipment capacity constraint is taken into account as a variable.

11. The method claimed in claim 10 wherein a capacity simulation is carried out adding equipment required to rebalance a line.

12. The method claimed in claim 9 wherein a bottleneck flow point is identified and the input of each path point in the bottleneck flow point is ratioed down to drive the achievable output to the end of the manufacturing line.

13. The method claimed in claim 12 wherein a bottleneck is identified at a multi-use flow point and path point inputs are ratioed down.

14. The method claimed in claim 9 wherein work in process is allocated to the particular path points in the same ratio as the input desired work in process is calculated.

15. The method of claim 9 wherein the material cost at each flow point is calculated with the cost of entered material divided by the number of good units proceeding to next sequential flow point.

16. The method claimed in claim 9 wherein a number is retrieved from a random number generator as each piece of work enters the first flow point of the product path, comparing this random number to the input values of yield and rework-out percentage, and each piece is processed down the product path until it is scrapped or enters the end of the path to simulate the total pieces of rework-in at each flow point.

17. The method claimed in claim 16 wherein the yields and rework-out percentage is calculated for each flow point.

18. Apparatus for balancing a model of a manufacturing line having a plurality of product paths with the work stations in said product paths ordered into a sequence of path points along each product path comprising means for ordering the path points in said product paths into a sequence of neighborhoods and means for balancing the flow of work in said plurality of product paths in said manufacturing line starting with the last neighborhood in said sequence of neighborhoods.

19. The apparatus for balancing a model of a manufacturing line claimed in claim 18 having means for calculating the inputs to the path points in said neighborhoods by neighborhood starting with the last neighborhood in said sequence to provide the necessary input to said neighborhood and means for continuing the calculation to each preceding neighborhood in succession.

* * * * *